United States Patent
Lee et al.

(10) Patent No.: US 12,541,113 B2
(45) Date of Patent: Feb. 3, 2026

(54) IMAGE SENSOR INCLUDING COLOR SEPARATING LENS ARRAY AND ELECTRONIC DEVICE INCLUDING THE IMAGE SENSOR

(71) Applicant: SAMSUNG ELECTRONICS CO., LTD., Suwon-si (KR)

(72) Inventors: Sangyun Lee, Yongin-si (KR); Sookyoung Roh, Yongin-si (KR); Seokho Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 927 days.

(21) Appl. No.: 17/515,017

(22) Filed: Oct. 29, 2021

(65) Prior Publication Data

US 2022/0137424 A1     May 5, 2022

(30) Foreign Application Priority Data

Oct. 30, 2020 (KR) .................. 10-2020-0143871
Jun. 25, 2021 (KR) .................. 10-2021-0083122

(51) Int. Cl.
*G02B 27/10* (2006.01)
*G02B 27/12* (2006.01)
(Continued)

(52) U.S. Cl.
CPC ....... *G02B 27/1013* (2013.01); *G02B 27/123* (2013.01); *H04N 9/01* (2023.01);
(Continued)

(58) Field of Classification Search
CPC .............. G02B 27/1013; G02B 27/123; H04N 9/0451; H04N 9/077; H04N 25/11;
(Continued)

(56) References Cited

U.S. PATENT DOCUMENTS 7,498,562 B2   3/2009  Fukuyoshi et al.
8,289,422 B2  10/2012  Hiramoto et al.
(Continued)

FOREIGN PATENT DOCUMENTS

EP     3217196 A1    9/2017
JP     5012019 B2    8/2012
(Continued)

OTHER PUBLICATIONS

Chen, Bo Han et al., "GaN Metalens for Pixel-Level Full-Color Routing at Visible Light", Nano Letters, Sep. 11, 2017, vol. 17, pp. 6345-6352. (8 pages total).
(Continued)

*Primary Examiner* — Marcos D. Pizarro
(74) *Attorney, Agent, or Firm* — Sughrue Mion, PLLC

(57) ABSTRACT

Provided is an image sensor including a sensor substrate including a first photosensitive cell and a second photosensitive cell which are configured to sense light incident on the sensor substrate, a color separating lens array configured to change a phase of first wavelength light and a phase of second wavelength light such that the first wavelength light travels to the first photosensitive cell and the second wavelength light travels to the second photosensitive cell, and a spectrum shaping layer including a plurality of nanostructures respectively having a first refractive index, and a dielectric material provided between the plurality of nanostructures and having a second refractive index, the spectrum shaping layer being provided between the sensor substrate and the color separating lens array and configured to shape a spectral profile of the light incident on the sensor substrate by reflecting and/or absorbing portion of light passing through the color separating lens array.

45 Claims, 49 Drawing Sheets

(51) Int. Cl.

| | |
|---|---|
| *H04N 9/01* | (2023.01) |
| *H04N 23/84* | (2023.01) |
| *H04N 25/11* | (2023.01) |
| *H04N 25/13* | (2023.01) |
| *H10F 39/00* | (2025.01) |
| *H10F 39/18* | (2025.01) |

(52) U.S. Cl.
CPC ............ *H04N 23/84* (2023.01); *H04N 25/11* (2023.01); *H04N 25/134* (2023.01); *H10F 39/182* (2025.01); *H10F 39/805* (2025.01); *H10F 39/8053* (2025.01); *H10F 39/806* (2025.01); *H10F 39/8063* (2025.01)

(58) Field of Classification Search
CPC ............ H04N 25/134; H01L 27/1462; H01L 27/14627; H10F 39/182; H10F 39/805; H10F 39/8053; H10F 39/806; H10F 39/8063
See application file for complete search history.

(56) References Cited

U.S. PATENT DOCUMENTS

| | | | |
|---|---|---|---|
| 9,099,369 | B2 | 8/2015 | Hiramoto et al. |
| 9,628,685 | B2 | 4/2017 | Kim et al. |
| 2011/0235017 | A1* | 9/2011 | Iwasaki ............... H04N 25/131 250/226 |
| 2012/0206637 | A1 | 8/2012 | Hiramoto et al. |
| 2012/0212656 | A1 | 8/2012 | Hiramoto et al. |
| 2012/0248561 | A1 | 10/2012 | Hakko |
| 2015/0331163 | A1 | 11/2015 | Iwasaki et al. |
| 2016/0065814 | A1* | 3/2016 | Kim .................. G02B 5/201 359/891 |
| 2017/0170220 | A1 | 6/2017 | Nam et al. |
| 2017/0261368 | A1* | 9/2017 | Nam .................. G02B 5/201 |
| 2020/0241250 | A1 | 7/2020 | Kim |
| 2021/0082988 | A1 | 3/2021 | Miyata et al. |
| 2021/0366964 | A1 | 11/2021 | Ito et al. |
| 2023/0375400 | A1 | 11/2023 | Nam et al. |

FOREIGN PATENT DOCUMENTS

| | | | |
|---|---|---|---|
| JP | 6039558 | B2 | 12/2016 |
| JP | 2019-184986 | A | 10/2019 |
| KR | 2002-0017853 | A | 3/2002 |
| KR | 2002017853 | A * | 3/2002 |
| KR | 10-2016-0024607 | A | 3/2016 |
| KR | 10-2017-0105877 | A | 9/2017 |
| KR | 10-2020-0092584 | A | 8/2020 |
| WO | 2014/061188 | A1 | 4/2014 |
| WO | 2019/124562 | A1 | 6/2019 |

OTHER PUBLICATIONS

Nishiwaki, Seiji et al., "Efficient colour splitters for high-pixel-density image sensors", Nature Photonics, vol. 7, Mar. 2013, pp. 240-246. (7 pages total).

Communication dated Mar. 18, 2022 issued by the European Patent Office in European Patent Application No. 21205259.1.

Communication dated Dec. 4, 2023, issued by the Korean Intellectual Property Office in Korean Patent Application No. 10-2021-0083122.

Office Action issued Oct. 1, 2025 by the Japan Patent Office in Japanese Patent Application No. 2021-176348.

* cited by examiner

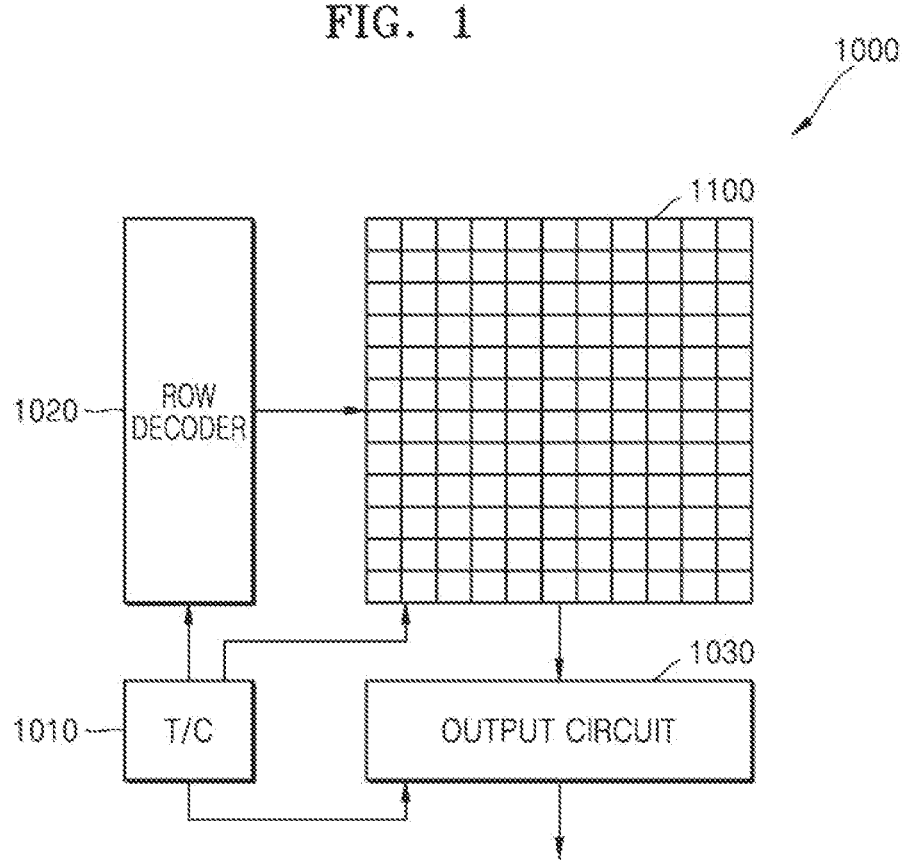

FIG. 2B

| C | M | C | M | C | M | C | M |
|---|---|---|---|---|---|---|---|
| Y | G | Y | G | Y | G | Y | G |
| C | M | C | M | C | M | C | M |
| Y | G | Y | G | Y | G | Y | G |
| C | M | C | M | C | M | C | M |
| Y | G | Y | G | Y | G | Y | G |
| C | M | C | M | C | M | C | M |
| Y | G | Y | G | Y | G | Y | G |

FIG. 2C

| R | G | R | G | R | G | R | G |
|---|---|---|---|---|---|---|---|
| B | W | B | W | B | W | B | W |
| R | G | R | G | R | G | R | G |
| B | W | B | W | B | W | B | W |
| R | G | R | G | R | G | R | G |
| B | W | B | W | B | W | B | W |
| R | G | R | G | R | G | R | G |
| B | W | B | W | B | W | B | W |

FIG. 10A
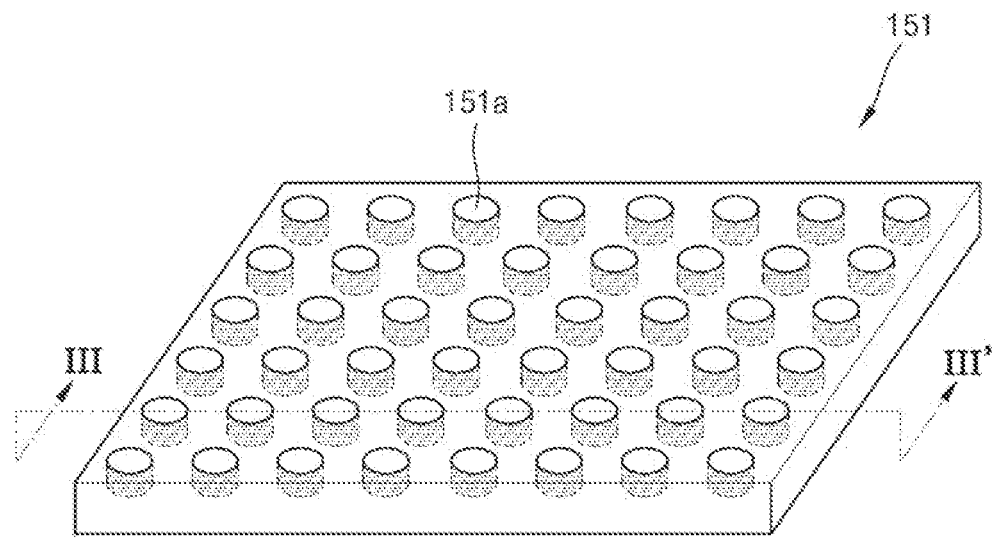
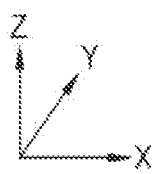
FIG. 10B
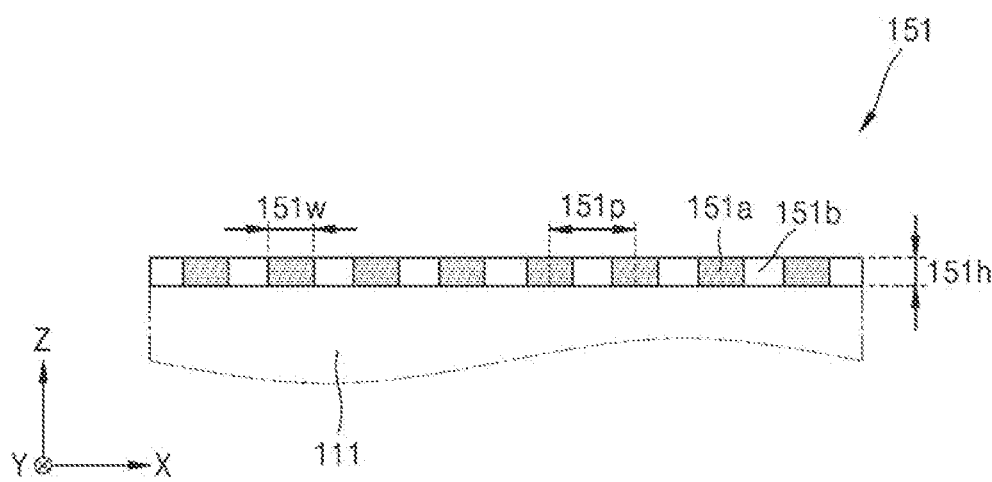
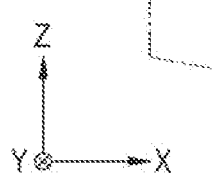

[Security]

IMAGE SENSOR INCLUDING COLOR SEPARATING LENS ARRAY AND ELECTRONIC DEVICE INCLUDING THE IMAGE SENSOR

CROSS-REFERENCE TO RELATED APPLICATIONS

This application is based on and claims priority under 35 U.S.C. § 119 to Korean Patent Application No. 10-2020-0143871, filed on Oct. 30, 2020, and Korean Patent Application No. 10-2021-0083122, filed on Jun. 25, 2021, in the Korean Intellectual Property Office, the disclosures of which are incorporated by reference herein in their entireties.

BACKGROUND

1. Field

Example embodiments of the present disclosure relate to an image sensor including a color separating lens array capable of condensing incident light separately according to wavelengths of the incident light, and an electronic device including the image sensor.

2. Description of Related Art

Image sensors generally sense the color of incident light by using a color filter. However, a color filter may have low light utilization efficiency because the color filter absorbs light of colors other than the corresponding color of light. For example, when a red-green-blue (RGB) color filter is used, only ⅓ of the incident light is transmitted and the other, that is, ⅔ of the incident light, is absorbed, and thus, the light utilization efficiency is only about 33%. Thus, in a color display apparatus or a color image sensor, most light loss occurs in the color filter.

SUMMARY

One or more example embodiments provide image sensors having improved light utilization efficiency and color reproducibility by using a color separating lens array capable of condensing incident light separately according to wavelengths of the incident light and a spectrum shaping layer shaping a spectrum distribution for each color and electronic devices including the image sensors.

Additional aspects will be set forth in part in the description which follows and, in part, will be apparent from the description, or may be learned by practice of example embodiments of the disclosure.

According to an aspect of an example embodiment, there is provided an image sensor including a sensor substrate including a first photosensitive cell and a second photosensitive cell which are configured to sense light incident on the sensor substrate, a color separating lens array configured to change a phase of first wavelength light and a phase of second wavelength light different from each other such that the first wavelength light included in light incident on the color separating lens array travels to the first photosensitive cell and the second wavelength light included in the light incident on the color separating lens array travels to the second photosensitive cell, and a spectrum shaping layer including a plurality of nanostructures respectively having a first refractive index, and a dielectric material provided between the plurality of nanostructures and having a second refractive index, the spectrum shaping layer is provided between the sensor substrate and the color separating lens array and configured to shape a spectral profile of the light incident on the sensor substrate by reflecting and/or absorbing portion of light passing through the color separating lens array.

A thickness of the color separating lens array may be 3 to 50 times larger than a thickness of the spectrum shaping layer.

A thickness of the color separating lens array may be 500 nm to 1500 nm, and a thickness of the spectrum shaping layer is 30 nm to 160 nm.

The spectrum shaping layer may include a first shaper provided on the first photosensitive cell, and the first shaper may have a transmittance less than 0.5 with respect to light having a wavelength equal to or less than 450 nm, and the first shaper may have a transmittance equal to or more than 0.5 with respect to light having a wavelength equal to or more than 500 nm.

The spectrum shaping layer may include a second shaper provided on the second photosensitive cell, and the second shaper may have a transmittance lower than 0.5 with respect to light having a wavelength of 650 nm, and the second shaper may have a transmittance of equal to or more than 0.5 with respect to light having a wavelength equal to or less than 610 nm.

The spectrum shaping layer may include a first shaper provided on the first photosensitive cell and a second shaper disposed on the second photosensitive cell, and the first shaper may include a plurality of first nanostructures having a first cross-sectional area, and the second shaper may include a plurality of second nanostructures having a second cross-sectional area that is larger than the first cross-sectional area.

Each of the plurality of first nanostructures and each of the plurality of second nanostructures may have a cylinder shape or a square pillar shape.

The second cross-sectional area may be 4 to 10 times larger than the first cross-sectional area.

The spectrum shaping layer may include a first shaper provided on the first photosensitive cell and a second shaper disposed on the second photosensitive cell, and the first shaper may include a plurality of first nanostructures disposed at a first pitch, and the second shaper may include a plurality of second nanostructures disposed at a second pitch.

The second pitch may be 2 to 6 times larger than the first pitch.

The sensor substrate may further include a third photosensitive cell and a fourth photosensitive cell sensing light, and the color separating lens array may be configured to change the phase of the first wavelength light, the phase of the second wavelength light, and the phase of the third wavelength light different from each other such that the first wavelength light travels to the first photosensitive cell and the fourth photosensitive cell and the third wavelength light travels to the third photosensitive cell.

The spectrum shaping layer may include a third shaper provided on the third photosensitive cell, and the third shaper may have a transmittance lower than 0.5 with respect to light having a wavelength equal to or less than 500 nm, and the third shaper may have a transmittance equal to or more than 0.5 with respect to light having a wavelength equal to or more than 600 nm.

The spectrum shaping layer may include a first shaper provided on the first photosensitive cell and the fourth photosensitive cell, a second shaper provided on the second photosensitive cell, and a third shaper provided on the third photosensitive cell, and the first shaper may include a plurality of first nanostructures respectively having a first cross-sectional area, the second shaper may include a plurality of second nanostructures respectively having a second cross-sectional area that is larger than the first cross-sectional area, and the third shaper may include a plurality of third nanostructures respectively having a third cross-sectional area that is larger than the first cross-sectional area and less than the second cross-sectional area.

Each of the plurality of first nanostructures, each of the plurality of second nanostructures, and each of the plurality of third nanostructures may have a cylinder shape or a square pillar shape.

The spectrum shaping layer may include a first shaper provided on the first photosensitive cell and the fourth photosensitive cell, a second shaper provided on the second photosensitive cell, and a third shaper provided on the third photosensitive cell, and the first shaper may include a plurality of first nanostructures disposed at a first pitch, the second shaper may include a plurality of second nanostructures disposed at a second pitch that is larger than the first pitch, and the third shaper may include a plurality of third nanostructures disposed at a third pitch that is larger than the first pitch and less than the second pitch.

A ratio of light sensed by the second photosensitive cell may be equal to or more than 85% with respect to light having a wavelength of 450 nm that is sensed by the sensor substrate.

A ratio of light sensed by the third photosensitive cell may be equal to or more than 60% with respect to light having a wavelength of 640 nm that is sensed by the sensor substrate.

The image sensor may further include an optical filter layer provided on the color separating lens array and configured to block infrared or ultraviolet light among the light incident on the color separating lens array.

The optical filter layer may include a first filter layer having a first refractive index and a second filter layer having a second refractive index, the second filter layer being provided on the first filter layer.

A transmission area ratio of the spectrum shaping layer may be 40% to 90% with respect to light of a wavelength of 400 nm to 700 nm.

A transmission area ratio of the spectrum shaping layer may be 50% to 80% with respect to light of a wavelength of 400 nm to 700 nm.

The spectrum shaping layer may include a first shaper provided on the first photosensitive cell, and a transmission area ratio of the first shaper may be 50% to 80% with respect to light of a wavelength of 400 nm to 700 nm.

According to another aspect of an example embodiment, there is provided an electronic device including an image sensor configured to convert an optical image into an electrical signal, and a processor configured to control an operation of the image sensor, and store and output a signal generated by the image sensor, wherein the image sensor may include a sensor substrate including a first photosensitive cell and a second photosensitive cell which are configured to sense light incident on the sensor substrate, a color separating lens array configured to change a phase of first wavelength light and a phase of second wavelength light different from each other such that the first wavelength light included in light incident on the color separating lens array travels to the first photosensitive cell and the second wavelength light included in the light incident on the color separating lens array travels to the second photosensitive cell, and a spectrum shaping layer including a plurality of nanostructures respectively having a first refractive index and a dielectric material provided between the plurality of nanostructures and respectively having a second refractive index, the spectrum shaping layer being provided between the sensor substrate and the color separating lens array and configured to shape a spectral profile of the light incident on the sensor substrate by reflecting and/or absorbing portion of light passing through the color separating lens array.

A thickness of the color separating lens array may be 3 to 50 times larger than a thickness of the spectrum shaping layer.

A thickness of the color separating lens array may be 500 nm to 1500 nm, and a thickness of the spectrum shaping layer is 30 nm to 160 nm.

The spectrum shaping layer may include a first shaper provided on the first photosensitive cell, and the first shaper may have a transmittance less than 0.5 with respect to light having a wavelength equal to or less than 450 nm, and the first shaper may have a transmittance equal to or more than 0.5 with respect to light having a wavelength equal to or more than 500 nm.

The spectrum shaping layer may include a second shaper provided on the second photosensitive cell, and the second shaper may have a transmittance lower than 0.5 with respect to light having a wavelength of 650 nm, and the second shaper may have a transmittance of equal to or more than 0.5 with respect to light having a wavelength equal to or less than 610 nm.

The spectrum shaping layer may include a first shaper provided on the first photosensitive cell and a second shaper provided on the second photosensitive cell, and the first shaper may include a plurality of first nanostructures respectively having a first cross-sectional area, and the second shaper may include a plurality of second nanostructures respectively having a second cross-sectional area that is larger than the first cross-sectional area.

Each of the plurality of first nanostructures and each of the plurality of second nanostructures may have a cylinder shape or a square pillar shape.

The second cross-sectional area may be 4 to 10 times larger than the first cross-sectional area.

The spectrum shaping layer may include a first shaper provided on the first photosensitive cell and a second shaper provided on the second photosensitive cell, and the first shaper may include a plurality of first nanostructures disposed at a first pitch, and the second shaper may include a plurality of second nanostructures disposed at a second pitch.

The second pitch may be 2 to 6 times larger than the first pitch.

The sensor substrate may further include a third photosensitive cell and a fourth photosensitive cell sensing light, and the color separating lens array may be configured to change the phase of the first wavelength light, the phase of the second wavelength light, and the phase of the third wavelength light different from each other such that the first wavelength light travels to the first photosensitive cell and the fourth photosensitive cell and the third wavelength light travels to the third photosensitive cell.

The spectrum shaping layer may include a third shaper provided on the third photosensitive cell, and the third shaper may have a transmittance lower than 0.5 with respect to light having a wavelength equal to or less than 500 nm, and the third shaper may have a transmittance equal to or more than 0.5 with respect to light having a wavelength equal to or more than 600 nm.

The spectrum shaping layer may include a first shaper provided on the first photosensitive cell and the fourth photosensitive cell, a second shaper provided on the second photosensitive cell, and a third shaper provided on the third photosensitive cell, and the first shaper may include a plurality of first nanostructures respectively having a first cross-sectional area, the second shaper may include a plurality of second nanostructures respectively having a second cross-sectional area that is larger than the first cross-sectional area, and the third shaper may include a plurality of third nanostructures respectively having a third cross-sectional area that is larger than the first cross-sectional area and less than the second cross-sectional area.

Each of the plurality of first nanostructures, each of the plurality of second nanostructures, and each of the plurality of third nanostructures may have a cylinder shape or a square pillar shape.

The spectrum shaping layer may include a first shaper provided on the first photosensitive cell and the fourth photosensitive cell, a second shaper provided on the second photosensitive cell, and a third shaper provided on the third photosensitive cell, and the first shaper may include a plurality of first nanostructures disposed at a first pitch, the second shaper may include a plurality of second nanostructures disposed at a second pitch that is larger than the first pitch, and the third shaper may include a plurality of third nanostructures disposed at a third pitch that is larger than the first pitch and less than the second pitch.

A ratio of light sensed by the second photosensitive cell may be equal to or more than 85% with respect to light having a wavelength of 450 nm that is sensed by the sensor substrate.

A ratio of light sensed by the third photosensitive cell may be equal to or more than 60% with respect to light having a wavelength of 640 nm that is sensed by the sensor substrate.

The electronic device may further include an optical filter layer provided on the color separating lens array and configured to block infrared or ultraviolet light among the light incident on the color separating lens array.

The optical filter layer may include a first filter layer having a first refractive index and a second filter layer having a second refractive index, the second filter layer being provided on the first filter layer.

A transmission area ratio of the spectrum shaping layer may be 40% to 90% with respect to light of a wavelength of 400 nm to 700 nm.

A transmission area ratio of the spectrum shaping layer may be 50% to 80% with respect to light of a wavelength of 400 nm to 700 nm.

The spectrum shaping layer may include a first shaper provided on the first photosensitive cell, and a transmission area ratio of the first shaper may be 50% to 80% with respect to light of a wavelength of 400 nm to 700 nm.

According to another aspect of an example embodiment, there is provided an image sensor including a sensor substrate including a first photosensitive cell and a second photosensitive cell which are configured to sense light incident on the sensor substrate, a color separating lens array configured to change a phase of first wavelength light and a phase of second wavelength light different from each other such that the first wavelength light included in light incident on the color separating lens array travels to the first photosensitive cell and the second wavelength light included in the light incident on the color separating lens array travels to the second photosensitive cell, a spectrum shaping layer including a plurality of nanostructures that respectively has a first refractive index and a dielectric material disposed between the plurality of nanostructures and respectively having a second refractive index, the spectrum shaping layer being disposed between the sensor substrate and the color separating lens array and configured to shape a spectral profile of the light incident on the sensor substrate by reflecting and/or absorbing portion of light passing through the color separating lens array, and an optical filter layer disposed on the color separating lens array, the optical filter layer being configured to block infrared or ultraviolet light among the light incident on the color separating lens array, wherein a thickness of the color separating lens array is greater than a thickness of the spectrum shaping layer.

BRIEF DESCRIPTION OF THE DRAWINGS

The above and/or other aspects, features, and advantages of certain example embodiments of the disclosure will be more apparent from the following description taken in conjunction with the accompanying drawings, in which:

FIG. 1 is a block diagram of an image sensor according to an example embodiment;

FIGS. 2A, 2B, and 2C are diagrams showing various pixel arrangements in a pixel array of an image sensor;

FIG. 10A is a perspective view of a first shaper of FIGS. 4A and 4B, FIG. 10B is a cross-sectional view taken along line III-III' of FIG. 10A.

DETAILED DESCRIPTION

Figure 2A:
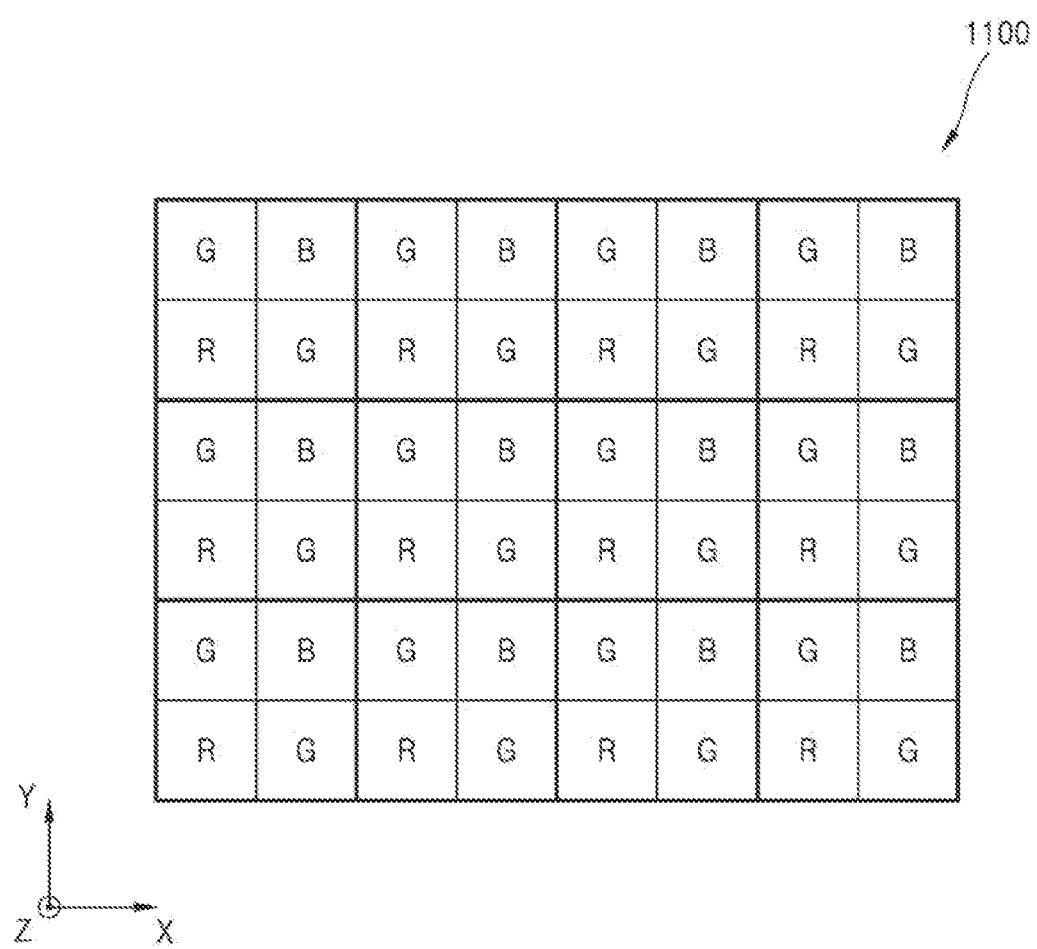

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, an image sensor including a color separating lens array and an electronic device including the image sensor will be described in detail with reference to accompanying drawings. The example embodiments of the disclosure are capable of various modifications and may be embodied in many different forms. In the drawings, like reference numerals denote like components, and sizes of components in the drawings may be exaggerated for convenience of explanation.

When a layer, a film, a region, or a panel is referred to as being "on" another element, it may be directly on/under/at left/right sides of the other layer or substrate, or intervening layers may also be present.

It will be understood that although the terms "first," "second," etc. may be used herein to describe various components, these components should not be limited by these terms. These components are only used to distinguish one component from another. These terms do not limit that materials or structures of components are different from one another.

An expression used in the singular encompasses the expression of the plural, unless it has a clearly different meaning in the context. It will be further understood that when a portion is referred to as "comprises" another component, the portion may not exclude another component but may further comprise another component unless the context states otherwise.

In addition, the terms such as " . . . unit", "module", etc. provided herein indicates a unit performing a function or operation, and may be realized by hardware, software, or a combination of hardware and software.

The use of the terms of "the above-described" and similar indicative terms may correspond to both the singular forms and the plural forms.

Also, the steps of all methods described herein may be performed in any suitable order unless otherwise indicated herein or otherwise clearly contradicted by context. Also, the use of all exemplary terms (for example, etc.) is only to describe a technical spirit in detail, and the scope of rights is not limited by these terms unless the context is limited by the claims.

FIG. 1 is a schematic block diagram of an image sensor 1000 according to an example embodiment. Referring to FIG. 1, the image sensor 1000 may include a pixel array 1100, a timing controller 1010, a row decoder 1020, and an output circuit 1030. The image sensor 1000 may include a charge coupled device (CCD) image sensor or a complementary metal oxide semiconductor (CMOS) image sensor that converts an optical image into an electrical signal.

The pixel array 1100 includes pixels that are two-dimensionally arranged in a plurality of rows and columns. The row decoder 1020 selects one of the rows in the pixel array 1100 in response to a row address signal output from the timing controller 1010. The output circuit 1030 outputs a photosensitive signal, in a column unit, from a plurality of pixels arranged in the selected row. To this end, the output circuit 1030 may include a column decoder and an analog-to-digital converter (ADC). For example, the output circuit 1030 may include a column decoder and a plurality of ADCs arranged respectively for the columns in the pixel array 1100 or one ADC arranged at an output end of a column decoder. The timing controller 1010, the row decoder 1020, and the output circuit 1030 may be implemented as one chip or in separate chips. A processor for processing an image signal output from the output circuit 1030 may be implemented as one chip with the timing controller 1010, the row decoder 1020, and the output circuit 1030.

The pixel array 1100 may include a plurality of pixels that sense light of different wavelengths. The arrangement of the pixels may be implemented in various ways. For example, FIGS. 2A to 2C show various pixel arrangements of the pixel array 1100.

FIG. 2A shows a Bayer pattern that is adopted in the image sensor 1000. Referring to FIG. 2A, one unit pattern includes four quadrant regions, and first through fourth quadrants may be a blue pixel B, a green pixel G, a red pixel R, and a green pixel G, respectively. The unit patterns may be repeatedly and two-dimensionally arranged in a first direction (X-direction) and a second direction (Y-direction). For example, two green pixels G are arranged in one diagonal direction and one blue pixel B and one red pixel R are arranged in another diagonal direction in a unit pattern of a 2×2 array. In the entire arrangement of pixels, a first row in which a plurality of green pixels G and a plurality of blue pixels B are alternately arranged in the first direction and a second row in which a plurality of red pixels R and a plurality of green pixels G are alternately arranged in the first direction are repeatedly arranged in the second direction.

The arrangement of the pixel array 1100 may have various types, in addition to the Bayer pattern. For example, referring to FIG. 2B, a CYGM arrangement, in which a magenta pixel M, a cyan pixel C, a yellow pixel Y, and a green pixel G configure one unit pattern, may be used. Also, referring to FIG. 2C, an RGBW arrangement, in which a green pixel G, a red pixel R, a blue pixel, and a white pixel W configure one unit pattern, may be used. The unit pattern may have a 3×2 array. In addition to the above examples, the pixels in the pixel array 1100 may be arranged in various ways according to color characteristics of the image sensor 1000. Hereinafter, it will be described that the pixel array 1100 in the image sensor 1000 has the Bayer pattern, but an operating principle also applies to other types of pixel arrangements than the Bayer pattern.

Figure 3A:
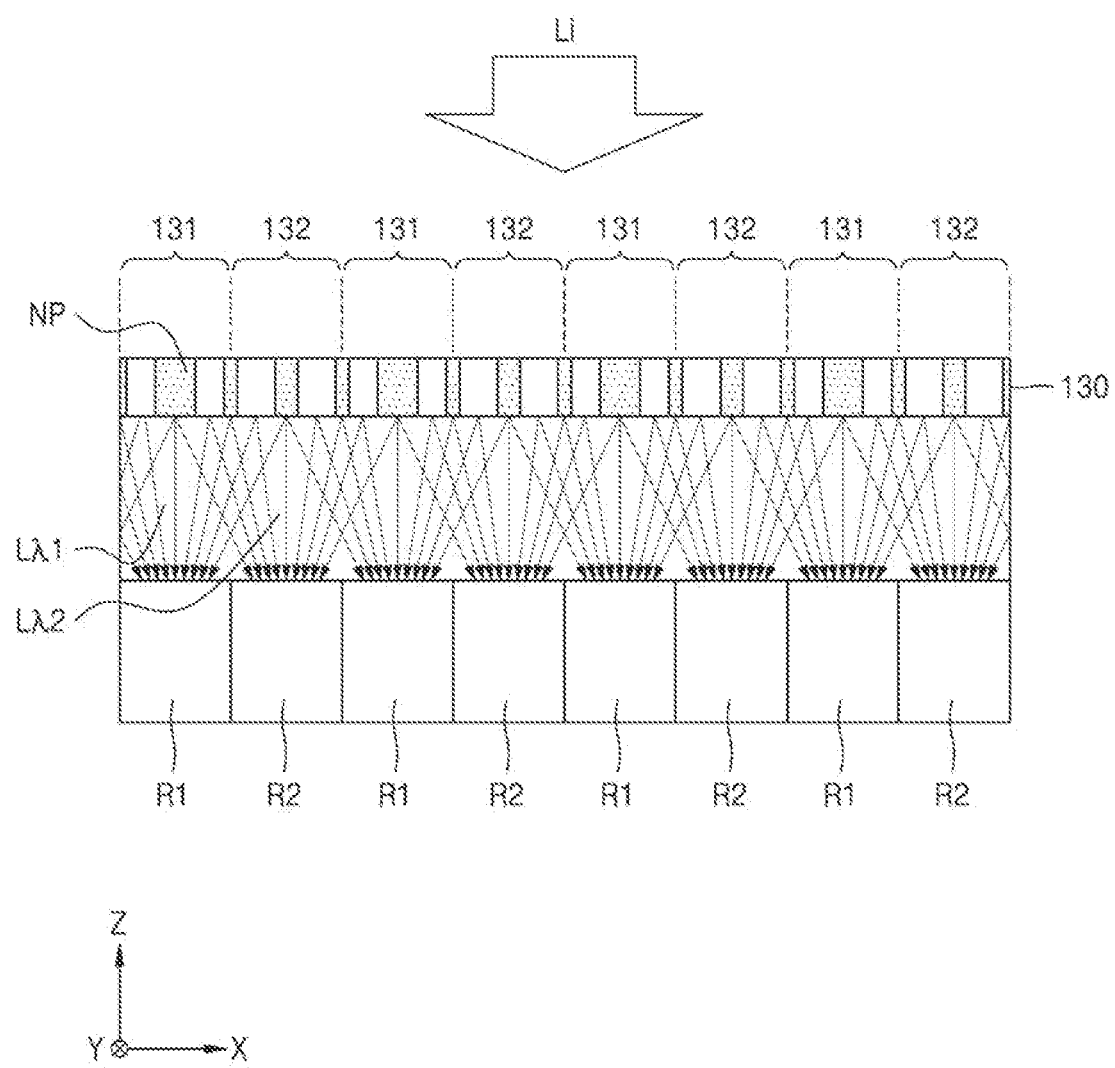
FIGS. 3A and 3B are conceptual diagrams showing a schematic structure and operations of a color separating lens array according to an example embodiment.
Figure 3B:
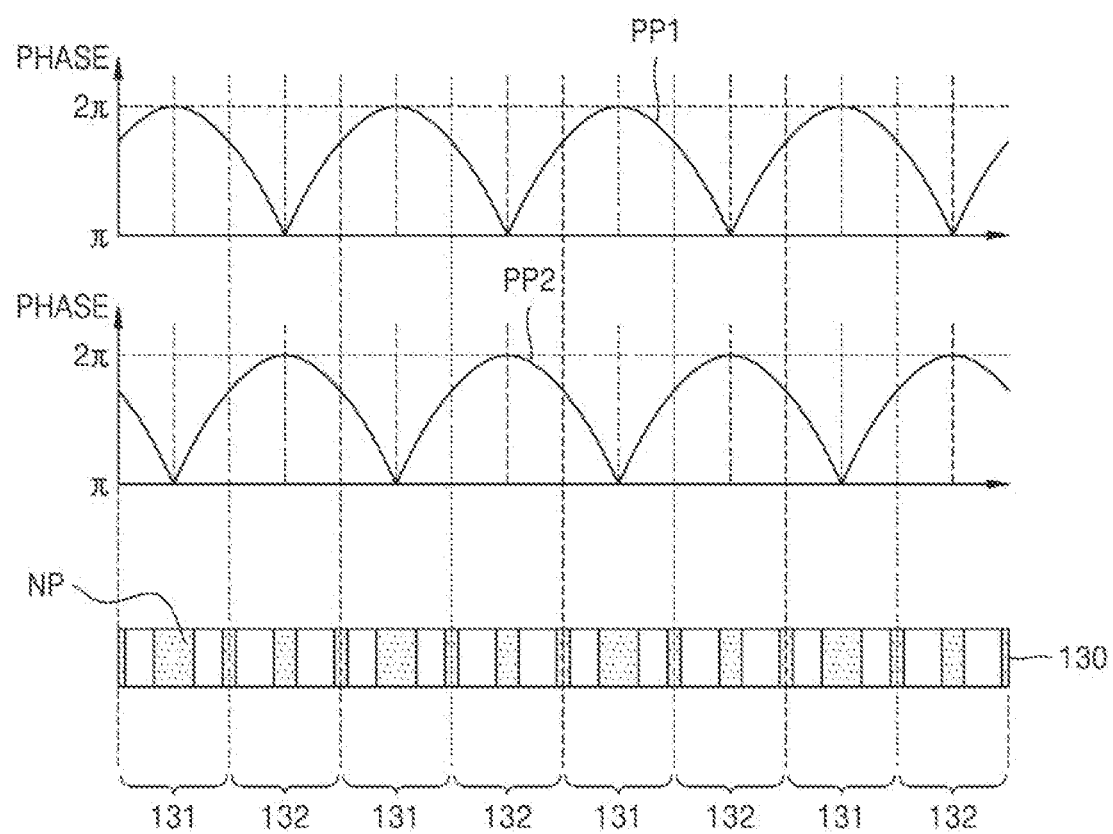

The pixel array 1100 of the image sensor 1000 may include a color separating lens array that condenses light of a color corresponding to each pixel. FIGS. 3A and 3B are conceptual diagrams showing a schematic structure and operations of a color separating lens array 130 according to an example embodiment.

Referring to FIG. 3A, the color separating lens array 130 may include nanoposts NP that change a phase of incident light Li differently according to an incidence location, and may be divided into a first region 131 corresponding to a first target region R1 on which first wavelength light Lλ1 included in the incident light Li is condensed, and a second region 132 corresponding to a second target region R2 on which second wavelength light Lλ2 included in the incident light Li is condensed. Each of the first region 131 and the second region 132 may include one or a plurality of nanoposts NP. The first region 131 and the second region 132 may respectively face the first target region R1 and the second target region R2.

The color separating lens array 130 may form different phase profiles in first wavelength light Lλ1 and second wavelength light Lλ2 included in the incident light Li so that the first wavelength light Lλ1 may be condensed on the first target region R1 and the second wavelength light Lλ2 may be condensed on the second target region R2.

For example, referring to FIG. 3B, the color separating lens array 130 may allow the first wavelength light Lλ1 to have a first phase profile PP1 and the second wavelength light Lλ2 to have a second phase profile PP2 at a location right after passing through the color separating lens array 130, at a lower surface location of the color separating lens array 130, so that the first wavelength light Lλ1 and the second wavelength light Lλ2 may be condensed on the respective corresponding first and second target regions R1 and R2. For example, the first wavelength light Lλ1 passing through the color separating lens array 130 may have the phase profile PP1 that is the largest at the center of the first region 131, and is reduced in a direction away from the center of the first region 131, for example, in a direction of the second region 132. This phase profile may be similar to a phase profile of light converging to a point through a convex lens, for example, a microlens having a convex center, and the first wavelength light Lλ1 may be condensed on the first target region R1. In addition, the second wavelength light Lλ2 passing through the color separating lens array 130 may have the phase profile PP2 that is the largest at the center of the second region 132, and is reduced in a direction away from the center of the second region 132, for example, in a direction of the first region 131, and may be condensed on the second target region R2.

Because the refractive index of a material appears differently depending on the wavelength of reacting light, as shown in FIG. 3B, the color separating lens array 130 may provide different phase profiles with respect to the first wavelength light Lλ1 and the second wavelength light Lλ2. For example, because the same material has a different refractive index according to the wavelength of light reacting to the material and a phase delay experienced by light when passing through the material is also different for each wavelength, a different phase profile may be formed for each wavelength. For example, the refractive index of the first region 131 with respect to the first wavelength light Lλ1 may be different from the refractive index of the first region 131 with respect to the second wavelength light Lλ2, and the phase delay experienced by the first wavelength light Lλ1 passing through the first region 131 and the phase delay experienced by the second wavelength light Lλ2 passing through the first region 131 may be different from each other. Thus, the color separating lens array 130 designed considering the characteristics of light may provide different phase profiles with respect to the first wavelength light Lλ1 and the second wavelength light Lλ2.

The color separating lens array 130 may include the nanoposts NP arranged based on a specific rule so that the first wavelength light Lλ1 and the second wavelength light Lλ2 have first and second phase profiles PP1 and PP2, respectively. Here, the specific rule may be applied to parameters, such as the shape of the nanoposts NP, sizes (for example, width and height), a distance between the nanoposts NP, and the arrangement form thereof, and these parameters may be determined according to a phase profile to be implemented through the color separating lens array 130.

A rule in which the nanoposts NP are arranged in the first region 131, and a rule in which the nanoposts NP are arranged in the second region 132 may be different from each other. For example, the shape, size, space, and/or arrangement of the nanoposts NP included in the first region 131 may be different from the shape, size, space, and/or arrangement of the nanoposts NP included in the second region 132.

The cross-sectional diameters of the nanoposts NP may have sub-wavelength dimensions. Here, the sub-wavelength refers to a wavelength less than a wavelength band of light to be branched. The nanoposts NP may have dimensions less than a shorter wavelength among first and second wavelengths. When the incident light Li is a visible ray, the cross-sectional diameters of the nanoposts NP may have dimensions such as, for example, less than 400 nm, 300 nm, or 200 nm. Meanwhile, the heights of the nanoposts NP may be, for example, 500 nm to 1500 nm, and may be larger than the cross-sectional diameters of the nanoposts NP. The nanoposts NP may be a combination of two or more posts stacked in a height direction (Z direction).

The nanoposts NP may include a material having a higher refractive index than that of a peripheral material. For example, the nanoposts NP may include c-Si, p-Si, a-Si, and a Group III-V compound semiconductor (gallium phosphide (GaP), gallium nitride (GaN), gallium arsenide (GaAs) etc.), silicon carbide (SiC), titanium oxide ($TiO_2$), silicon nitride (SiN), and/or a combination thereof. The nanoposts NP having a difference in a refractive index from the refractive index of the peripheral material may change a phase of light that passes through the nanoposts NP. This is caused by a phase delay due to the shape dimension of the sub-wavelength of the nanoposts NP, and a degree of the phase delay may be determined by detailed shape dimensions, arrangement types, etc. of the nanoposts NP. The peripheral material of the nanoposts NP may include a dielectric material having a lower refractive index than that of the nanoposts NP, for example, silicon oxide ($SiO_2$) or air.

The first wavelength and the second wavelength may be in a wavelength band of visible rays, but are not limited thereto. The first wavelength and the second wavelength may be in a variety of wavelengths according to the arrangement rule of the nanoposts NP. Although two wavelengths are branched and condensed, incident light may be branched into three or more directions according to wavelengths and condensed.

Hereinafter, an example in which the color separating lens array 130 described above is applied to the pixel array 1100 of the image sensor 1000 will be described below.

Figure 4A:
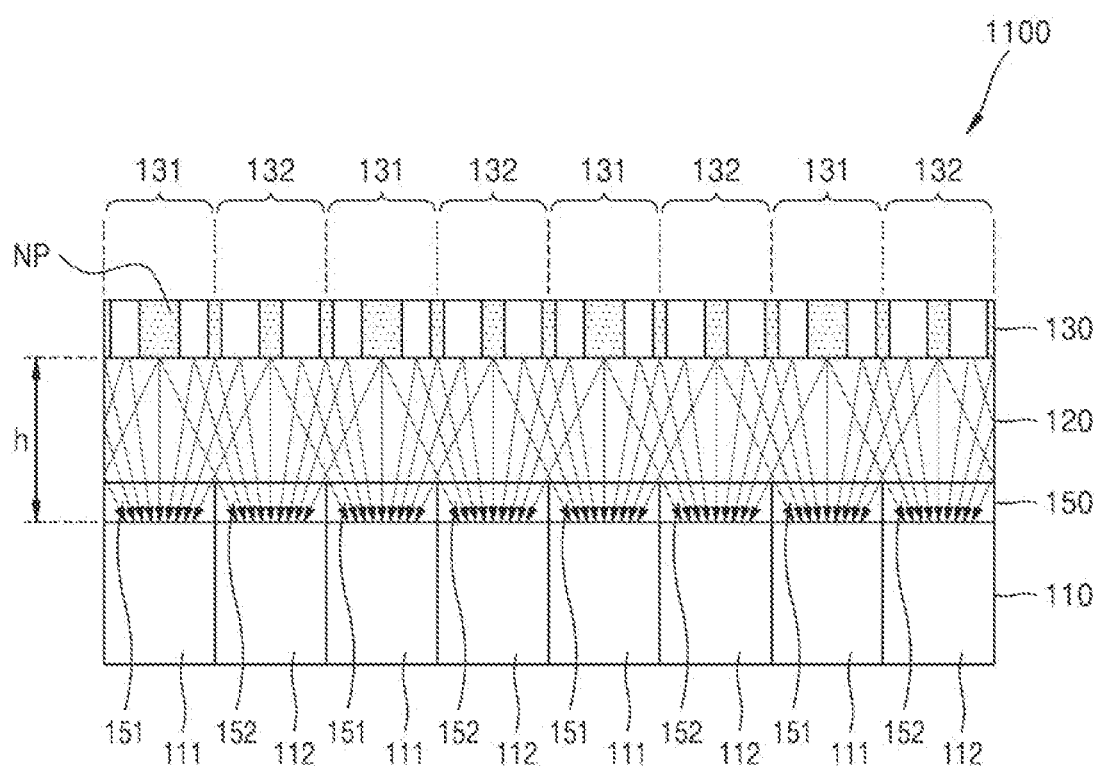
FIGS. 4A and 4B are schematic cross-sectional views of a pixel array in an image sensor according to an example embodiment.
Figure 4B:
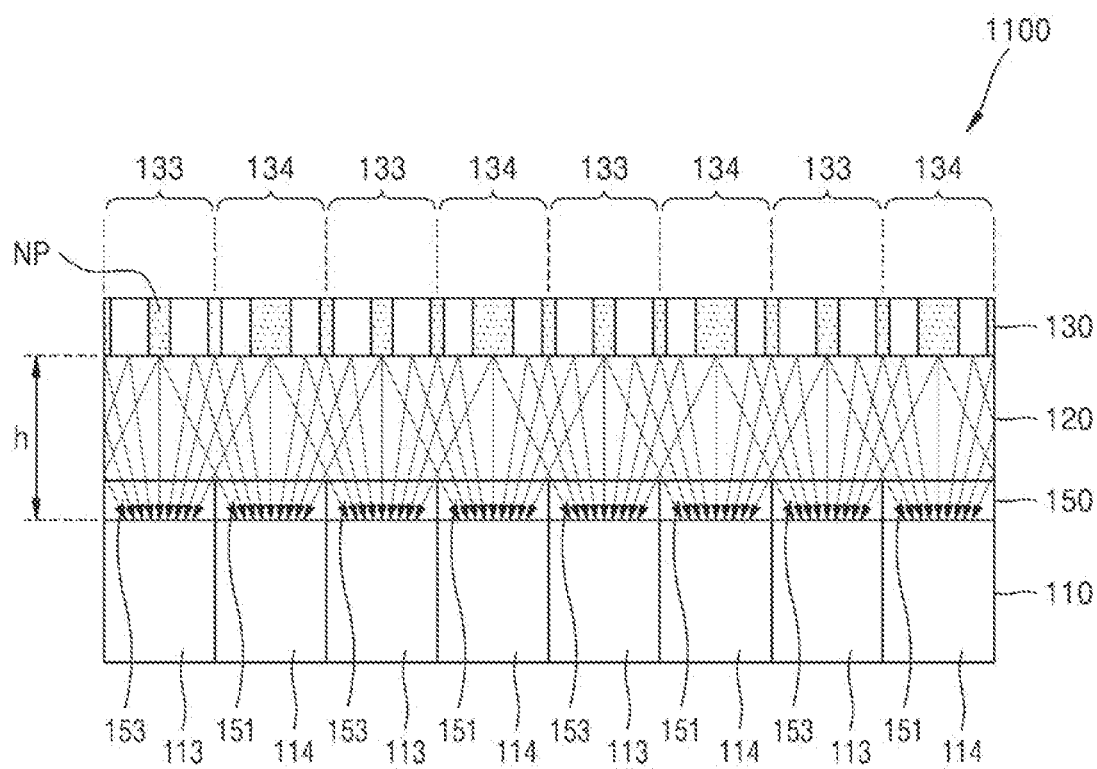
Figure 5A:
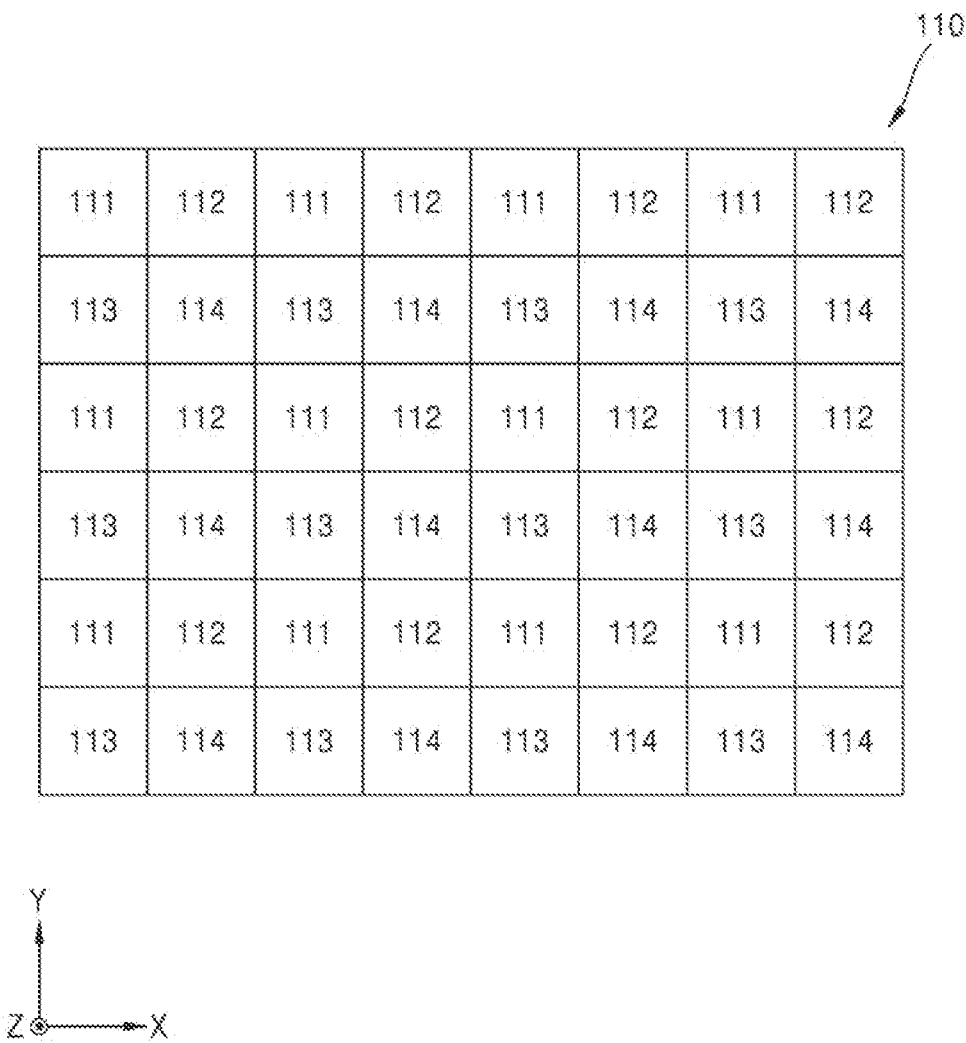
FIG. 5A is a plan view showing a schematic arrangement of photosensitive cells.
Figure 5B:
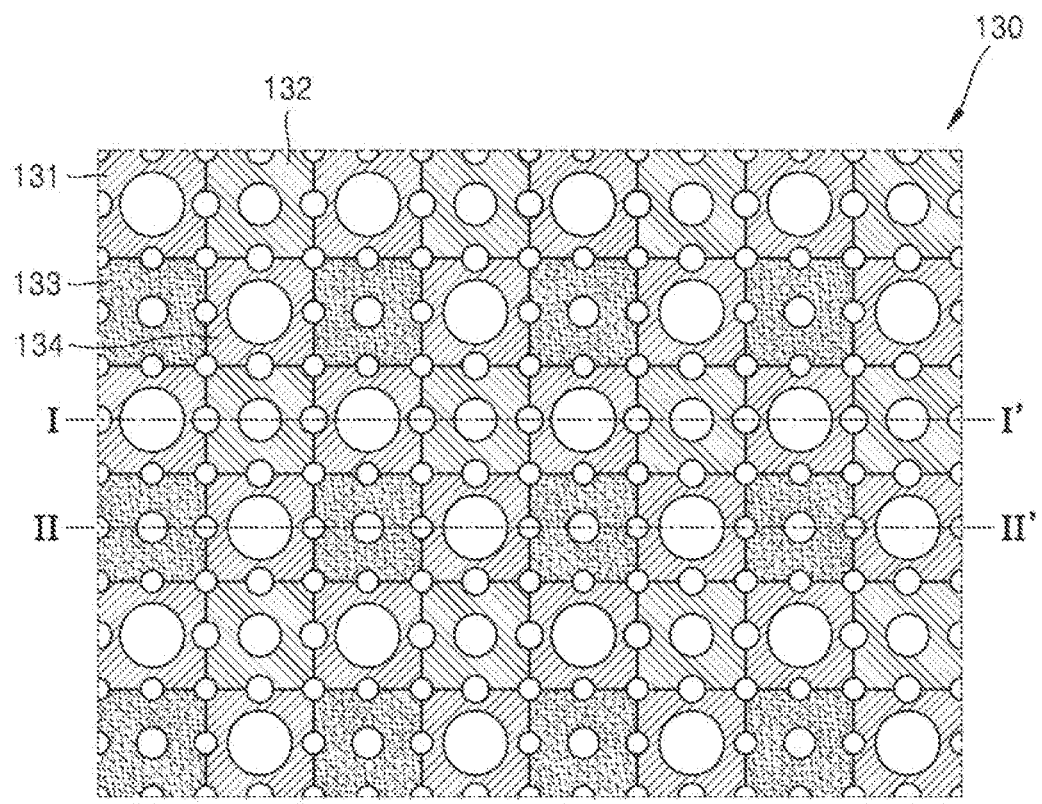
FIG. 5B is a plan view showing an example of an arrangement of nanoposts of a color separating lens array.
Figure 5C:
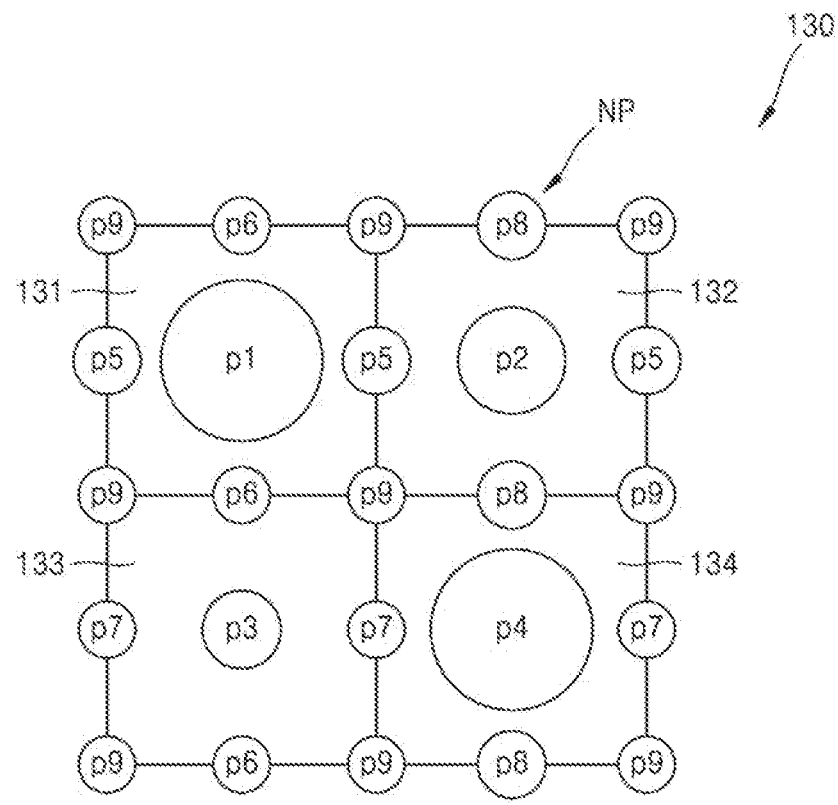
FIG. 5C is a detailed and enlarged plan view of a part of FIG. 5B.

FIGS. 4A and 4B are cross-sectional views of the pixel array 1100 according to an example embodiment, FIG. 5A is a plan view showing an arrangement of photosensitive cells 111, 112, 113, and 114 of the pixel array 1100, FIG. 5B is a plan view showing an example of an arrangement of the nanoposts NP of the color separating lens array 130, and FIG. 5C is a detailed and enlarged plan view of a part of FIG. 5B.

Referring to FIGS. 4A and 4B, the pixel array 1100 may include a sensor substrate 110 including the plurality of photosensitive cells 111, 112, 113, and 114 sensing light, a spectrum shaping layer 150 disposed on the sensor substrate 110, a transparent spacer layer 120 disposed on the spectrum shaping layer 150, and the color separating lens array 130 on the spacer layer 120.

The sensor substrate 110 may include a first photosensitive cell 111, a second photosensitive cell 112, a third photosensitive cell 113, and a fourth photosensitive cell 114 that convert light into electrical signals. Among the first to fourth photosensitive cells 111, 112, 113, and 114, as shown in FIG. 4A, the first photosensitive cell 111 and the second photosensitive cell 112 may be alternately arranged in the first direction (X-direction), and in a cross-section in which a y-direction location is different from FIG. 4A, as shown in FIG. 4B, the third and fourth photosensitive cells 113 and 114 may be alternately arranged in the first direction (X-direction). FIG. 5A shows an arrangement of the photosensitive cells 111, 112, 113, and 114 when the pixel array 1100 has the Bayer pattern as shown in FIG. 2A. This arrangement is for individually sensing incident light with a unit pattern such as the Bayer pattern. For example, the first and fourth light photosensitive cells 111 and 114 may sense first wavelength light, the second photosensitive cell 112 may sense second wavelength light, and the third light photosensitive cell 113 may sense third wavelength light. Hereinafter, the first wavelength light is illustrated as green light, the second wavelength light is illustrated as blue light, and the third wavelength light is illustrated as red light, and the first and fourth photosensitive cells 111 and 114 may correspond to a green pixel G, the second photosensitive cell 112 may correspond to a blue pixel B, and the third photosensitive cell 113 may correspond to a red pixel R. A separator for separating cells may be further formed in a boundary between cells.

The spectrum shaping layer 150 may shape a spectrum distribution by absorbing and/or reflecting part of incident light before the light branched by the color separating lens array 130 is incident on each of the photosensitive cells 111, 112, 113, and 114. The spectrum shaping layer 150 may include a first shaper 151, a second shaper 152, and a third shaper 153 respectively corresponding to the green G pixel, blue B pixel, and red R pixel. For example, the spectrum shaping layer 150 may include the first shaper 151 disposed on the first and fourth photosensitive cells 111 and 114 corresponding to the green pixel G, the second shaper 152 disposed on the second photosensitive cell 112 corresponding to the blue pixel B, and the third shaper 153 disposed on the third photosensitive cell 113 corresponding to the red pixel R. In the example embodiments with reference to FIGS. 4A and 4B, a structure in which the spectrum shaping layer 150 is formed on all of the photosensitive cells 111, 112, 113, and 114 is illustrated, however, embodiments are not limited thereto, and the spectrum shaping layer 150 may be formed only on some of the photosensitive cells 111, 112, 113, and 114. For example, the first shaper 151 may be disposed only on the first and fourth photosensitive cells 111 and 114, whereas the spectrum shaping layer 150 may not be disposed on the second and third photosensitive cells 112 and 113. A detailed structure of each of the first to third shapers 151, 152, and 153 will be described below with reference to FIGS. 10A to 12E.

The spacer layer 120 may be disposed between the sensor substrate 110 and the color separating lens array 130 to maintain a constant gap between the sensor substrate 110 and the color separating lens array 130. The spacer layer 120 may include a transparent material with respect to the visible ray, for example, a dielectric material having a lower refractive index than that of the nanoposts NP and a low absorption coefficient in the visible ray band, for example, $SiO_2$, siloxane-based spin on glass (SOG), etc. The spectrum shaping layer 150 described above may be regarded as a structure buried in the spacer layer 120. The thickness h of the spacer layer 120 may be selected to be within the range of $h_t-p \leq h \leq h_t+p$. In this regard, when a theoretical thickness $h_t$ of the spacer layer 120 may be expressed by Equation 1 below when a refractive index of the spacer layer 120 with respect to a wavelength $\lambda_0$ is n, a pitch of a photosensitive cell is p.

$$h_t = \frac{np^2}{\lambda_0} - \frac{\lambda_0}{4n} \qquad \text{[Equation 1]}$$

The theoretical thickness $h_t$ of the spacer layer 120 may refer to a focal length at which light having a wavelength of $\lambda_0$ is condensed onto a top surface of the photosensitive cells 111, 112, 113, and 114 by the color separating lens array 130. $\lambda_0$ may be a reference wavelength for determining the thickness h of the spacer layer 120, and the thickness of the spacer layer 120 may be designed with respect to 540 nm, which is the central wavelength of green light.

The color separating lens array 130 may be supported by the spacer layer 120 and may include the nanoposts NPs that change the phase of incident light and dielectrics, such as air or $SiO_2$, disposed between the nanoposts NPs and having refractive indexes lower than those of the nanoposts NP.

Referring to FIG. 5B, the color separating lens array 130 may be divided into a first region 131, a second region 132, a third region 133, and a fourth region 134 respectively corresponding to the first to fourth photosensitive cells 111, 112, 113, and 114 of FIG. 5A. The first to fourth regions 131, 132, 133, and 134 may be disposed to face the first to fourth photosensitive cells 111, 112, 113, and 114, respectively. For example, the first region 131 of the color separating lens array 130 may be disposed to correspond to the first photosensitive cell 111, the second region 132 may be disposed to correspond to the second photosensitive cell 112, the third region 133 may be disposed to correspond to the third photosensitive cell 113, and the fourth region 134 may be disposed to correspond to the fourth photosensitive cell 114. The first to fourth regions 131, 132, 133, and 134 may be two-dimensionally arranged in the first direction (X direction) and the second direction (Y direction) so that a first row in which the first and second regions 131 and 132 are alternately arranged, and a second row in which the third and fourth regions 133 and 134 are alternately arranged are alternately repeated to each other. The color separating lens array 130 may also include a plurality of two-dimensionally arranged unit patterns like a photosensitive cell array of the sensor substrate 110, and each unit pattern may include the first to fourth regions 131, 132, 133 and 134 arranged in a 2×2 form.

FIGS. 4A and 4B show a structure in which the first to fourth regions 131, 132, 133, and 134 and the first to fourth photosensitive cells 111, 112, 113, and 114 have the same size and face each other in a vertical direction as an example, but the color separating lens array 130 may be divided into a plurality of regions defined in other forms, such as a region for condensing first wavelength light, a region for condensing second wavelength light, etc.

The color separating lens array 130 may include the nanoposts NP of which the size, shape, space and/or arrangement are determined so that the first wavelength light is branched and condensed on the first photosensitive cell 111 and the fourth photosensitive cell 114, the second wavelength light is branched and condensed on the second photosensitive cell 112, and the third wavelength light is branched and condensed on the third photosensitive cell 113. Meanwhile, the thickness (Z direction) of the color separating lens array 130 may be similar to the heights of the nanoposts NP, and may be, for example, about 500 nm to about 1500 nm.

Referring to FIG. 5B, the first to fourth regions 131, 132, 133, and 134 may include the nanoposts NP each having a cylindrical shape of a circular cross-section. The nanoposts NP having different cross-sectional areas from one another are arranged on the center of each of the first to fourth regions 131, 132, 133, and 134. The nanoposts NP may be also arranged on the center of a boundary between pixels and a crossing point of the pixel boundaries. The cross-sectional area of the nanoposts NP arranged at the boundary between pixels may be less than those of the nanoposts NP arranged at the center of the pixel.

FIG. 5C is a detailed view of the arrangement of the nanoposts NP in partial regions of FIG. 5B, that is, the first to fourth regions 131, 132, 133, and 134 constituting the unit pattern. In FIG. 5C, the nanoposts NP are indicated as p1 to p9 according to detailed locations thereof in the unit pattern. Referring to FIG. 5C, from among the nanoposts NP, a nanopost p1 on the center of the first region 131 and a nanopost p4 on the center of the fourth region 134 have larger cross-sectional areas than those of a nanopost p2 on the center of the second region 132 or a nanopost p3 on the center of the third region 133, and the nanopost p2 on the center of the second region 132 has a larger cross-sectional area than that of the nanopost p3 on the center of the third region 133. However, embodiments are not limited to the above example, and if necessary, the nanoposts NP having various shapes, sizes, and arrangements may be applied.

The nanoposts NP included in the first and fourth regions 131 and 134 corresponding to the green pixel G may have different distribution rules in the first direction (X direction) and the second direction (Y direction). For example, the nanoposts NP arranged in the first and fourth regions 131 and 134 may have different size arrangements in the first direction (X direction) and the second direction (Y direction). As shown in FIG. 5C, from among the nanoposts NP, a cross-sectional area of a nanopost p5 located at a boundary between the first region 131 and the second region 132 that is adjacent to the first region 131 in the first direction (X direction) is different from that of a nanopost p6 located at a boundary between the first region 131 and the third region 133 that is adjacent to the first region 131 in the second direction (Y direction). Similarly, a cross-sectional area of a nanopost p7 at the boundary between the fourth region 134 and the third region 133 that is adjacent to the fourth region 134 in the first direction (X direction) is different from that of a nanopost p8 located at the boundary between the fourth region 134 and the second region 132 that is adjacent to the fourth region 134 in the second direction (Y direction).

The nanoposts NP arranged in the second region 132 corresponding to the blue pixel B and the third region 133 corresponding to the red pixel R may have symmetrical distribution rules in the first and second directions (X direction and Y direction). As shown in FIG. 5C, from among the nanoposts NP, the cross-sectional area of the nanoposts p5 at a boundary between adjacent pixels that are adjacent to the second region 132 in the first direction (X direction) and the cross-sectional areas of the nanoposts p8 at a boundary between pixels adjacent to the second region 132 in the second direction (Y direction) are the same as each other, and in the third region 133, the cross-sectional areas of the nanoposts p7 at a boundary between adjacent pixels in the first direction (X direction) and the cross-sectional areas of the nanoposts p6 at a boundary between the adjacent pixels in the second direction (Y direction) are the same as each other.

In addition, the nanoposts p9 at four corners in each of the first to fourth regions 131, 132, 133, and 134, that is, points where the four regions cross one another, have the same cross-sectional areas from one another.

The above distribution is caused by the pixel arrangement in the Bayer pattern. Adjacent pixels to the blue pixel B and the red pixel R in the first direction (X direction) and the second direction (Y direction) are the green pixels G, whereas the adjacent pixel to the green pixel G corresponding to the first region 131 in the first direction (X direction) is the blue pixel B and the adjacent pixel to the green pixel G in the second direction (Y direction) is the red pixel R. In addition, the adjacent pixel to the green pixel G corresponding to the fourth region 134 in the first direction (X direction) is the red pixel R and the adjacent pixel to the green pixel G in the second direction (Y direction) is the blue pixel B. In addition, the green pixels G corresponding to the first and fourth regions 131 and 134 are adjacent to the same pixels, for example, the green pixels G in four diagonal directions, the blue pixel B corresponding to the second region 132 is adjacent to the same pixels, for example, the red pixels R in four diagonal directions, and the red pixel R corresponding to the third region 133 is adjacent to the same pixels, for example, the blue pixels B in four diagonal directions. Therefore, in the second and third regions 132 and 133 respectively corresponding to the blue pixel B and the red pixel R, the nanoposts NP may be arranged in the form of 4-fold symmetry, and in the first and fourth regions 131 and 134 corresponding to the green pixels G, the nanoposts NP may be arranged in the form of 2-fold symmetry. In particular, the first region 131 and the fourth region 134 are rotated by a 90° angle with respect to each other.

The nanoposts NP of FIGS. 5B and 5C have symmetrical circular cross-sectional shapes. However, some nanoposts having asymmetrical cross-sectional shapes may be included. For example, the first and fourth regions 131 and 134 corresponding to the green pixel G may employ the nanoposts having an asymmetrical cross-sectional shape that has different widths in the first direction (X direction) and the second direction (Y direction), and the second and third regions 132 and 133 corresponding to the blue pixel B and the red pixel R may employ the nanoposts having a symmetrical cross-sectional shape having identical widths in the first direction (X direction) and the second direction (Y direction).

The arrangement rule of the color separating lens array 130 is an example for implementing the target phase profile in which light having a first wavelength is branched and condensed onto the first and fourth photosensitive cells 111 and 114, light having a second wavelength is branched and condensed onto the second photosensitive cell 112, and light having a third wavelength is branched and condensed onto the third photosensitive cell 113, however, this arrangement rule is not limited to the illustrated patterns.

Figure 6A:
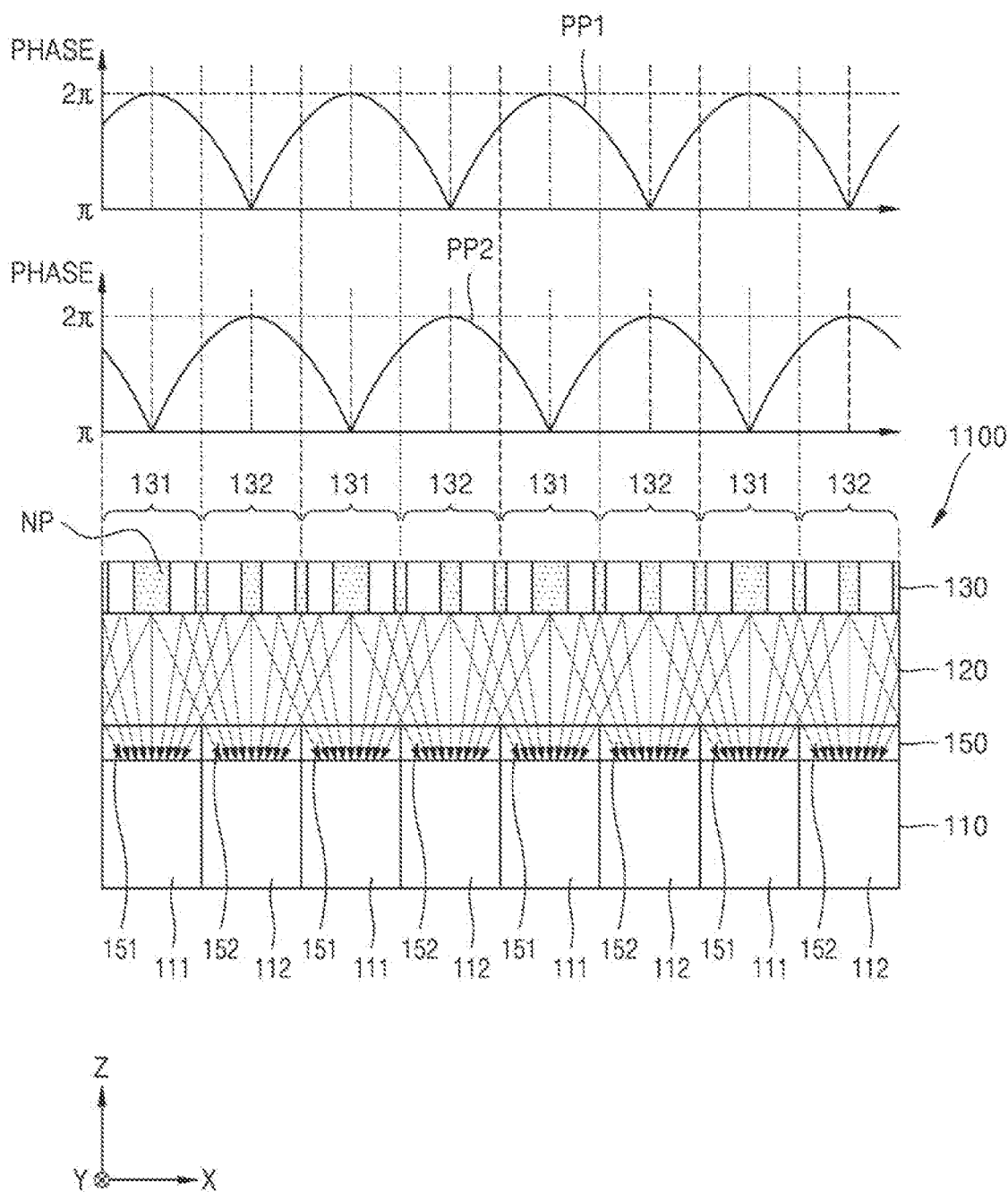
FIG. 6A shows phase profiles of first and second wavelength light passing through a color separating lens array along line I-I' of FIG. 5B.
Figure 6B:
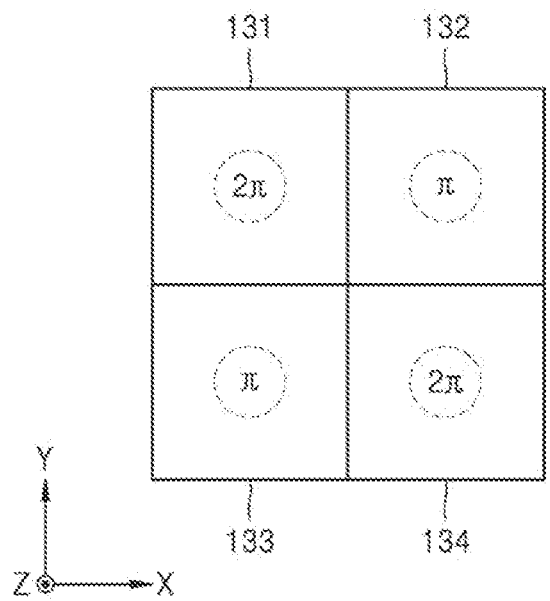
FIG. 6B shows a phase of the first wavelength light passing through the color separating lens array at the center of first to fourth regions.
Figure 6C:
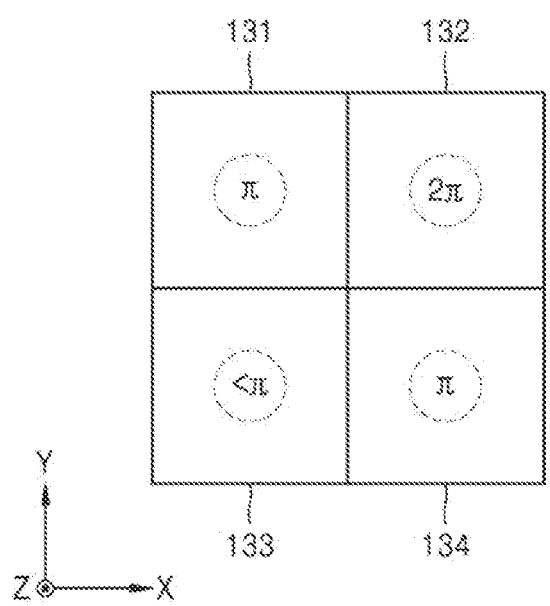
FIG. 6C shows a phase of the second wavelength light passing through the color separating lens array at the center of the first to fourth regions.

FIG. 6A shows the phase profiles PP1 and PP2 of first and second wavelength light passing through the color separating lens array 130 along line I-I' of FIG. 5B, FIG. 6B shows a phase of the first wavelength light passing through the color separating lens array 130 at the center of the first to fourth regions 131, 132, 133 and 134, and FIG. 6C shows a phase of the second wavelength light passing through the color separating lens array 130 at the center of the first to fourth regions 131, 132, 133, and 134. The phase profiles PP1 and PP2 of the first and second wavelength light illustrated in FIG. 6A are the same as the phase profiles PP1 and PP2 of the light of the first and second wavelengths exemplarily described with reference to FIG. 3B.

Referring to FIGS. 6A and 6B, the first wavelength light passing through the color separating lens array 130 may have the phase profile PP1 that is the largest at the center of the first region 131, and is reduced in a direction away from the center of the first region 131. Specifically, the phase of the first wavelength may be the largest at the center of the first region 131, may be gradually reduced in the form of a concentric circle away from the center of the first region 131, may be the smallest at the center of the second and third regions 132 and 133 in the X and Y directions, and may be the smallest at a contact point between the first region 131 and the fourth region 134 in the diagonal direction, at a location right after passing through the color separating lens array 130, at a lower surface location of the color separating lens array 130 or at an upper surface of the spacer layer 120. When $2\pi$ is determined with respect to the phase of the first wavelength light emitted from the center of the first region 131, light of the phase which is $0.9\pi$ to $1.1\pi$ at the center of the second and third regions 132 and 133, of the phase which is $2\pi$ at the center of the fourth region 134, and of the phase which is $1.1\pi$ to $1.5\pi$ at the contact point between the first region 131 and the fourth region 134 may be emitted. The first phase profile PP1 does not mean that a phase delay amount of the light passing through the center of the first region 131 is the largest. When the phase of the light passing through the first region 131 is determined as $2\pi$, a phase value of light passing through another location (when the phase delay is larger than $2\pi$) may be a value remaining by removing by $2n\pi$, that is, a profile of a wrapped phase. For example, when the phase of light passing through the first region 131 is $2\pi$, and the phase of light passing through the center of the second region 132 is $3\pi$, the phase in the second region 132 may be $\pi$ remaining by removing $2\pi$ (when n=1) from $3\pi$.

Referring to FIGS. 6A and 6C, the second wavelength light passing through the color separating lens array 130 may have the phase profile PP2 that is the largest at the center of the second region 132 and is reduced in a direction away from the center of the second region 132. Specifically, the phase of the second wavelength may be the largest at the center of the second region 132, may be gradually reduced in the form of a concentric circle away from the center of the second region 132, may be the smallest at the center of the first and fourth regions 131 and 134 in the X and Y directions, and may be the smallest at the center of the third region 133 in the diagonal direction, at a location right after passing through the color separating lens array 130. When the phase of the second wavelength light at the center of the second region 132 is $2\pi$, the phase of the second wavelength light may be 0.97 to $1.1\pi$ at the center of the first and fourth regions 131 and 134, and may be a value less than $\pi$, for example, $0.2\pi$ to $0.9\pi$, at the center of the third region 133.

Figure 6D:
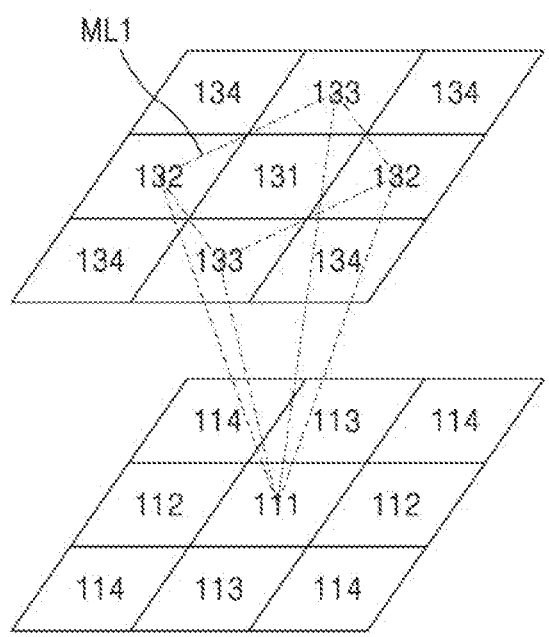
FIG. 6D shows a traveling direction of first wavelength light incident on a first region of the color separating lens array of FIGS. 6A and 6B and the periphery thereof.
Figure 6E:
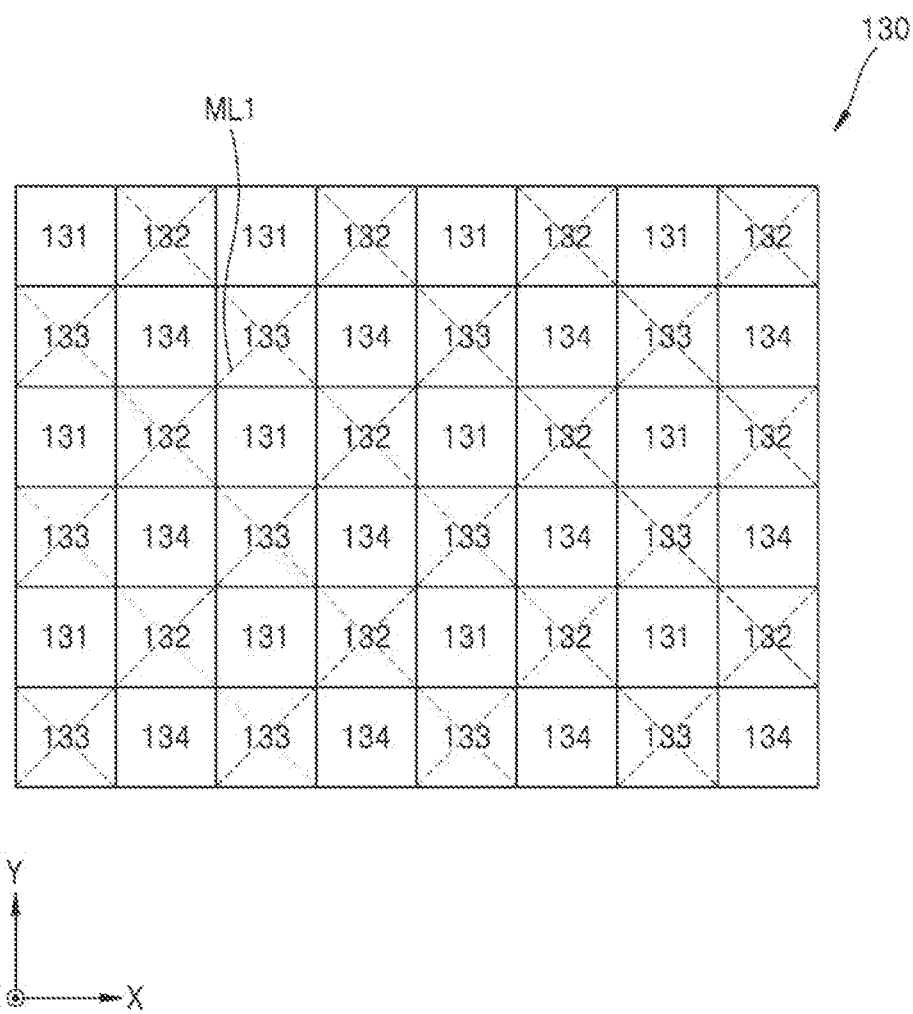
FIG. 6E shows a microlens array equivalent to the color separating lens array with respect to the first wavelength light.

FIG. 6D shows a traveling direction of the first wavelength light incident on the first region 131 of the color separating lens array 130 corresponding to the first photosensitive cell 111 and the periphery of the color separating lens array 130, and FIG. 6E shows a microlens array equivalent to the color separating lens array 130 with respect to the first wavelength light.

The first wavelength light incident on the periphery of the first region 131 is condensed on the first photosensitive cell 111 by the color separating lens array 130 as shown in FIG. 6D, and the first wavelength light from the first to third regions 131, 132, and 133 is incident on the first photosensitive cell 111. The phase profile of the first wavelength light described with respect to FIGS. 6A and 6B is similar to a phase profile of light passing through a virtual first microlens ML1 by connecting the centers of two second regions 132 and two third regions 133 adjacent to the first region 131 with one side facing each other. Accordingly, as shown in FIG. 6E, the color separating lens array 130 may be equivalent to an array of the plurality of first microlenses ML1 arranged based on the first region 131 with respect to the first wavelength light incident on the periphery of the first region 131. Because each of the equivalent first microlenses ML1 has a larger area than the corresponding first photosensitive cell 111, not only the first wavelength light incident on the first region 131 but also the first wavelength light incident on the second and third regions 132 and 133 may also be condensed on the first photosensitive cell 111. For example, the area of the first microlens ML1 may be 1.2 times to 2 times larger than the area of the corresponding first photosensitive cell 111.

Figure 6F:
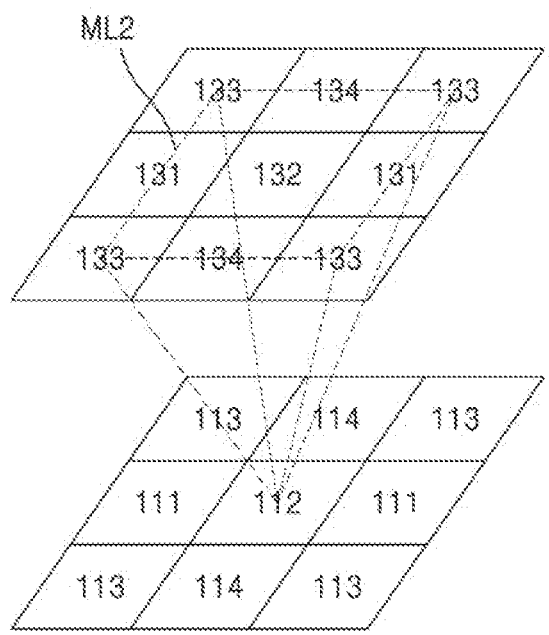
FIG. 6F shows a traveling direction of second wavelength light incident on a second region of the color separating lens array of FIGS. 6A and 6B and the periphery thereof.
Figure 6G:
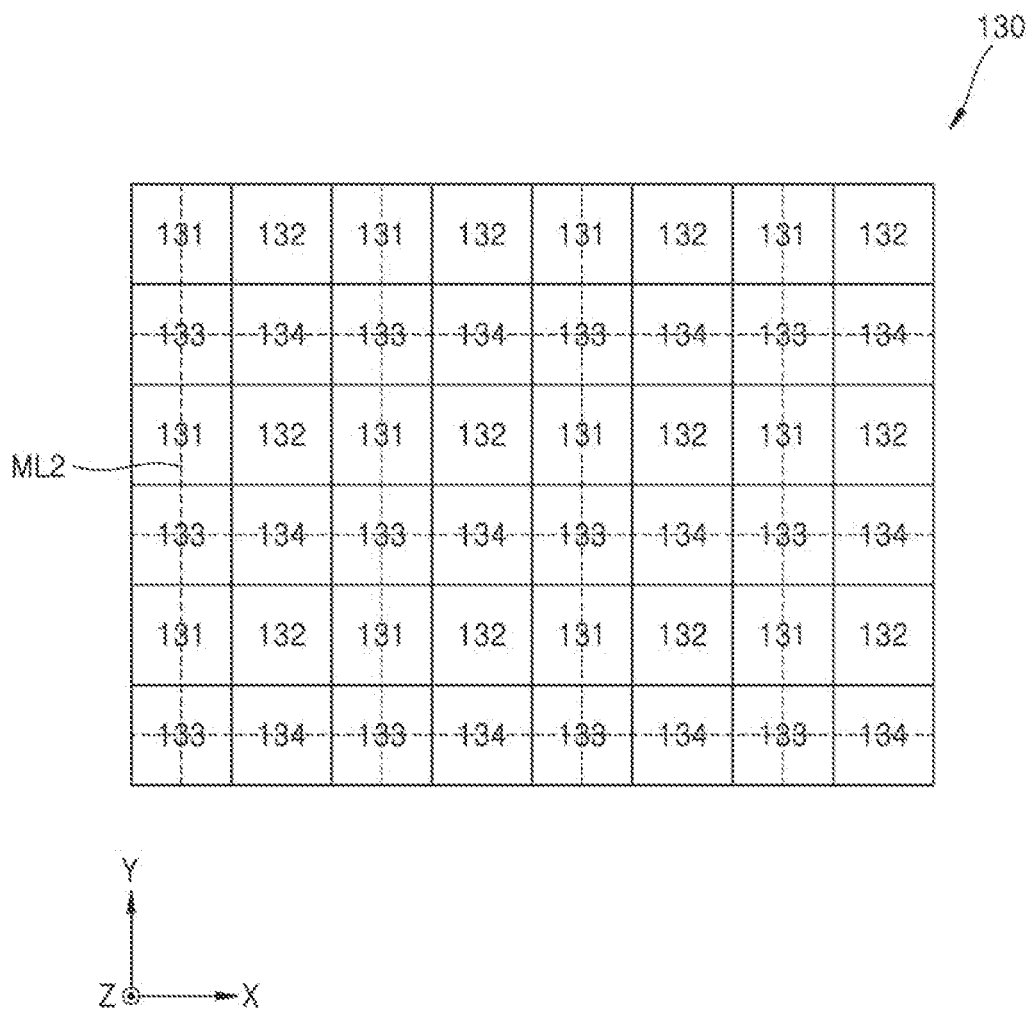
FIG. 6G shows a microlens array equivalent to the color separating lens array with respect to the second wavelength light.

FIG. 6F shows a traveling direction of the second wavelength light incident on the second region 132 of the color separating lens array 130 corresponding to the second photosensitive cell 112 and the periphery of the color separating lens array 130, and FIG. 6G shows a microlens array equivalent to the color separating lens array 130 with respect to the second wavelength light.

The second wavelength light is condensed on the second photosensitive cell 112 by the color separating lens array 130 as shown in FIG. 6F, and the second wavelength light from the first to fourth regions 131, 132, 133, and 134 is incident on the second photosensitive cell 112. The phase profile of the second wavelength light described above with reference to FIGS. 6A and 6C is similar to a phase profile of light passing through a virtual second microlens ML2 by connecting the centers of four third regions 133 adjacent to the second region 132 with vertexes facing each other. Accordingly, as shown in FIG. 6G, the color separating lens array 130 may be equivalent to an array of the plurality of second microlenses ML2 arranged based on the second region 132 with respect to the second wavelength light. Because each of the second micro lenses ML2 is larger than the corresponding second photosensitive cell 112, not only the second wavelength light incident in a direction of the second photosensitive cell 112 but also the second wavelength light incident in directions of the first, third, and fourth photosensitive cells 111, 113, and 114 may also be condensed on the second photosensitive cell 112. For example, the area of the second microlens ML2 may be 1.5 to 4 times larger than the area of the corresponding second photosensitive cell 112.

Figure 7A:
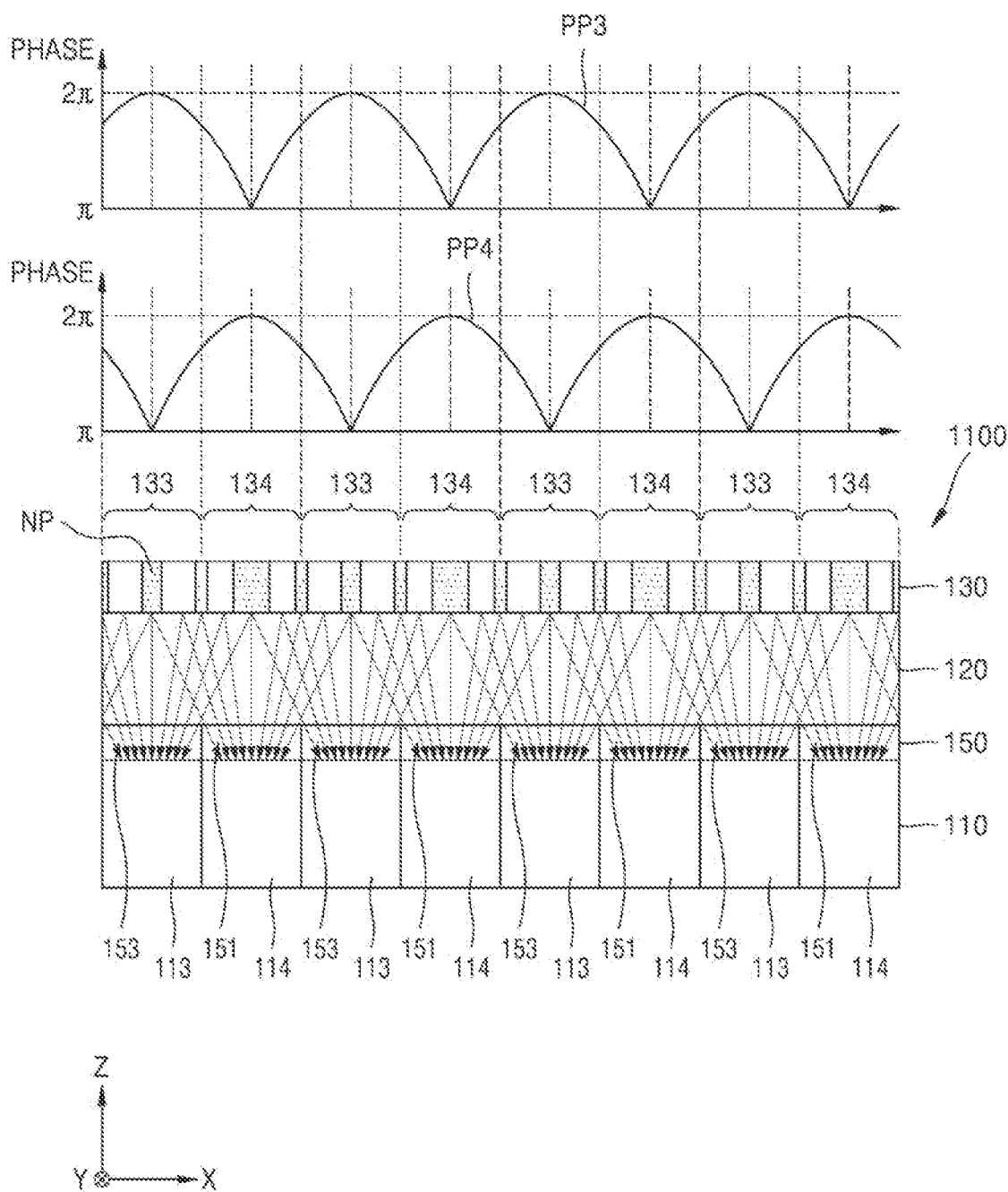
FIG. 7A shows phase profiles of first and third wavelength light passing through a color separating lens array along line II-II' of FIG. 5B.
Figure 7B:
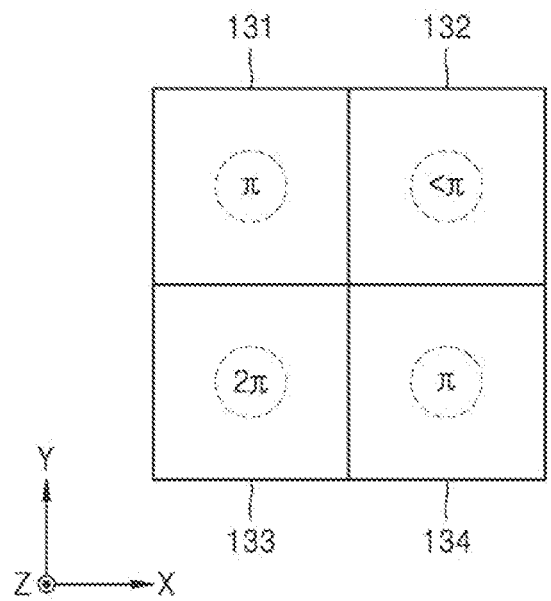
FIG. 7B shows a phase of third wavelength light passing through the color separating lens array at the center of first to fourth regions.
Figure 7C:
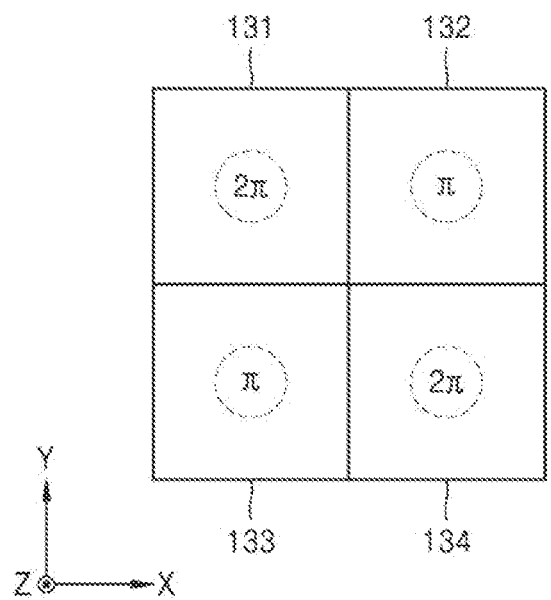
FIG. 7C shows a phase of the first wavelength light passing through the color separating lens array at the center of the first to fourth regions.

FIG. 7A shows phase profiles PP3 and PP4 of first and third wavelength light passing through the color separating lens array 130 along line II-II' of FIG. 5B, FIG. 7B shows a phase of the third wavelength light passing through the color separating lens array 130 at the center of the first to fourth regions 131, 132, 133, and 134, and FIG. 7C shows a phase of the first wavelength light passing through the color separating lens array 130 at the center of the first to fourth regions 131, 132, 133, and 134.

Referring to FIGS. 7A and 7B, the third wavelength light passing through the color separating lens array 130 may have the third phase profile PP3 similar to that of the second wavelength light with respect to the second region 132 described above. The phase profile PP3 may be the largest at the center of the third region 133 and reduced in a direction away from the center of the third region 133. Specifically, the phase of the third wavelength light may be the largest at the center of the third region 133, may be gradually reduced in the form of a concentric circle away from the center of the third region 133, may be the smallest at the center of the first and fourth regions 131 and 134 in the X and Y directions, and may be the smallest at the center of the second region 132 in the diagonal direction, at a location right after passing through the color separating lens array 130. When the phase of the third wavelength light at the center of the third region 133 is $2\pi$, the phase of the third wavelength light may be $0.9\pi$ to $1.1\pi$ at the center of the first and fourth regions 131 and 134, and may be a value less than $\pi$, about $0.2\pi$ to $0.9\pi$, at the center of the second region 132.

Figure 7D:
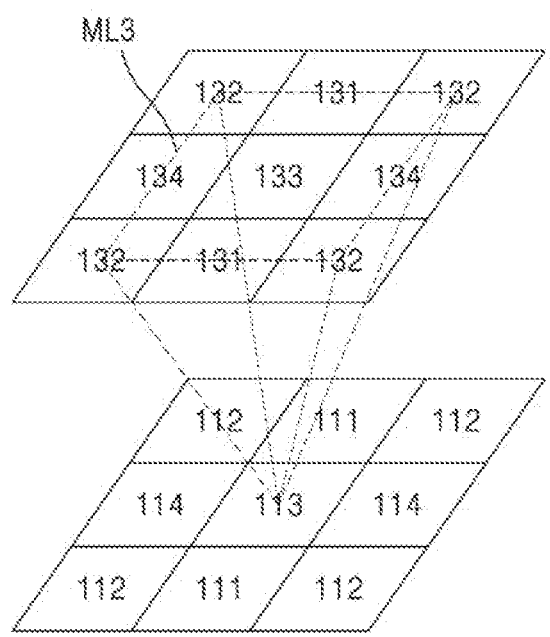
FIG. 7D shows a traveling direction of third wavelength light incident on a third region of the color separating lens array of FIGS. 7A and 7B and the periphery thereof.
Figure 7E:
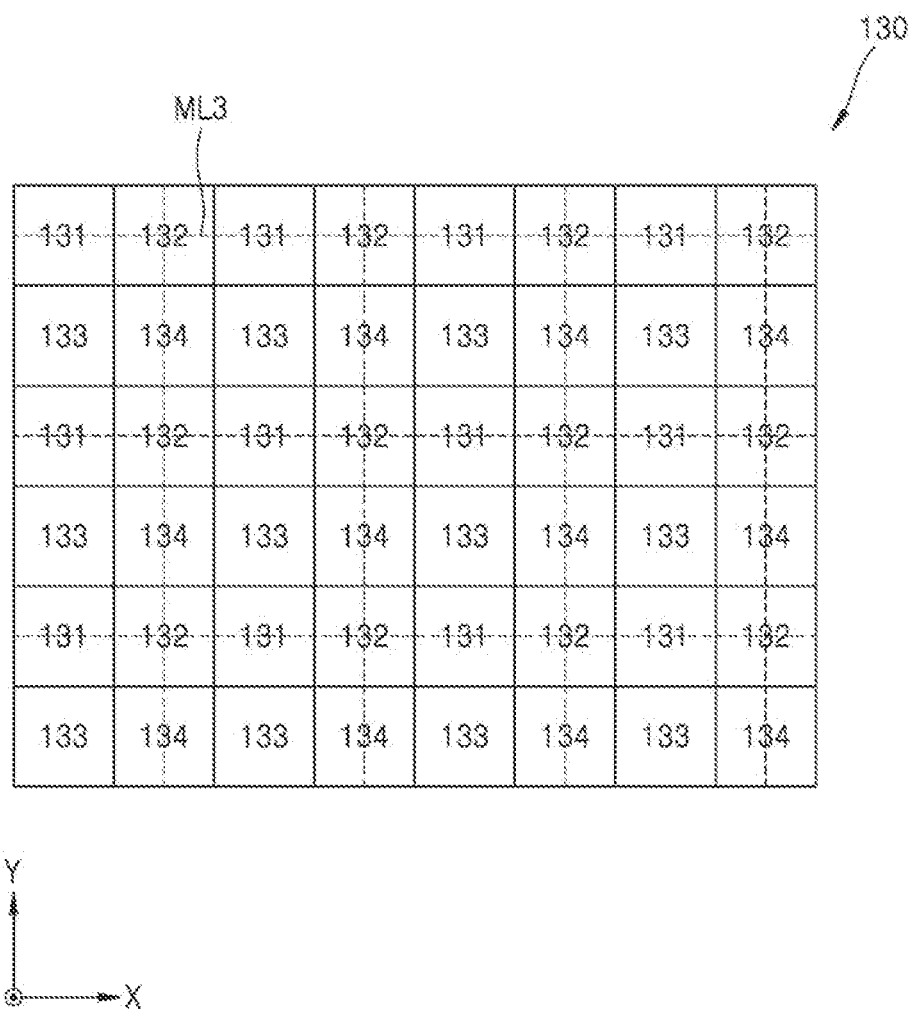
FIG. 7E shows a microlens array equivalent to the color separating lens array with respect to the third wavelength light.

FIG. 7D shows a traveling direction of the third wavelength light incident on the third region 133 of the color separating lens array 130 corresponding to the third photosensitive cell 113 and the periphery thereof, and FIG. 7E shows a microlens array equivalent to the color separating lens array 130 with respect to the third wavelength light.

The third wavelength light is condensed by the color separating lens array 130 to the third photosensitive cell 113 as shown in FIG. 7D, and the third wavelength light from the first to fourth regions 131, 132, 133, and 134 is incident on the third photosensitive cell 113. The phase profile of the third wavelength light described above with reference to FIGS. 7A and 7B is similar to a phase profile of light passing through a virtual third microlens ML3 by connecting the centers of four second regions 132 adjacent to the third region 133 with vertexes facing each other. Therefore, as shown in FIG. 7E, the color separating lens array 130 may be equivalent to an array of the plurality of third microlenses ML3 arranged based on the third photosensitive cell 113 with respect to the third wavelength light. Because the area of each of the third microlenses ML3 is larger than that of the corresponding third photosensitive cell 113, not only the third wavelength light incident in a direction of the third photosensitive cell 113 but also the third wavelength light incident in directions of the first, second, and fourth photosensitive cells 111, 112, and 114 may also be condensed on the third photosensitive cell 113. For example, the area of the third microlens ML3 may be 1.5 to 4 times larger than the area of the corresponding third photosensitive cell 113.

Referring to FIGS. 7A and 7C, the first wavelength light incident on the periphery of the fourth region 134 may have the fourth phase profile PP4 similar to that of the first wavelength light with respect to the first region 131, described above. The phase profile PP4 may be the largest at the center of the fourth region 134 and reduced in a direction away from the center of the fourth region 134. The phase of the first wavelength light with respect to the fourth region 134 may be the largest at the center of the fourth region 134, may be gradually reduced in the form of a concentric circle away from the center of the fourth region 134, may be the smallest at the center of the second and third regions 132 and 133 in the X and Y directions, and may be the smallest at a contact point of the first region 131 and the fourth region 134 in the diagonal direction, at a location right after passing through the color separating lens array 130. When the phase of the first wavelength light is $2\pi$ at the center of the fourth region 134, the phase of the first wavelength light may be $0.9\pi$ to $1.1\pi$ at the center of the second and third regions 132 and 133, $2\pi$ at the center of the first region 131, and $1.1\pi$ to $1.5\pi$ at the contact point of the first region 131 and the fourth region 134.

Figure 7F:
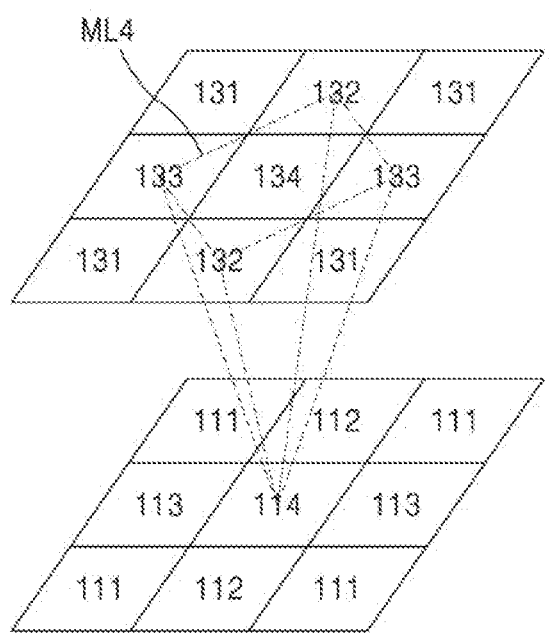
FIG. 7F shows a traveling direction of second wavelength light incident on a second region of the color separating lens array of FIGS. 7A and 7B and the periphery thereof.
Figure 7G:
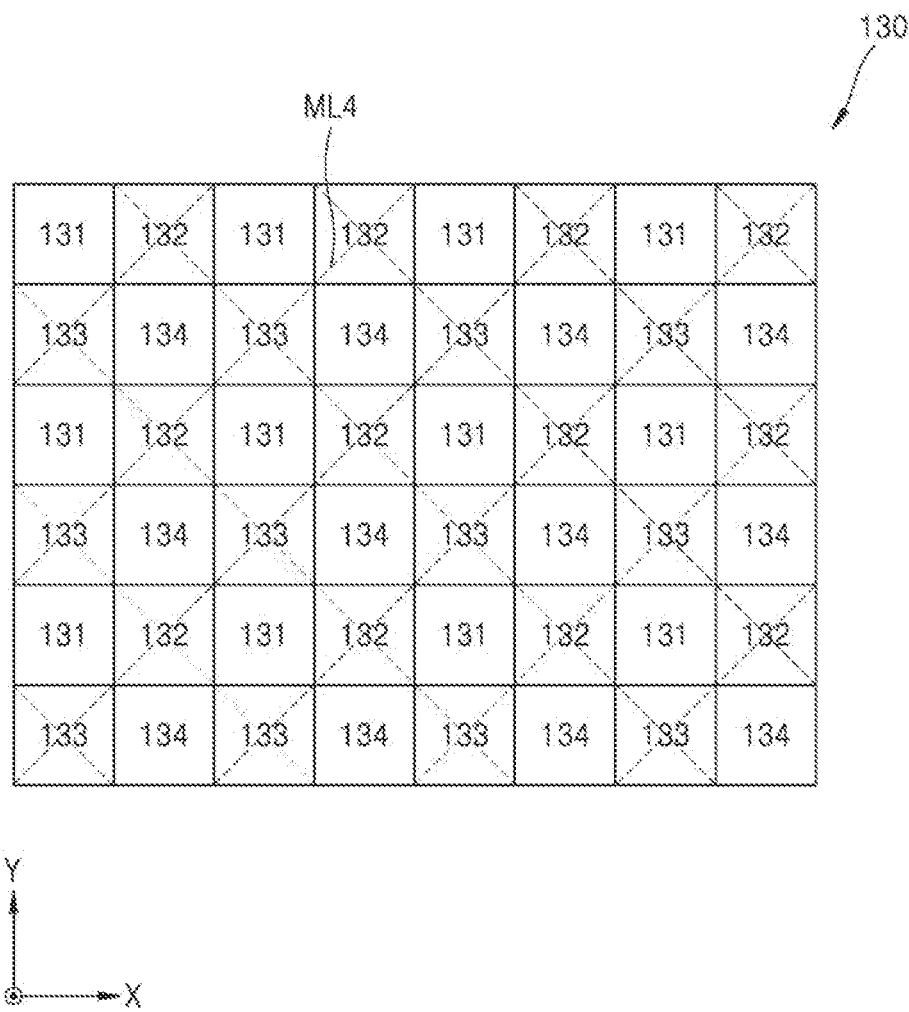
FIG. 7G shows a microlens array equivalent to the color separating lens array with respect to the second wavelength light.

FIG. 7F shows a traveling direction of the first wavelength light incident on the fourth region and the periphery thereof, and FIG. 7G shows a microlens array equivalent to the color separating lens array 130 with respect to the first wavelength light. The first wavelength light is condensed on the two photosensitive cells, that is, the first and fourth photosensitive cells 111 and 114, and the phase profile and the travel direction of the first wavelength light incident on the fourth region 134 are similar to the phase profile and the travel direction of the first wavelength light incident on the first region 131, and thus, redundant descriptions thereof are omitted.

Referring to FIG. 7F, the first wavelength light incident on the periphery of the fourth region 134 is condensed by the color separating lens array 130 to the fourth photosensitive cell 114, and the first wavelength light from the second to fourth regions 132, 133, and 134 is incident on the fourth photosensitive cell 114. As shown in FIG. 7G, the color separating lens array 130 may be equivalent to an array of the plurality of fourth microlenses ML4 arranged based on the fourth photosensitive cell 114 with respect to the first wavelength light incident on the periphery of the fourth region 134.

Figure 8:
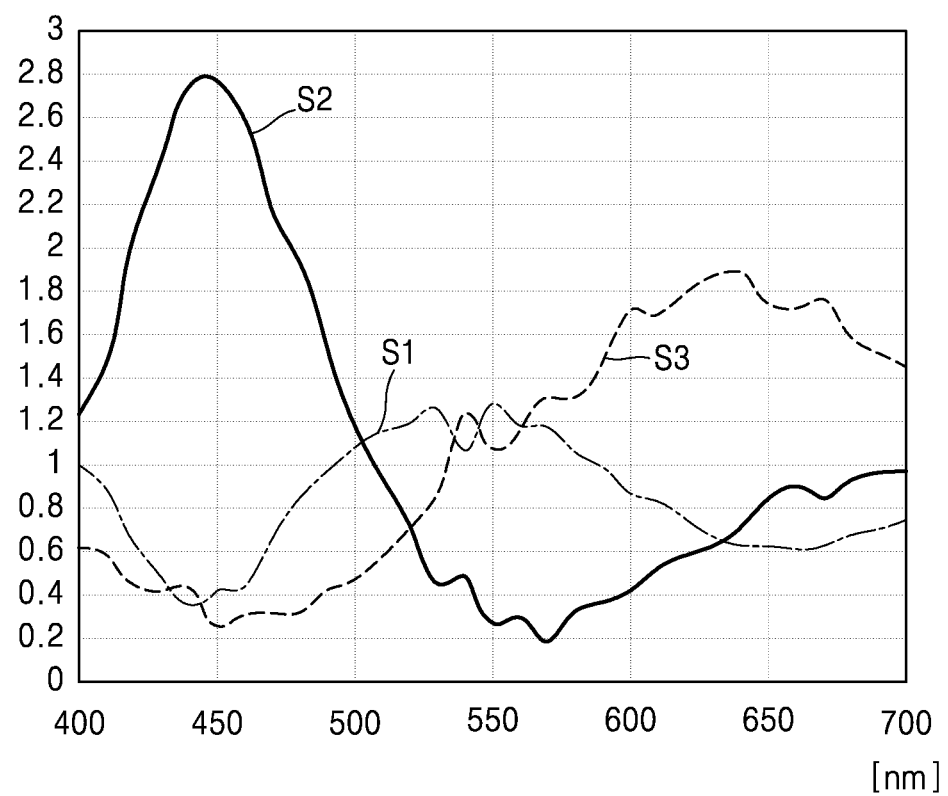
FIG. 8 shows spectrums of light incident on a sensor substrate through a color separating lens array when there is no spectrum shaping layer in the pixel array of FIGS. 4A and 4B.

FIG. 8 shows first to third spectrums S1, S2, and S3 of light directly incident on a sensor substrate through the color separating lens array 130 when there is no spectrum shaping layer in the pixel array 1100 of FIGS. 4A and 4B.

The vertical axis of FIG. 8 represents quantum efficiency (QE), and the horizontal axis represents the wavelength of light. QE indicates a degree to which photons incident on the pixel array 1100 are converted into electrons by a photoelectric conversion element. For example, when incident photons are converted into electrons with an efficiency of 80%, QE may be 0.8, and when incident photons are converted into electrons with an efficiency of 100%, QE may be 1.0. In a typical pixel array, QE is not equal to or larger than 1.0, but because the pixel array 1100 of FIGS. 4A and 4B includes the color separating lens array 130, QE may be equal to or larger than 1.0. For example, that the QE of the second photosensitive cell 112 for a 475 nm wavelength is 2.0 means that when photons of 475 nm wavelength light traveling toward the second photosensitive cell 112 are 100, electrons corresponding to 200 photons are generated in the second photosensitive cell 112. In the pixel array 1100 of FIGS. 4A and 4B, not only photons of 475 nm wavelength light traveling toward the second photosensitive cell 112 but also photons of 475 nm wavelength light traveling toward the first and third photosensitive cells 111 and 113 are incident on the second photosensitive cell 112, and thus, QE may be equal to or larger than 1.0. For example, an amount of photons of 475 nm wavelength light traveling toward the second photosensitive cell 112 after passing through the color separating lens array 130 may be larger than the amount of photons of 475 nm wavelength light traveling toward the second photosensitive cell 112 before passing through the color separating lens array 130, and thus, the QE of the second photosensitive cell 112 with respect to the 475 nm wavelength light may be larger than 1.0.

The first spectrum S1 of FIG. 8 is a spectrum of light incident on the pixel array 1100 that is branched by the color separating lens array 130 and sensed by the first and fourth photosensitive cells 111 and 114, which are the green pixels G, and has the highest QE in a wavelength band of 490 nm to 580 nm corresponding to green light. The second spectrum S2 is a spectrum of light sensed by the second photosensitive cell 112, which is the blue pixel B, and has the highest QE in a wavelength band of 420 nm to 475 nm corresponding to blue light. The third spectrum S3 is a spectrum of light sensed by the third photosensitive cell 113, which is the red pixel R, and has the highest QE in a wavelength band of 590 nm to 680 nm corresponding to red light.

The color separating lens array 130 shown in FIG. 5B is only one example, and various types of color separating lens array 130 may be designed according to the color characteristics of an image sensor, the pixel pitch, the incidence angle of the incident light, etc. In addition, it has been described that the color separating lens array 130 includes a plurality of cylindrical nanoposts NP that are spaced apart from each other, but embodiments are not limited thereto. For example, FIG. 9A is a plan view showing a unit pattern of another color separating lens array 130' that may be applied to an image sensor of a Bayer pattern type, and FIG. 9B is a plan view showing a unit pattern of another color separating lens array 130".

Figure 9A:
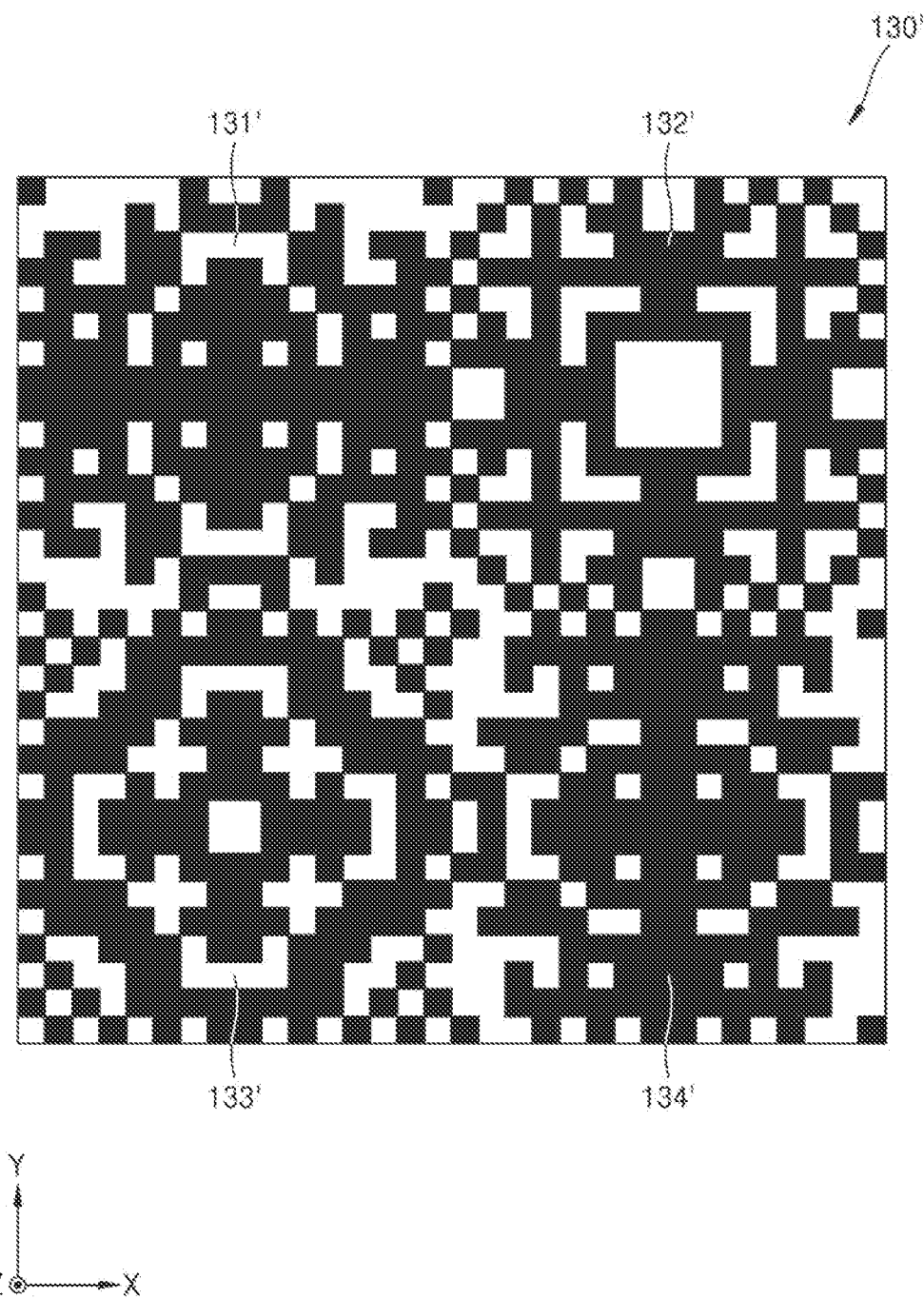
FIGS. 9A and 9B show color separating lens arrays according to another example embodiment.
Figure 9B:
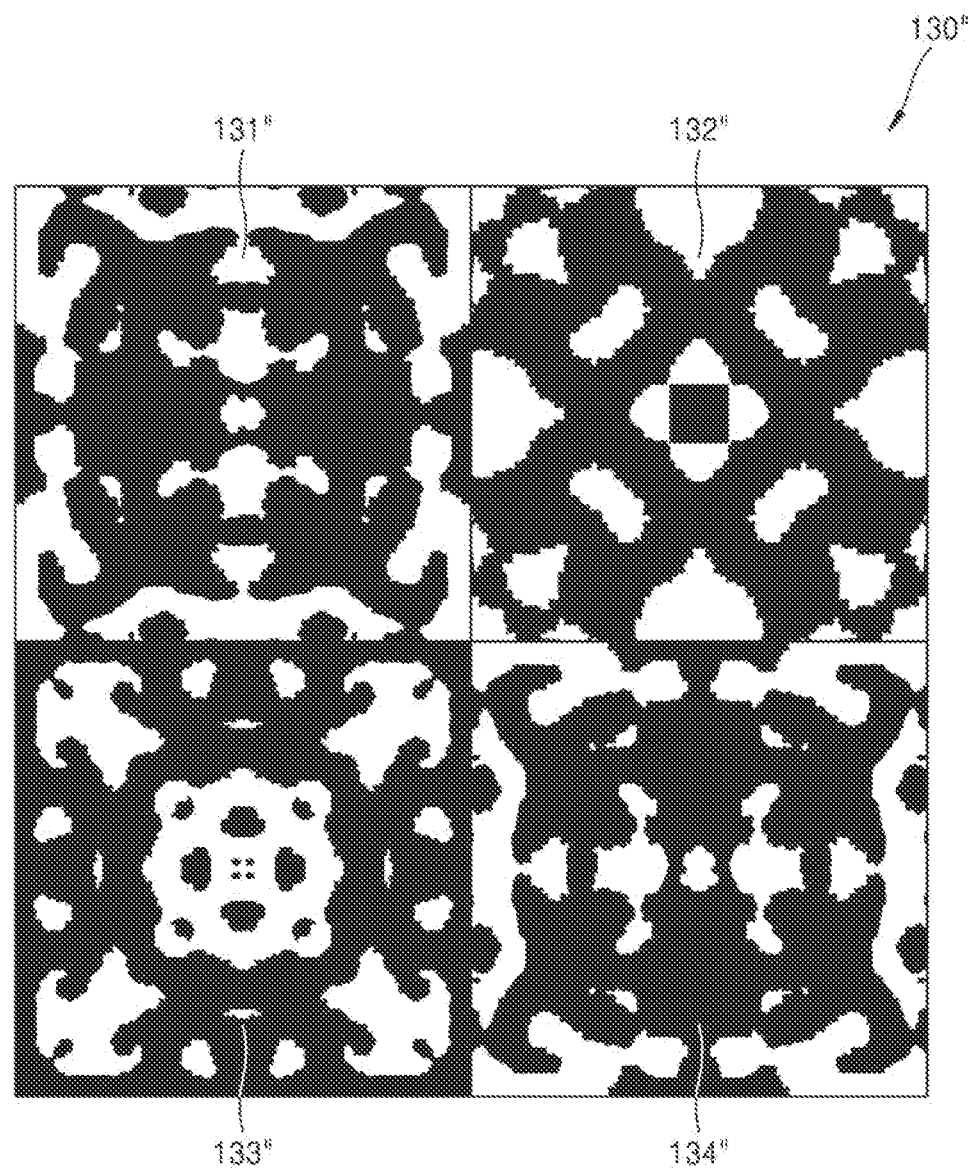

Each of the first region 131', the second region 132', the third region 133', and the fourth region 134' of the color separating lens array 130' shown in FIG. 9A is in a digitized binary form in a 16×16 rectangular arrangement, and the unit pattern has a 32×32 rectangular shape. Each of the first region 131", the second region 132", the third region 133", and the fourth region 134" shown in FIG. 9B is in the form of a continuous curve that is not digitized. A rule applied to the first to fourth regions 131', 132', 133', 134', 131", 132", 133", and 134" of the color separating lens arrays 130' and 130" shown in FIGS. 9A and 9B is the same as a rule applied to the first to fourth regions 131, 132, 133, and 134 of the color separating lens array 130.

The color separating lens arrays 130' and 130" satisfying the phase profiles and performance of the color separating lens array 130 described above may be automatically designed through various types of computer simulations. For example, the structures of the first to fourth regions 131', 132', 133', 134', 131", 132", 133", and 134" may be optimized through a nature-inspired algorithm such as a genetic algorithm, a particle swarm optimization algorithm, an ant colony optimization algorithm, etc., or a reverse design based on an adjoint optimization algorithm.

The first to fourth patterns of the first to fourth regions 131', 132', 133', 134', 131", 132", 133", and 134" may be optimized while evaluating performances of candidate color separating lens arrays based on evaluation factors such as color separation spectrum, optical efficiency, signal-to-noise ratio, etc. when designing the color separating lens arrays 130' and 130". For example, the patterns of the first to fourth regions 131', 132', 133', 134', 131", 132", 133", and 134" may be optimized in a manner that when a target numerical value of each evaluation factor is determined in advance, the sum of the differences from the target numerical values of evaluation factors is minimized. According another example embodiment, the performance may be indexed for each evaluation factor, and the patterns of the first to fourth regions 131', 132', 133', 134', 131", 132", 133", and 134" may be optimized so that a value representing the performance may be maximized.

Figure 10C:
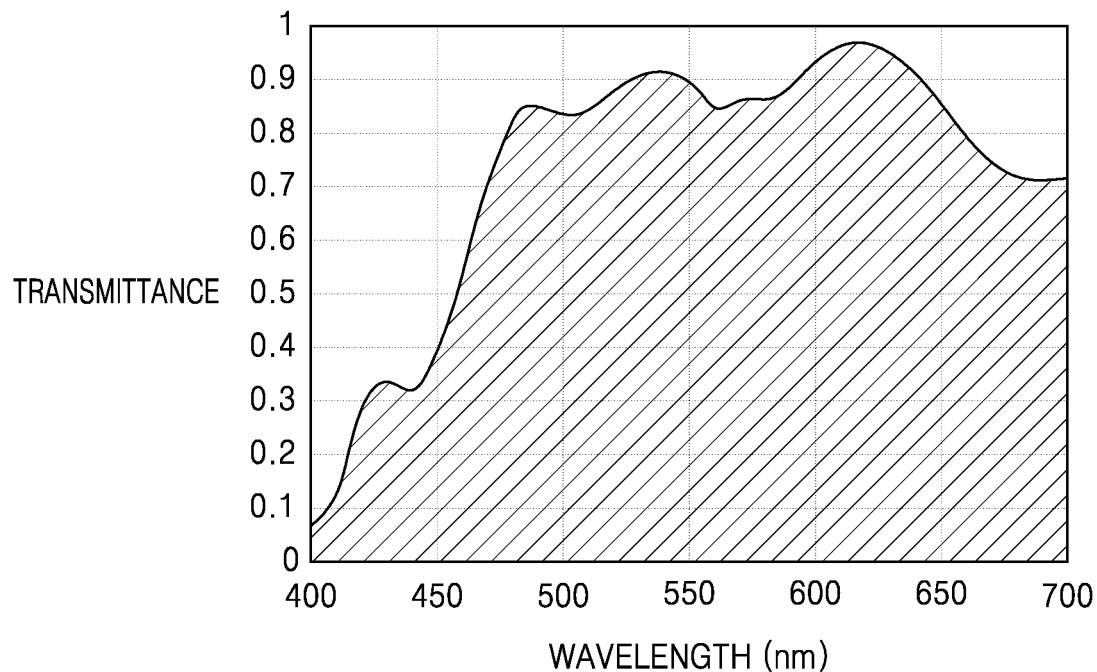
FIG. 10C is a graph showing transmittance of the first shaper of FIG. 10A.
Figure 10D:
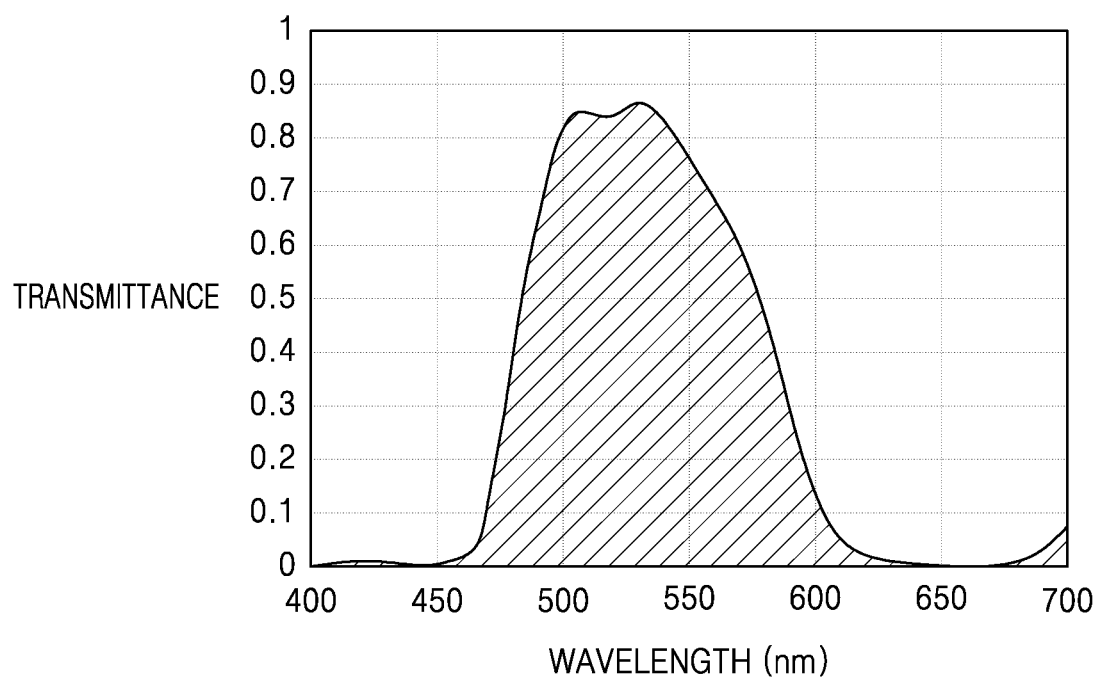
FIG. 10D is a graph showing transmittance of an organic color filter applicable to a green pixel.
Figure 10E:
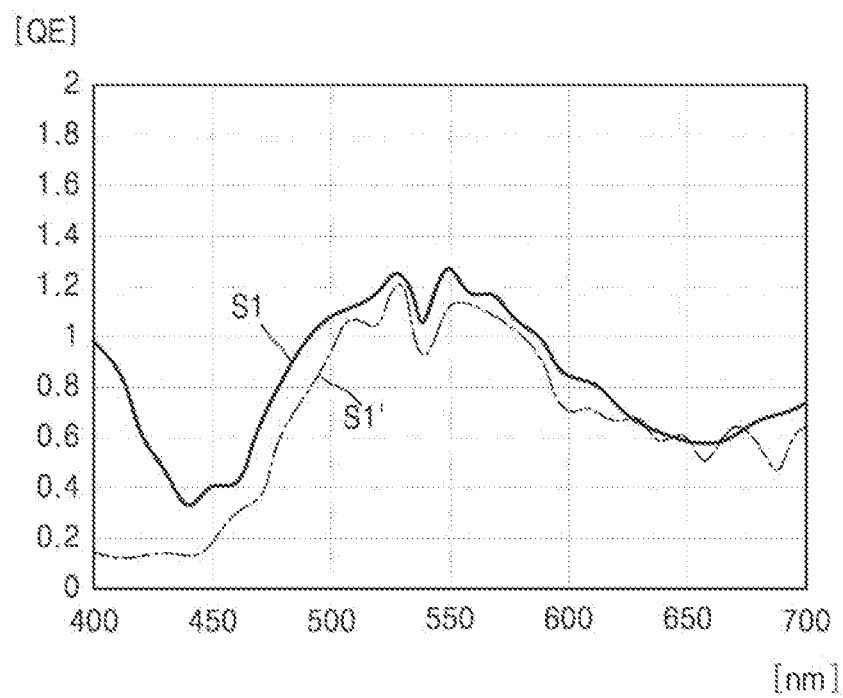
FIG. 10E shows a first spectrum shaped by the first shaper of FIG. 10A.

FIG. 10A is a perspective view of a first shaper 151 of FIGS. 4A and 4B, FIG. 10B is a cross-sectional view taken along line III-III' of FIG. 10A, FIG. 10C is a graph showing transmittance of the first shaper 151 of FIG. 10A, FIG. 10D is a graph showing transmittance of an organic color filter applicable to a green pixel, and FIG. 10E shows a first spectrum S1' shaped by the first shaper 151 of FIG. 10A.

Referring to FIGS. 10A and 10B, the first shaper 151 may include first nanostructures 151a arranged in an array and a first dielectric 151b disposed between the first nanostructures 151a.

The first nanostructure 151a may have a cylindrical shape with a circular cross-section, and may include p-Si, a-Si, or Si. The shape, height, and pitch of the first nanostructure 151a may be designed differently according to a spectrum to be obtained by the first shaper 151. For example, a diameter 151w of the cross-section may be 80 nm, a height 151h may be 90 nm, and a pitch 151p may be 100 nm.

The first dielectric 151b may be a dielectric material having a refractive index different from that of the first nanostructure 151a, for example, SiO₂ or air.

The first shaper 151 may shape the spectrum of light incident on the first and fourth photosensitive cells 111 and 114 in order to increase the color purity and color reproducibility of the image sensor 1000, and may differently adjust an amount of light transmitted through the first shaper 151 for each wavelength. For example, when the first shaper 151 is disposed on the first and fourth photosensitive cells 111 and 114 that are green pixels G in order to reduce a ratio of blue light incident on the first and fourth photosensitive cells 111 and 114, the transmittance of blue light among the light passing through the first shaper 151 may be designed to be lower than that of green light and red light.

FIG. 10C shows a transmittance graph of the first shaper 151 designed so that transmittance of green light is higher than transmittance of blue light. For example, the first shaper 151 may have a transmittance equal to or more than 0.8 with respect to a wavelength band of 475 nm to 660 nm, and a transmittance equal to or less than 0.8 with respect to other wavelength bands. In particular, the first shaper 151 may exhibit a transmittance lower than 0.5 with respect to light having a wavelength equal to or less than 450 nm, and may exhibit a transmittance equal to or more than 0.5 with respect to light having a wavelength equal to or more than 500 nm. For example, the first shaper 151 may exhibit a transmittance of 0.9 with respect to light having a wavelength of 540 nm and a transmittance of 0.9 with respect to light having a wavelength of 640 nm.

An area occupied by a shaded region in the total area of the transmittance graph of FIG. 10C is 72.6%, which is larger than 50%. As such, a lower area of the transmittance graph of the first shaper 151 with respect to the wavelength band of 400 nm to 700 nm, for example, the area of the shaded region in FIG. 10C, may be 40% to 90%, 50% to 80%, or 55% to 75% in the total area thereof. Such an area ratio may be defined as a transmission area ratio. In general, considering that the transmission area ratio of the green organic color filter disposed on the green pixel of an image sensor is 25% to 40%, as illustrated in FIG. 10D, the transmission area ratio of the first shaper 151 may be larger than the transmission area ratio of the general green organic color filter.

Referring to FIG. 10E, upon comparing the first spectrum S1 (see FIG. 8) sensed by the first and fourth photosensitive cells 111 and 114 when the first shaper 151 is not present with the shaped first spectrum S1' sensed by the first and fourth photosensitive cells 111 and 114 when the first shaper 151 is present, a sensing amount of light having a wavelength equal to or less than 450 nm in the shaped first spectrum S1' may be reduced to be equal to or less than 50% compared to the first spectrum S1 before shaping. For example, the QE of light of a wavelength of 450 nm decreases from 0.4 in the first spectrum S1 before shaping to 0.2 in the shaped first spectrum S1'.

Figure 11A:
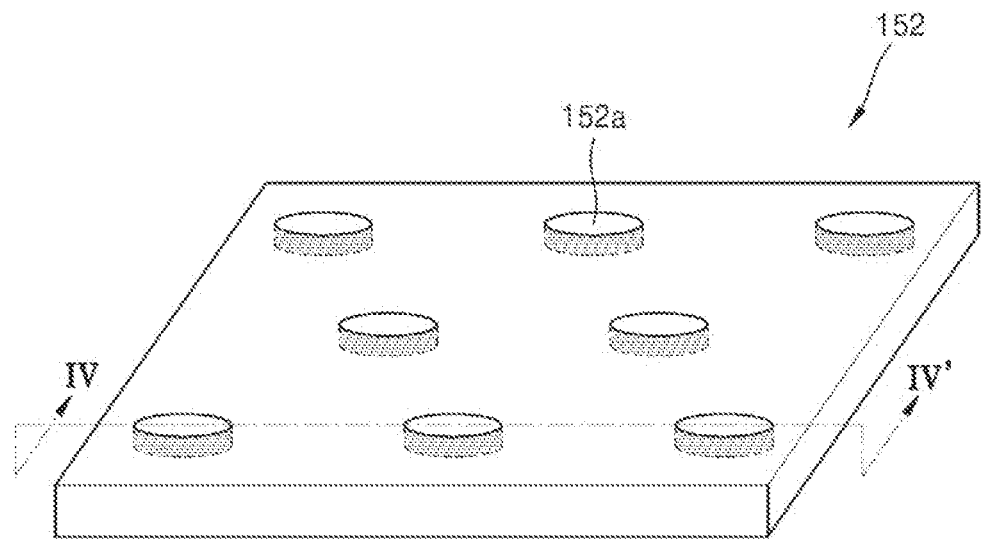
FIG. 11A is a perspective view of a second shaper of FIGS. 4A and 4B.
Figure 11B:
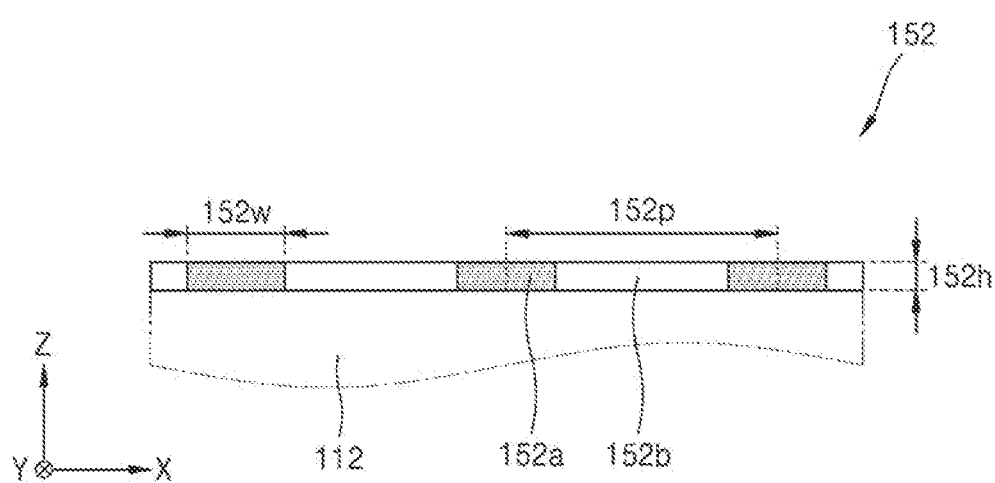
FIG. 11B is a cross-sectional view taken along line IV-IV' of FIG. 11A.
Figure 11C:
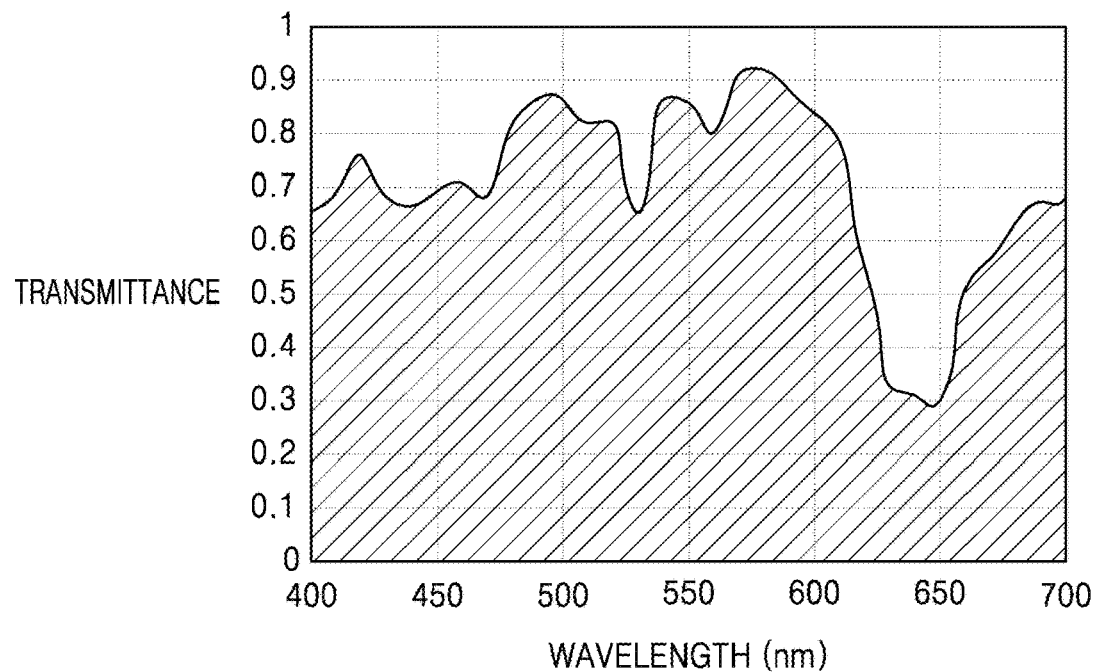
FIG. 11C is a graph showing transmittance of the second shaper of FIG. 11A.
Figure 11D:
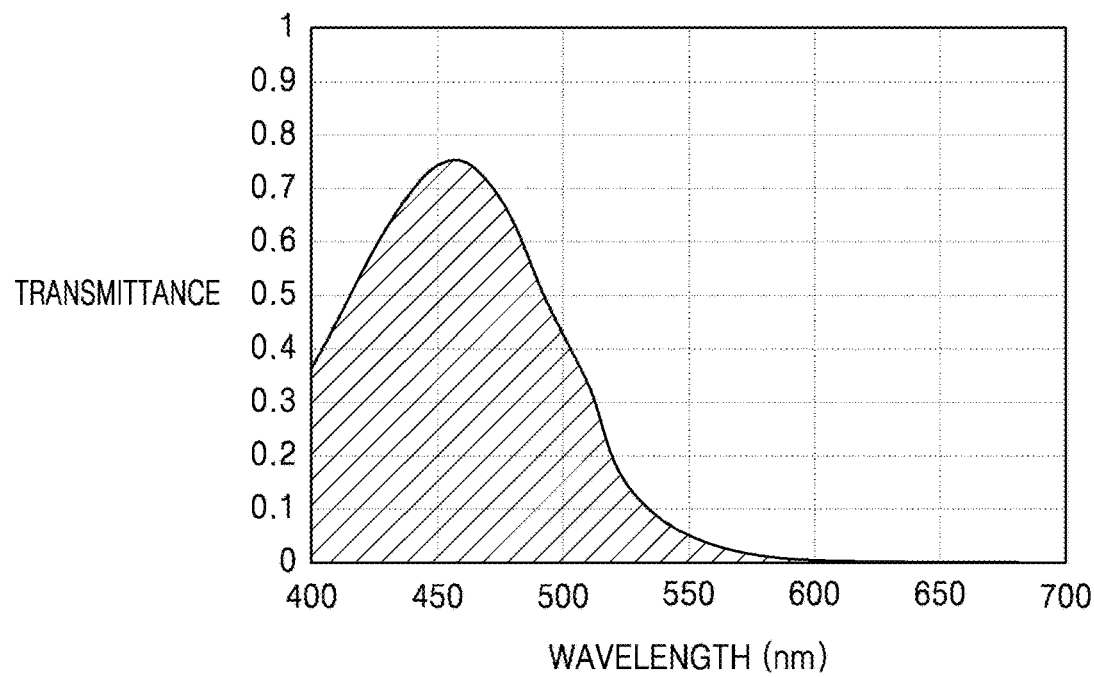
FIG. 11D is a graph showing transmittance of an organic color filter applicable to a blue pixel.
Figure 11E:
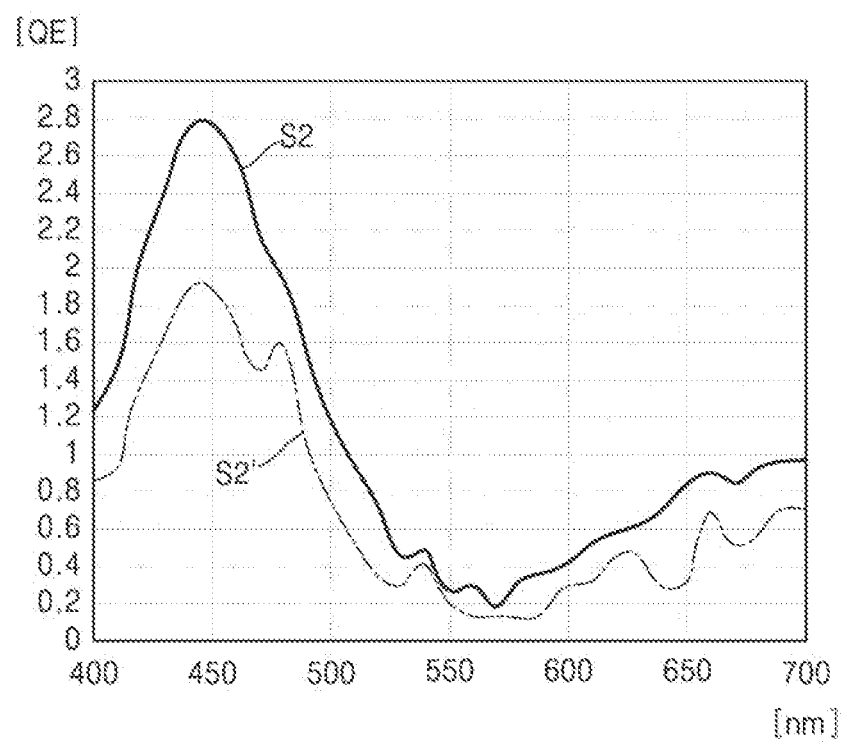
FIG. 11E shows a second spectrum shaped by the second shaper of FIG. 11A.

FIG. 11A is a perspective view of a second shaper 152 of FIGS. 4A and 4B, FIG. 11B is a cross-sectional view taken along line IV-IV' of FIG. 11A, FIG. 11C is a graph showing transmittance of the second shaper 152 of FIG. 11A, FIG. 11D is a graph showing transmittance of an organic color filter applicable to a blue pixel, and FIG. 11E shows a second spectrum S2' shaped by the second shaper 152 of FIG. 11A.

Referring to FIGS. 11A and 11B, the second shaper 152 may include second nanostructures 152a arranged in an array and a second dielectric 152b disposed between the second nanostructures 152a.

The second nanostructure 152a may have a cylindrical shape with a circular cross-section, and may include p-Si, a-Si, or Si. The shape, height, and pitch of the second nanostructure 152a may be designed differently according to a spectrum to be obtained by the second shaper 152. For example, a width 152w of the cross-section may be 200 nm, a height 152h may be 90 nm, and a pitch 152p may be 420 nm.

When comparing the structures of the first shaper 151 and the second shaper 152, the pitches 152p (420 nm) of the second nanostructure 152a may be 2 to 6 times larger than the pitches 151p (100 nm) of the first nanostructure 151a, and the cross-sectional area $10.0*10^3\pi$ nm² of the second nanostructure 152a may be 4 to 10 times larger than the cross-sectional area $1.6*10^3\pi$ nm² of the first nanostructure 151a.

The second dielectric 152b may be a dielectric material having a refractive index different from that of the second nanostructure 152a, for example, SiO₂ or air.

The second shaper 152 may adjust the amount of light transmitted through the second shaper 152 differently for each wavelength. For example, when the second shaper 152 is disposed on the second photosensitive cell 112 that is the blue pixel B to reduce a ratio of red light incident on the second photosensitive cell 112, the second nanostructure 152a may be designed so that the transmittance of red light among incident light is lower than those of green light and blue light.

FIG. 11C shows a transmittance graph of the second shaper 152 designed so that the transmittance of red light is lower than transmittances of green light and blue light. Specifically, the second shaper 152 may exhibit a transmittance equal to or more than 0.5 or equal to or more than 0.6 with respect to a wavelength equal to or less than 610 nm, and may exhibit a transmittance lower than 0.5 with respect to a wavelength of 615 nm to 675 nm, for example, a wavelength of 650 nm. In particular, the second shaper 152 may exhibit a transmittance larger than 0.6 with respect to a wavelength of 450 nm and 540 nm, and a transmittance lower than 0.4 with respect to a wavelength of 640 nm.

An area occupied by a shaded region in the total area of the transmittance graph of FIG. 11C is 70.0%, which is larger than 50%. As such, the transmission area ratio with respect to the wavelength band of 400 nm to 700 nm of the second shaper 152 may be 40% to 90%, 50% to 80%, or 55% to 75%. In general, considering that the transmission area ratio of the blue organic color filter disposed on the blue pixel of an image sensor is 25% to 40% as illustrated in FIG. 11D, the transmission area ratio of the second shaper 152 may be larger than the transmission area ratio of the general blue organic color filter.

Referring to FIG. 11E, upon comparing the second spectrum S2 (see FIG. 8) sensed by the second photosensitive cell 112 when the second shaper 152 is not present with the shaped second spectrum S2' sensed by the second photosensitive cell 112 when the second shaper 152 is present, a sensing amount of light having a wavelength of 640 nm to 650 nm in the shaped second spectrum S2' may be reduced to be equal to or less than 50% compared to the second spectrum S2. For example, the QE of light of a wavelength of 650 nm decreases from 0.8 before shaping to 0.4 after shaping.

Figure 12A:
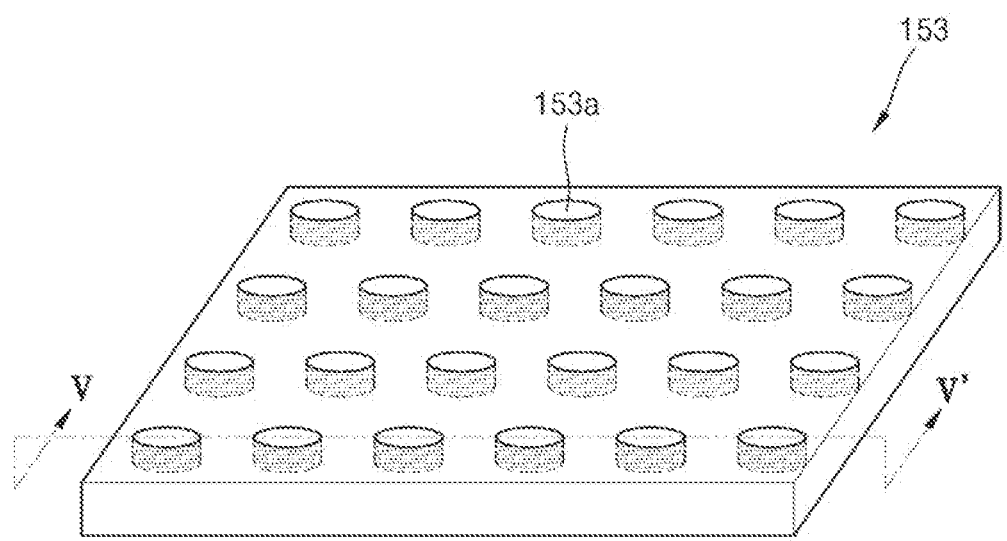
FIG. 12A is a perspective view of a third shaper of FIGS. 4A and 4B.
Figure 12B:
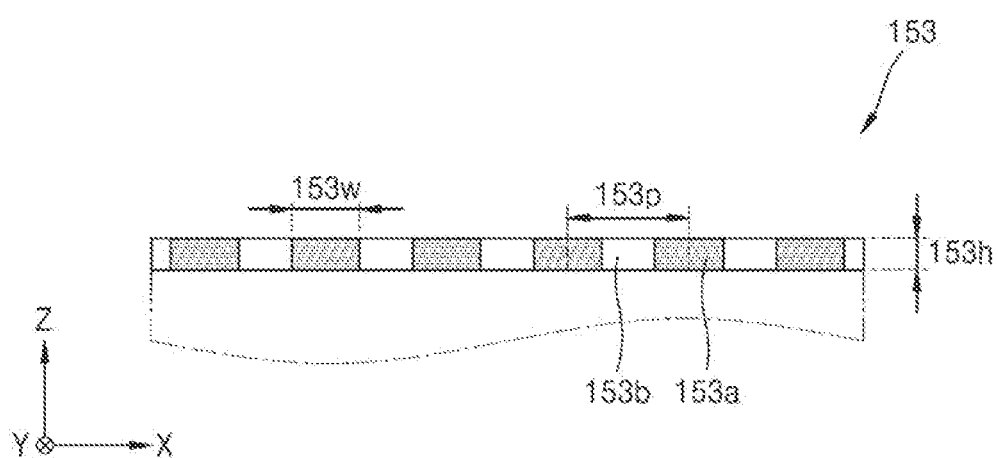
FIG. 12B is a cross-sectional view taken along the line V-V' of FIG. 12A.
Figure 12C:
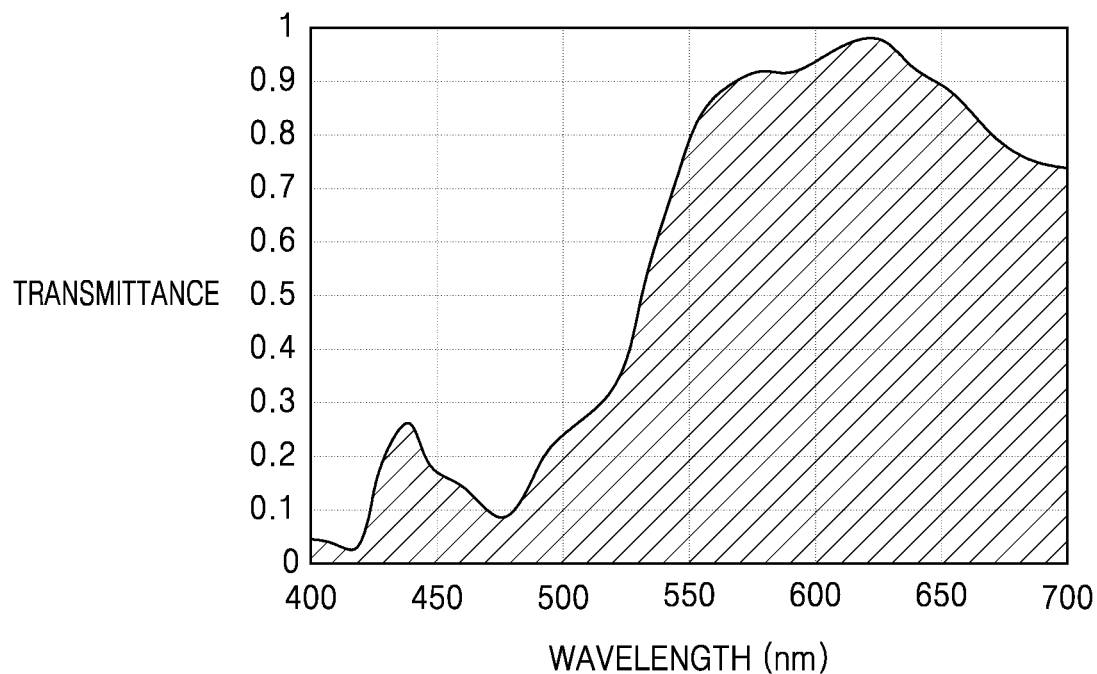
FIG. 12C is a graph showing transmittance of the third shaper of FIG. 12A.
Figure 12D:
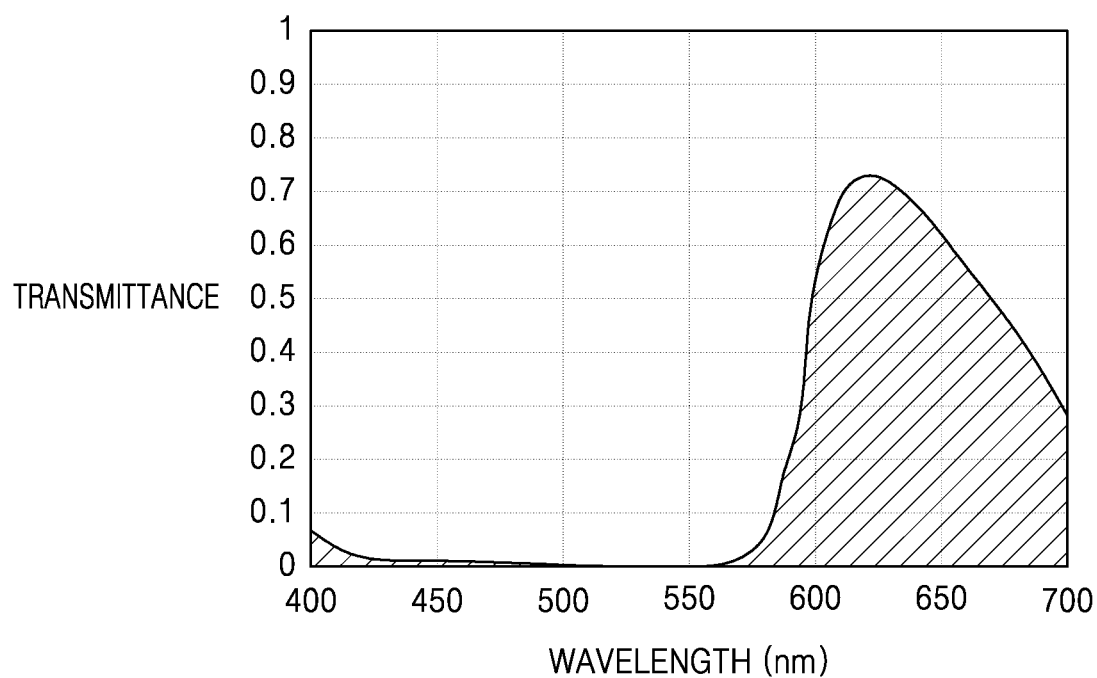
FIG. 12D is a graph showing transmittance of an organic color filter applicable to a red pixel.
Figure 12E:
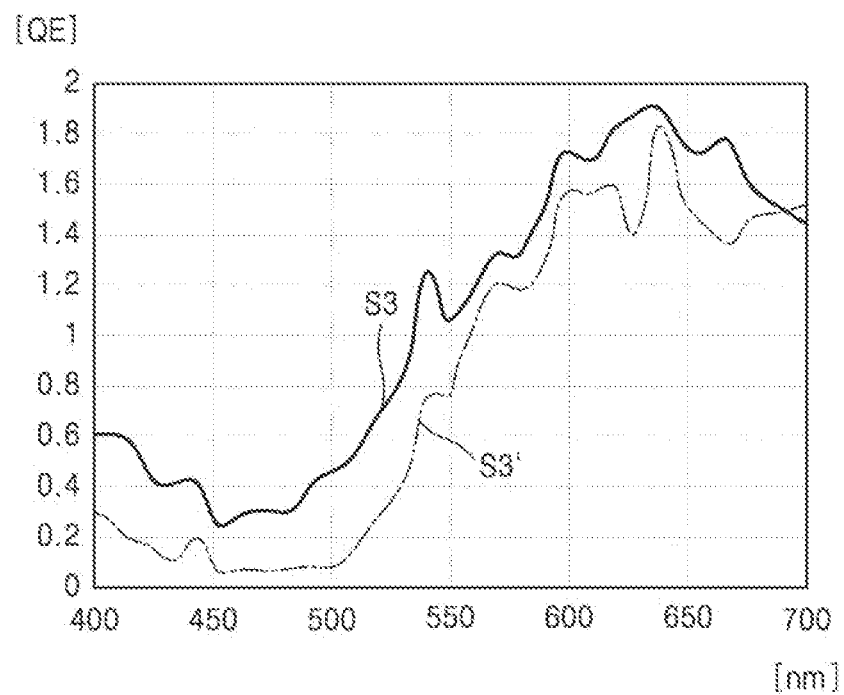
FIG. 12E shows a third spectrum shaped by the third shaper of FIG. 12A.

FIG. 12A is a perspective view of a third shaper 153 of FIGS. 4A and 4B, FIG. 12B is a cross-sectional view taken along the line V-V' of FIG. 12A, FIG. 12C is a graph showing transmittance of the third shaper 153 of FIG. 12A, FIG. 12D is a graph showing transmittance of an organic color filter applicable to a red pixel, and FIG. 12E shows a third spectrum S3' shaped by the third shaper 153.

Referring to 12A and 12B, the third shaper 153 may include third nanostructures 153a arranged in an array and a third dielectric 153b disposed between the third nanostructures 153a.

The third nanostructure 153a may have a cylindrical shape with a circular cross-section, and may include p-Si, a-Si, or Si. The shape, height, and pitch of the third nanostructure 153a may be designed differently according to a spectrum to be obtained by the third shaper 153, for example, a width 153w of the cross-section may be 140 nm, a height 153h may be 90 nm, and a pitch 153p may be 180 nm. In the example embodiments of FIGS. 10A, 11A, and 12A, the case where the heights of the first to third nanostructures 151a, 152a, and 153a are 90 nm has been described as an example, but the height of the nanostructures may be, for example, 30 nm to 160 nm.

When comparing the structures of the first to third shapers 151, 152 and 153, the pitch 153p (180 nm) of the third nanostructure 153a may be larger than the pitch 151p (100 nm) of the first nanostructure 151a and may be smaller than the pitch 151p (420 nm) of the second nanostructure 152a. In addition, the cross-sectional area $4.9*10^3\pi$ nm$^2$ of the third nanostructure 153a may be larger than the cross-sectional area $1.6*10^3\pi$ nm$^2$ of the first nanostructure 151a, and may be smaller than the cross-sectional area $10.0*10^3\pi$ nm$^2$ of the second nanostructure 152a.

The third dielectric 153b may be a dielectric material having a refractive index different from that of the third nanostructure 153a, for example, $SiO_2$ or air.

The third shaper 153 may adjust the amount of light transmitted through the third shaper 153 differently for each wavelength. For example, the third shaper 153 is disposed on the third photosensitive cell 113 that is the red pixel R to reduce a ratio of blue light incident on the third photosensitive cell 113, the third nanostructure 153a may be designed so that transmittance of blue light is lower than those of green light and red light.

FIG. 12C shows a transmittance graph of the third shaper 153 designed so that transmittance of blue light is lower than those of green light and red light. The third shaper 153 may exhibit a transmittance lower than 0.5 with respect to a wavelength equal to or less than 500 nm, and may exhibit a transmittance equal to or more than 0.5 with respect to a wavelength equal to or more than 600. Specifically, the third shaper 153 may exhibit a transmittance equal to or more than 0.7 with respect to a wavelength equal to or more than 550 nm, a transmittance equal to or less than 0.7 with respect to a wavelength equal to or less than 540 nm, and a transmittance lower than 0.5 with respect to a wavelength equal to or less than 530 nm. In particular, the third shaper 153 may exhibit a transmittance of 0.2 with respect to a wavelength of 450 nm, a transmittance of 0.63 with respect to a wavelength of 540 nm, and a transmittance of 0.92 with respect to a wavelength of 640 nm.

An area occupied by a shaded region in the total area of the transmittance graph of FIG. 12C is 55.0%, which is larger than 50%. Similar to the first and second shapers 151 and 152 described above, the third corrector 153 may also have a transmission area ratio of 40% to 90%, 50% to 80%, and 55% to 75% with respect to the wavelength band of 400 nm to 700 nm. In general, considering that the transmission area ratio of the red organic color filter disposed on the red pixel is 25% to 40% as illustrated in FIG. 12D, the transmission area ratio of the third corrector 153 may be larger than the transmission area ratio of the general red organic color filter.

As described above with respect to the first to third shapers 151, 152, and 153, the transmission area ratio of the spectrum shaping layer 150 with respect to the wavelength of 400 nm to 700 nm may be 40% to 90%, 50% to 80% or 55% to 75%.

Referring to FIG. 12E, upon comparing the third spectrum S3 (see FIG. 8) sensed by the third photosensitive cell 113 when the third shaper 153 is not present with the shaped third spectrum S3' sensed by the third photosensitive cell 113 when the third shaper 153 is present, a sensing amount of light having a wavelength equal to or less than 530 nm in the shaped third spectrum S3' may be reduced to be equal to or less than 50% compared to the third spectrum S3. For example, the QE of light of a wavelength of 530 nm decreases from 0.8 before shaping to 0.4 after shaping.

Figure 13:
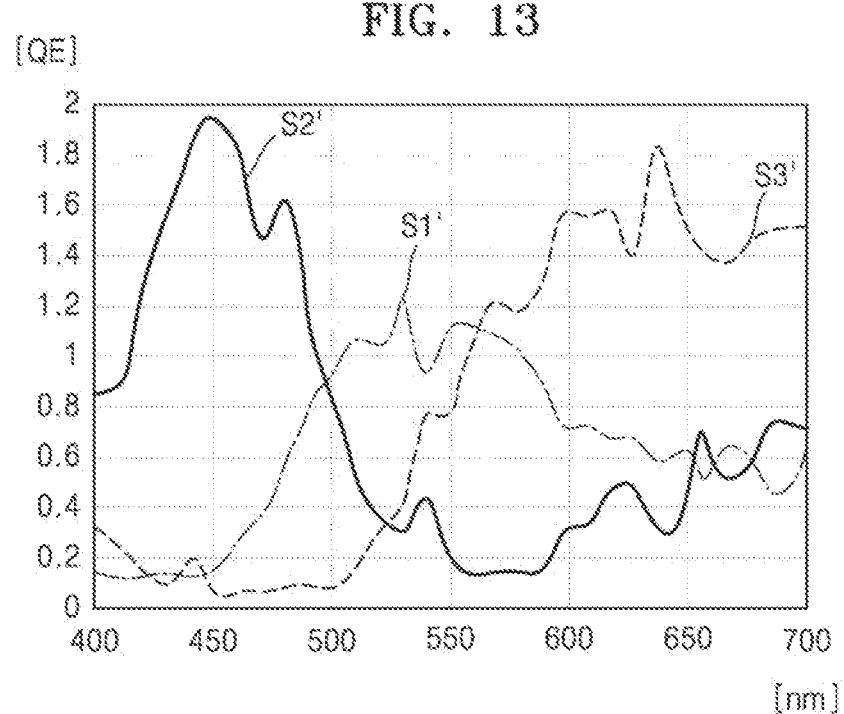
FIG. 13 shows a spectrum of light incident on a sensor substrate when a spectrum shaping layer is included in the pixel array of FIGS. 4A and 4B, i.e., through a color separating lens array and the spectrum shaping layer.

FIG. 13 shows a spectrum of light incident on the sensor substrate 110 when the spectrum shaping layer 150 is included in the pixel array 1100 of FIGS. 4A and 4B, through the color separating lens array 130 and the spectrum shaping layer 150.

The spectrum of FIG. 13 is different from a spectrum of FIG. 8 in that the spectrum is shaped by the spectrum shaping layer 150 described with reference to FIGS. 10 to 12. Compared to the spectrum of FIG. 8, in the spectrum of FIG. 13, pixel concentration for each color may be improved. In case of green light, an increase in a ratio occupied by QE of the first and fourth photosensitive cells 111 and 114 corresponding to the green pixel G in QE of green light of the entire sensor substrate 110, in case of blue light, an increase in a ratio occupied by QE of the second photosensitive cell 112 corresponding to the blue pixel B, and in case of red light, an increase in a ratio occupied by QE of the third photosensitive cell 113 corresponding to the red pixel R may mean that pixel concentration for each color is improved.

For example, in the spectrum of FIG. 8, with respect to light of a wavelength band of 450 nm which is blue light, QE of the second photosensitive cell 112 corresponding to the blue pixel B is 2.75, and the total QE, that is, QE of the first to fourth photosensitive cells 111, 112, 113, and 114, is 3.4 (2.75+0.4+0.25), and the ratio occupied by the QE in the second photosensitive cell 112 is 80.9%. In the spectrum of FIG. 13, with respect to the light of the wavelength band of 450 nm which is the blue light, the QE of the second photosensitive cell 112 corresponding to the blue pixel B is 1.97, and a ratio occupied by the QE in the total QE of 2.20 (1.97+0.17+0.06) may increase to 89.4%. The ratio of the light sensed by the second photosensitive cell 112 in the light of the wavelength band of 450 nm sensed by the sensor substrate 110 may be 89.4%. The ratio of the light sensed by the second photosensitive cell 112 in the light of the wavelength band of 450 nm sensed by the sensor substrate 110 including the spectrum shaping layer 150 may be 83% to 95%.

As another example, in the spectrum of FIG. 8, with respect to light of a wavelength band of 540 nm which is green light, QE of the first and fourth photosensitive cells 111 and 114 corresponding to the green pixel G is 1.10, and a ratio occupied by the QE in the total QE of 2.85 (1.10+0.47+1.28) is 38.70%. In the spectrum of FIG. 13, with respect to the light of the wavelength band of 540 nm which is the green light, the QE of the first and fourth photosensitive cells 111 and 114 corresponding to the green pixel G is 0.93, and a ratio occupied by the QE in the total QE of 2.10 (0.93+0.42+0.75) may increase to 44.30%. In addition, in the spectrum of FIG. 8, with respect to light of a wavelength band of 640 nm which is red light, QE of the third photosensitive cell 113 corresponding to the red pixel R is 1.89, and a ratio occupied by the QE in the total QE of 3.20 (0.62+0.69+1.89) is 59.20%, and in the spectrum of FIG. 13, with respect to the light of the wavelength band of 640 nm which is the red light, QE of the third photosensitive cell 113 corresponding to the red pixel R is 1.84, and a ratio occupied by the QE in the total QE of 2.75 (0.60+0.31+1.84) may increase to 66.90%. A ratio of the light sensed by the third photosensitive cell 113 in the light of the wavelength band of 640 nm sensed by the sensor substrate 110 is 66.9%. The ratio of the light sensed by the third photosensitive cell 113 in the light of the wavelength band of 640 nm sensed by the sensor substrate 110 including the spectrum shaping layer 150 may be 60% to 75%.

When the wavelengths of light are 450 nm, 540 nm, and 640 nm as an example, the pixel concentration for each color is summarized in [Table 1] and [Table 2] below.

TABLE 1

Pixel concentration for each color when a spectrum shaping layer is not present

| | First and fourth photosensitive cells | second photosensitive cell | third photosensitive cell |
|---|---|---|---|
| 450 nm | 11.8% | 80.9% | 7.3% |
| 540 nm | 38.7% | 16.5% | 44.8% |
| 640 nm | 19.3% | 21.6% | 59.2% |

TABLE 2

Pixel concentration for each color when a spectrum shaping layer is present

| | First and fourth photosensitive cells | second photosensitive cell | third photosensitive cell |
|---|---|---|---|
| 450 nm | 7.9% | 89.4% | 2.8% |
| 540 nm | 44.3% | 20.2% | 35.5% |
| 640 nm | 21.8% | 11.3% | 66.9% |

As summarized in Table 2, the ratio of the light sensed by the second photosensitive cell 112 in the light of the wavelength band of 450 nm sensed by the sensor substrate 110 is equal to or more than 85%. In addition, the ratio of the light sensed by the third photosensitive cell 113 in the light of the wavelength band of 640 nm sensed by the sensor substrate 110 is equal to or more than 60%.

As the color purity and color reproducibility of the image sensor 100 are often improved when the pixel concentration for each color is improved, when the color separating lens array 130 and the spectrum shaping layer 150 are properly combined, the performance of the image sensor 100 may be improved.

When the structures of the color separating lens array 130 and the spectrum shaping layer 150 are compared, heights of the nanoposts NP included in the color separating lens array 130 may be 3 to 50 times larger than those of the nanostructures 151*a*, 152*a*, and 153*a*, and the thickness of the color separating lens array 130 may also be 3 to 50 times larger than the thickness of the spectrum shaping layer 150.

Figure 14A:
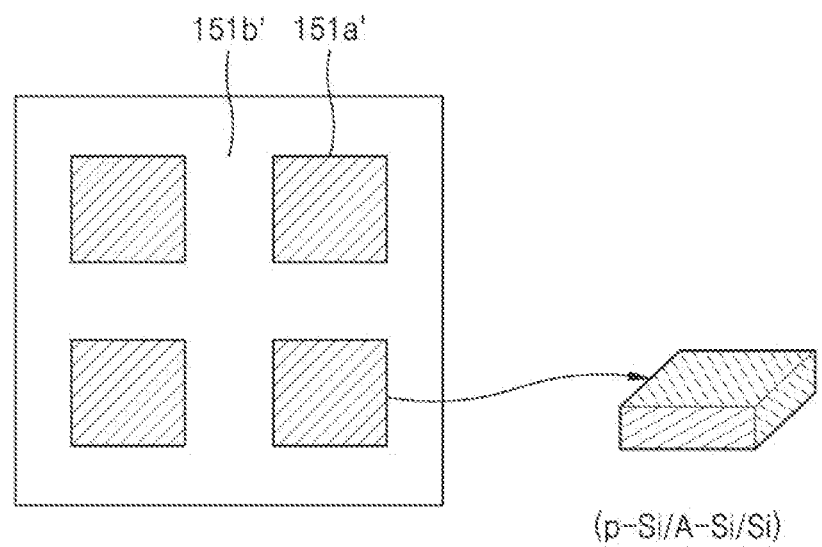
FIGS. 14A to 14C are diagrams illustrating a spectrum shaping layer according to another example embodiment.
Figure 14B:
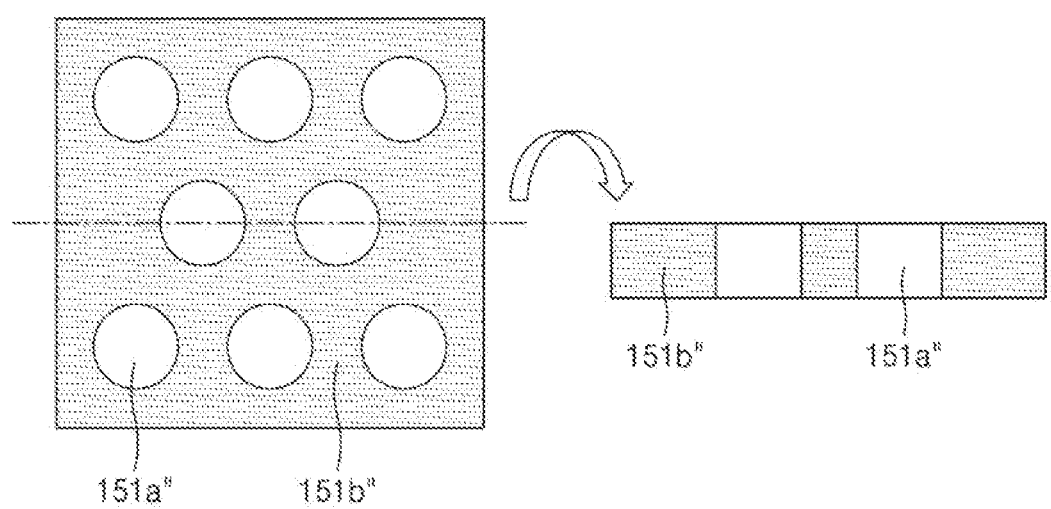
Figure 14C:
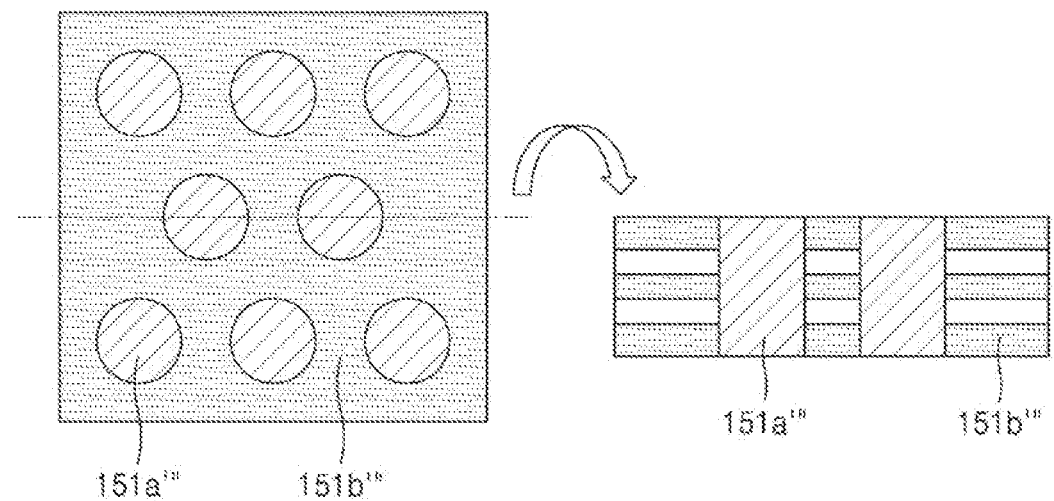

FIGS. 14A to 14C are diagrams illustrating a spectrum shaping layer according to another example embodiment.

In the example embodiments of FIGS. 10A, 11A and 12A, an example in which each of the first to third shapers 151, 152, and 153 includes a cylindrical nanostructure has been described, but as shown in FIG. 14A, each shaper may include a nanostructure in a quadrangular shape.

In addition, in the example embodiments of FIGS. 10A, 11A and 12A, an example in which the refractive index of the nanostructure is higher than the refractive index of the dielectric has been described, but as shown in FIG. 14B, the refractive index of a nanostructure 151*a*" may also be lower than the refractive index of a dielectric 151*b*". For example, the nanostructure 151*a*" of FIG. 14B may be $SiO_2$, and the dielectric 151*b*" may be p-Si, A-Si, Si, or Al-plasmonic.

In addition, in the example embodiments of FIGS. 10A, 11A, and 12A, a structure in which the dielectric is a single layer has been described as an example, but as shown in FIG. 14C, a dielectric 151*b*" may have a structure in which materials having different refractive indices are repeatedly stacked.

In addition, in the example embodiments of FIGS. 10A, 11A and 12A, a structure having the same diameter of the nanostructures included in each of the first to third shapers 151, 152 and 153 has been described, but in order to form a desired spectrum, each of the first to third shapers 151, 152 and 153 may include nanostructures of different shapes. For example, the first shaper 151 may include two types of cylinders having different diameters, or may further include a square pillar in addition to the cylinder.

Figure 15A:
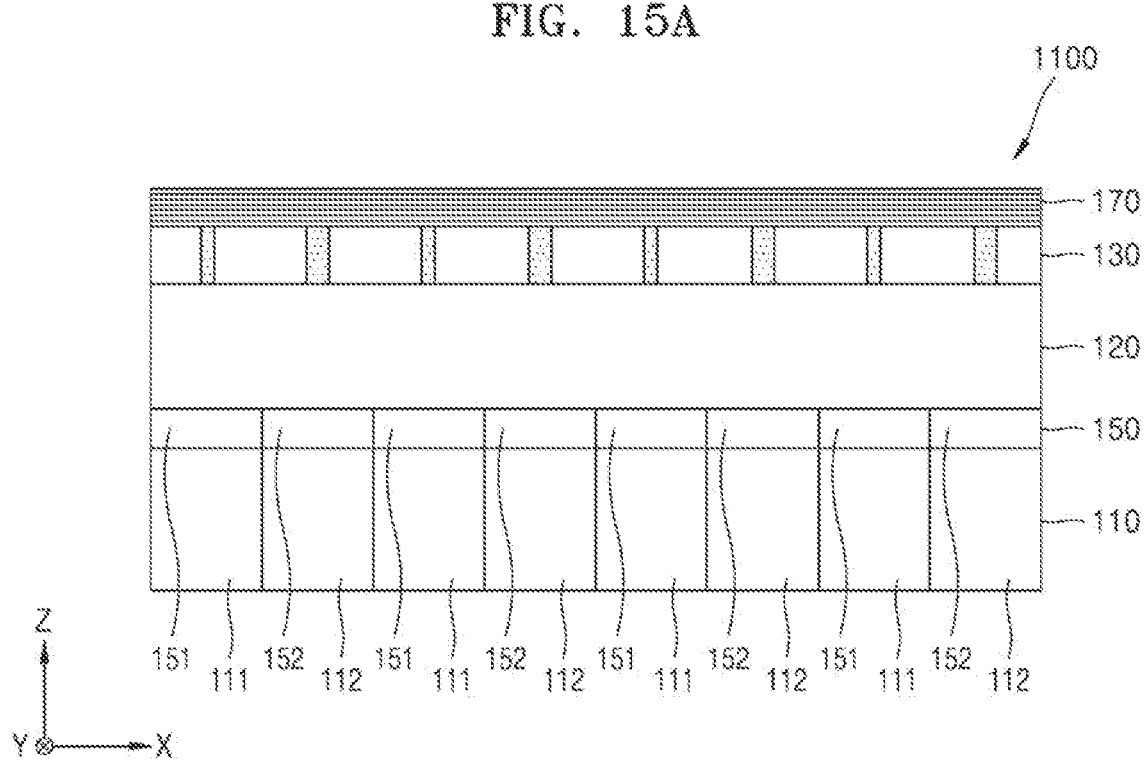
FIGS. 15A and 15B are schematic cross-sectional views of a pixel array according to another example embodiment.
Figure 15B:
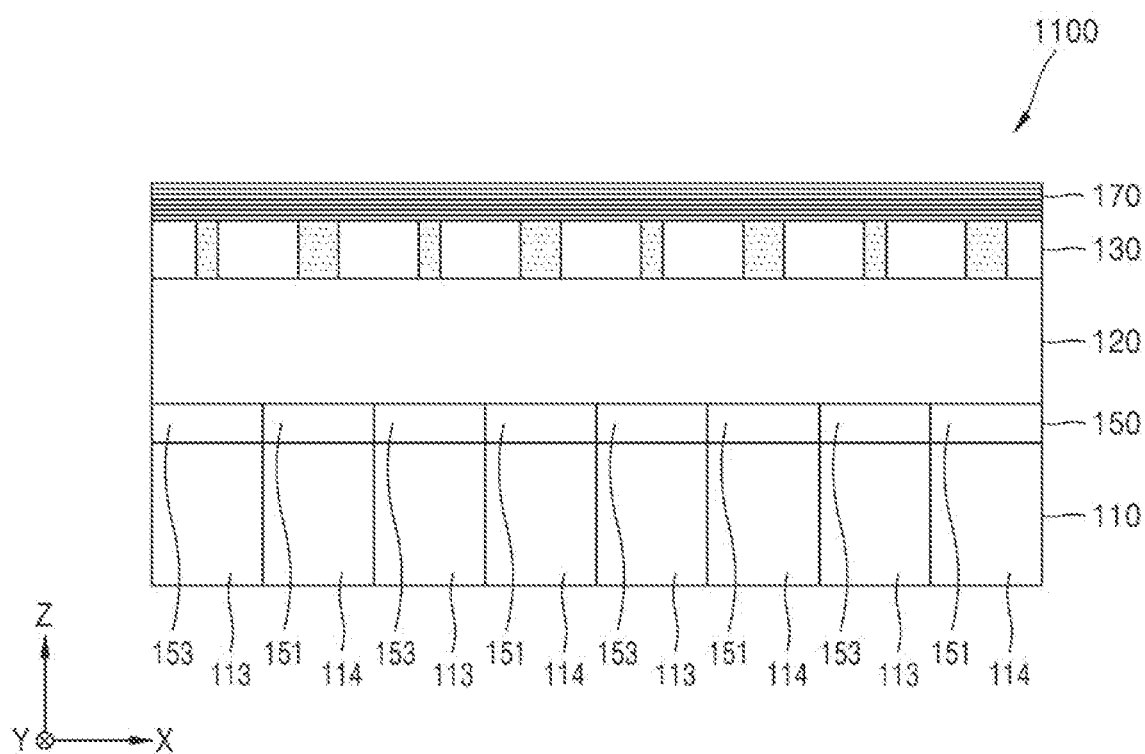

FIGS. 15A and 15B are schematic cross-sectional views of a pixel array according to another example embodiment.

The example embodiment of FIGS. 15A and 15B is different from the example embodiment of FIGS. 4A and 4B in that the pixel array further includes an optical filter layer 170 disposed on the color separating lens array 130. The optical filter layer 170 may absorb and/or reflect light of a specific wavelength band before the light is incident on the color separating lens array 130 and cause selectively only part of the light to transmit therethrough. For example, the optical filter layer 170 may block ultraviolet and infrared light and cause only light in a visible light band to be transmitted through the optical filter layer 170, thereby contributing to improvement of color purity and color reproducibility of the image sensor 1000.

Among the components of FIGS. 15A and 15B, other components except for the optical filter layer 170 are similar to those of the embodiments of FIGS. 4A and 4B, and thus redundant descriptions thereof will be omitted.

Figure 16A:
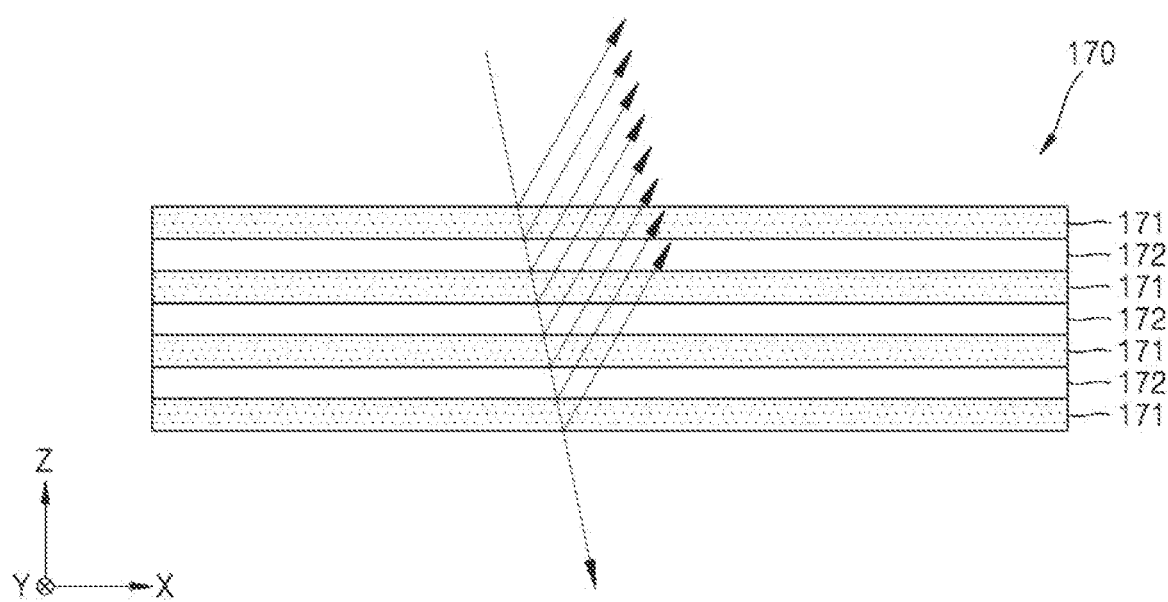
FIG. 16A is a schematic cross-sectional view of an optical filter layer shown in FIGS. 15A and 15B.
Figure 16B:
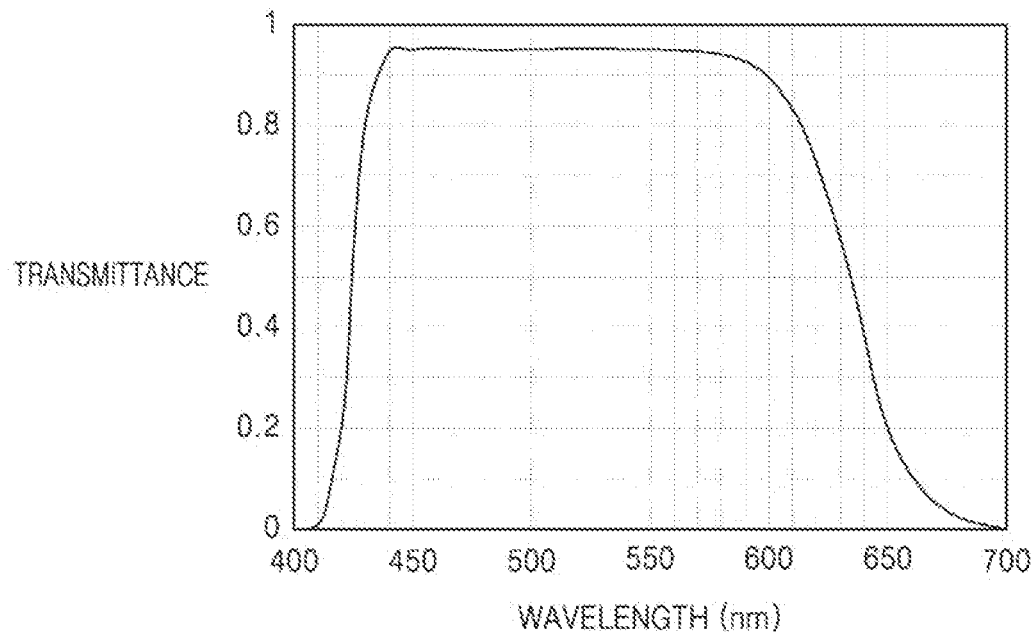
FIG. 16B is a graph showing transmittance of the optical filter layer for each wavelength.

FIG. 16A is a schematic cross-sectional view of the optical filter layer 170 shown in FIGS. 15A and 15B, and FIG. 16B is a graph showing transmittance of the optical filter layer 170 for each wavelength.

Referring to FIG. 16A, the optical filter layer 170 may include a first filter layer 171 including a first material and a second filter layer 172 including a second material having a lower refractive index than the first material. The first and second filter layers 171 and 172 may be alternately and repeatedly stacked, and a transmission wavelength of the optical filter layer 170 may change by changing parameters such as material, thickness, repetitive stacking number of times, etc. of the first and second filter layers 171 and 172. For example, the optical filter layer 170 may be a structure in which the first filter layer 171 having a thickness of 85 nm and a material of $TiO_2$ and the second filter layer 172 having a thickness of 125 nm and a material of $SiO_2$ are alternately stacked 22 times.

Referring to FIG. 16B, the optical filter layer 170 may block light in the ultraviolet and infrared wavelength bands and cause light in the visible light band to be transmitted through the optical filter layer 170. For example, the transmittance of the optical filter layer 170 with respect to light having a wavelength of 435 nm to 600 nm may be equal to or more than 0.9, and the transmittance of the optical filter layer 170 with respect to light having a wavelength equal to or less than 420 nm or equal to or more than 650 nm may be equal to or less than 0.2. In a transmittance spectrum of the optical filter layer 170, a transmittance increase rate in a range of the wavelength of 420 nm to 440 nm may be larger than a transmittance decrease rate in a range of the wavelength of 600 nm to 650 nm. For example, in the range of the wavelength of 420 nm to 440 nm, when the wavelength increases by 20 nm, the transmittance may increase from 0.20 to 0.95 by equal to or more than 0.75, whereas in the range of the wavelength of 600 nm to 650 nm, when the wavelength increases by 50 nm, the transmittance may decrease from 0.9 to 0.2 by 0.7. The transmittance in the range of the wavelength of 420 nm to 440 nm may rapidly increase, and the transmittance in the range of 600 nm to 650 nm may decrease relatively gently.

Figure 17:
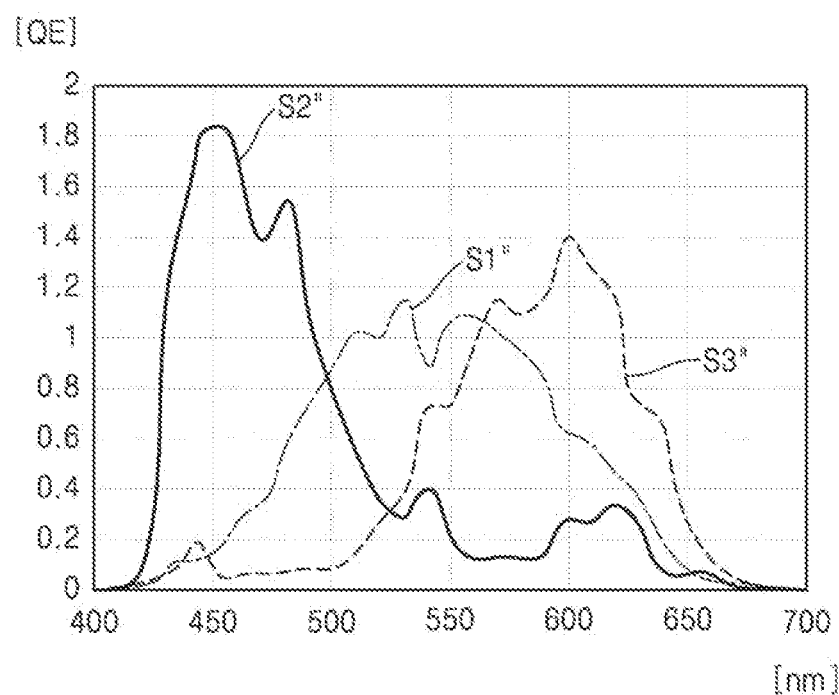
FIG. 17 is a diagram illustrating a spectrum showing light incident on a sensor substrate in a pixel array of FIGS. 15A and 15B.

FIG. 17 is a diagram illustrating a spectrum showing light incident on the pixel array 1100 of FIGS. 15A and 15B.

The spectrum of FIG. 17 is different from a spectrum of FIG. 13 in that the spectrum is of light passing through the optical filter layer 170 described with reference to FIGS. 15A and 15B. An offset of the spectrum of FIG. 17 may decrease compared to the spectrum of FIG. 13. A decrease of the offset may mean that a range in which QEs of first to third spectra S1", S2", and S3" all have values equal to or larger than a certain level decreases. For example, referring to FIG. 13, the QEs of the first to third spectra S1', S2', and S3' are equal to or more than 0.2 in a range of a wavelength of 520 nm to 550 nm and a range of a wavelength equal to or more than 600 nm, whereas referring to FIG. 17, a range in which the QEs of the first to third spectra S1', S2', and S3' are equal to more than 0.2 decreases. The decrease of the offset may contribute to the improvement of color reproducibility of the image sensor 1000.

In the image sensor 1000 including the pixel array 1100 described above, because light loss caused by a color filter, for example, an organic color filter rarely occurs, a sufficient light intensity may be provided to pixels even when sizes of the pixels are reduced. Therefore, an ultra-high resolution, ultra-small, and highly sensitive image sensor having hundreds of millions of pixels or more may be manufactured. Such an ultra-high resolution, ultra-small, and highly sensitive image sensor may be employed in various high-performance optical devices or high-performance electronic devices. For example, the electronic devices may include, for example, smart phones, personal digital assistants (PDAs), laptop computers, personal computers (PCs), a variety of portable devices, electronic devices, surveillance cameras, medical camera, automobiles, Internet of Things (IoT), other mobile or non-mobile computing devices and are not limited thereto.

In addition to the image sensor 1000, the electronic device may further include a processor controlling the image sensor, for example, an application processor (AP), to drive an operating system or an application program through the processor and control a plurality of hardware or software components, and perform various data processing and operations. The processor may further include a graphic processing unit (GPU) and/or an image signal processor. When the processor includes the image signal processor, an image (or video) obtained by the image sensor may be stored and/or output using the processor.

Figure 18:
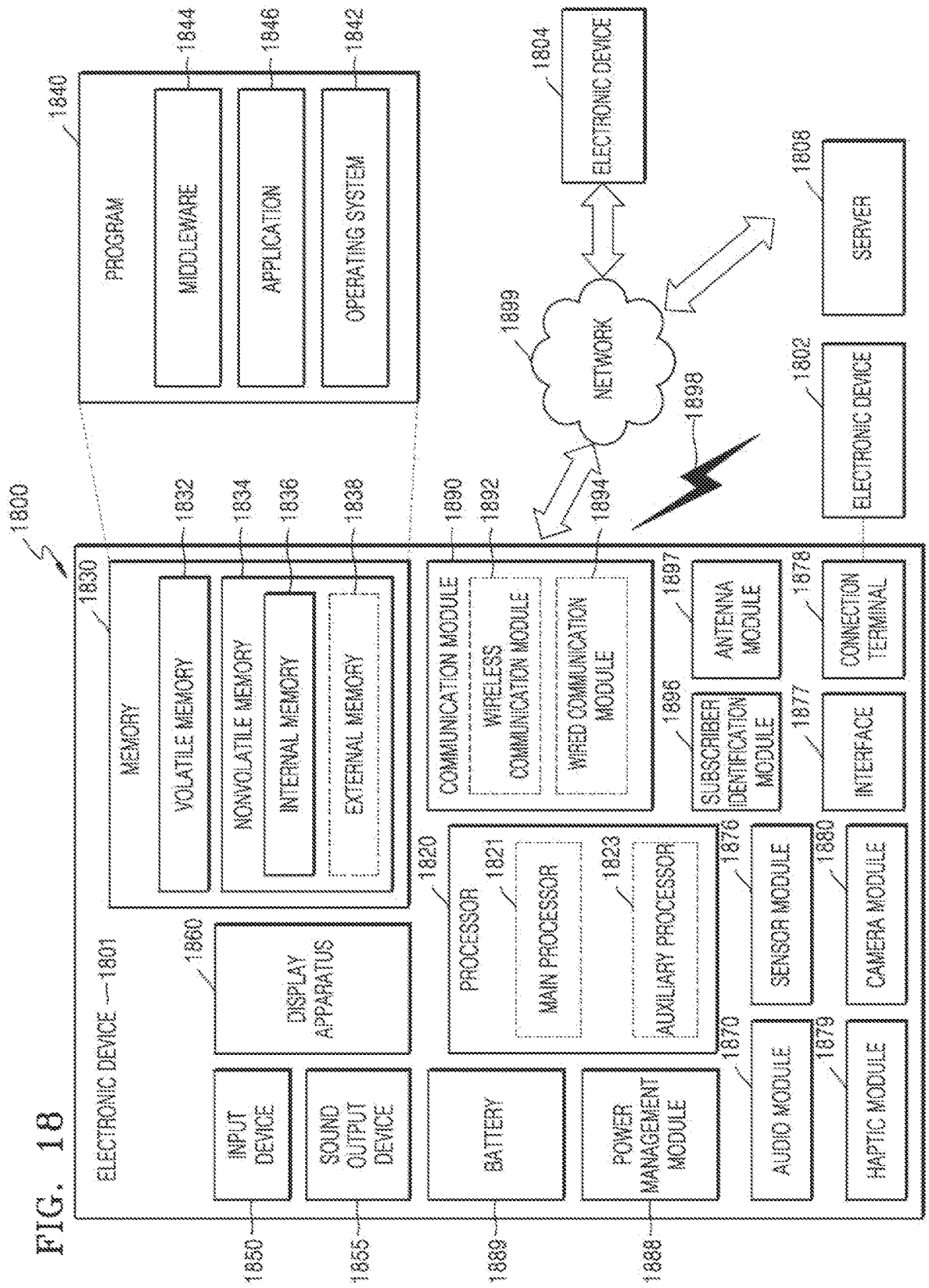
FIG. 18 is a schematic block diagram showing an example of an electronic device including an image sensor according to example embodiments.

FIG. 18 is a block diagram of an example showing an electronic device 1801 including the image sensor 1000 according to an example embodiment. Referring to FIG. 18, in a network environment 1800, the electronic device 1801 may communicate with another electronic device 1802 through a first network 1898 (a short-range wireless communication network, etc.) or communicate with another electronic device 1804 and/or a server 1808 through a second network 1899 (a remote wireless communication network, etc.) The electronic device 1801 may communicate with the electronic device 1804 through the server 1808. The electronic device 1801 may include a processor 1820, a memory 1830, an input device 1850, a sound output device 1855, a display apparatus 1860, an audio module 1870, a sensor module 1876, an interface 1877, a haptic module 1879, a camera module 1880, a power management module 1888, a battery 1889, a communication module 1890, a subscriber identification module 1896, and/or an antenna module 1897. The electronic device 1801 may omit some (the display apparatus 1860, etc.) of the components or may further include other components. One or more of the components may be implemented as an integrated circuit. For example, the sensor module 1876 (a fingerprint sensor, an iris sensor, an illumination sensor, etc.) may be embedded in the display apparatus 1860 (a display, etc.).

The processor 1820 may be configured to execute software (a program 1840, etc.) to control one or a plurality of components (hardware or software components) of the electronic device 1801, the components being connected to the processor 1820, and to perform various data processing or calculations. As part of the data processing or calculations, the processor 1820 may be configured to load a command and/or data received from other components (the sensor module 1876, the communication module 1890, etc.) into the volatile memory 1832, process the command and/or the data stored in a volatile memory 1832, and store resultant data in a nonvolatile memory 1834. The processor 1820 may include a main processor 1821 (a central processing unit (CPU), an application processor (AP), etc.) and an auxiliary processor 1823 (a graphics processing unit (GPU), an image signal processor, a sensor hub processor, a communication processor, etc.) which may independently operate or operate with the main processor 1821. The auxiliary processor 1823 may use less power than the main processor 1821 and may perform specialized functions.

When the main processor 1821 is in an inactive state (a sleep state), the auxiliary processor 1823 may take charge of an operation of controlling functions and/or states related to one or more components (the display apparatus 1860, the sensor module 1876, the communication module 1890, etc.) from among the components of the electronic device 1801, or when the main processor 1821 is in an active state (an application execution state), the auxiliary processor 1823 may perform the same operation along with the main processor 1821. The auxiliary processor 1823 (the image signal processor, the communication processor, etc.) may be realized as part of other functionally-related components (the camera module 1880, the communication module 1890, etc.).

The memory 1830 may store various data required by the components (the processor 1820, the sensor module 1876, etc.) of the electronic device 1801. The data may include, for example, software (the program 1840, etc.), input data and/or output data of a command related to the software. The memory 1830 may include the volatile memory 1832 and/or the nonvolatile memory 1834. The nonvolatile memory

1834 may include an internal memory 1836 fixedly mounted in the electronic device 1801 and a removable external memory 1838.

The program 1840 may be stored in the memory 1830 as software, and may include an operating system 1842, middleware 1844, and/or an application 1846.

The input device 1850 may receive a command and/or data to be used by the components (the processor 1820, etc.) of the electronic device 1801 from the outside of the electronic device 1801. The input device 1850 may include a microphone, a mouse, a keyboard, and/or a digital pen (a stylus pen, etc.).

The sound output device 1855 may output a sound signal to the outside of the electronic device 1801. The sound output device 1855 may include a speaker and/or a receiver. The speaker may be used for a general purpose, such as multimedia playing or recording playing, and the receiver may be used to receive an incoming call. The receiver may be coupled to the speaker as part of the speaker or may be realized as a separate device.

The display apparatus 1860 may visually provide information to the outside of the electronic device 1801. The display apparatus 1860 may include a display, a hologram device, or a controlling circuit for controlling a projector and a corresponding device. The display apparatus 1860 may include touch circuitry configured to sense a touch operation and/or sensor circuitry (a pressure sensor, etc.) configured to measure an intensity of a force generated by the touch operation.

The audio module 1870 may convert sound into an electrical signal or an electrical signal into sound. The audio module 1870 may obtain sound via the input device 1850 or may output sound via the sound output device 1855 and/or a speaker and/or a headphone of an electronic device (the electronic device 1802, etc.) directly or wirelessly connected to the electronic device 1801.

The sensor module 1876 may sense an operation state (power, temperature, etc.) of the electronic device 1801 or an external environmental state (a user state, etc.) and generate electrical signals and/or data values corresponding to the sensed state. The sensor module 1876 may include a gesture sensor, a gyro-sensor, an atmospheric sensor, a magnetic sensor, an acceleration sensor, a grip sensor, a proximity sensor, a color sensor, an infrared (IR) sensor, a biometric sensor, a temperature sensor, a humidity sensor, and/or an illumination sensor.

The interface 1877 may support one or a plurality of designated protocols to be used for the electronic device 1801 to be directly or wirelessly connected to another electronic device (the electronic device 1802, etc.). The interface 1877 may include a high-definition multimedia interface (HDMI) interface, a universal serial bus (USB) interface, an SD card interface, and/or an audio interface.

A connection terminal 1878 may include a connector, through which the electronic device 1801 may be physically connected to another electronic device (the electronic device 1802, etc.) The connection terminal 1878 may include an HDMI connector, a USB connector, an SD card connector, and/or an audio connector (a headphone connector, etc.).

A haptic module 1879 may convert an electrical signal into a mechanical stimulus (vibration, motion, etc.) or an electrical stimulus which is recognizable to a user via haptic or motion sensation. The haptic module 1879 may include a motor, a piezoelectric device, and/or an electrical stimulus device.

The camera module 1880 may capture a still image and a video. The camera module 1880 may include a lens assembly including one or a plurality of lenses, the image sensor 1000 of FIG. 1, image signal processors, and/or flashes. The lens assemblies included in the camera module 1880 may collect light emitted from an object, an image of which is to be captured.

The power management module 1888 may manage power supplied to the electronic device 1801. The power management module 8388 may be realized as part of a power management integrated circuit (PMIC).

The battery 1889 may supply power to the components of the electronic device 1801. The battery 1889 may include a non-rechargeable primary battery, rechargeable secondary battery, and/or a fuel battery.

The communication module 1890 may support establishment of direct (wired) communication channels and/or wireless communication channels between the electronic device 1801 and other electronic devices (the electronic device 1802, the electronic device 1804, the server 1808, etc.) and communication performance through the established communication channels. The communication module 1890 may include one or a plurality of communication processors separately operating from the processor 1820 (an application processor, etc.) and supporting direct communication and/or wireless communication. The communication module 1890 may include a wireless communication module 1892 (a cellular communication module, a short-range wireless communication module, a global navigation satellite system (GNSS) communication module, and/or a wired communication module 1894 (a local area network (LAN) communication module, a power line communication module, etc.). From these communication modules, a corresponding communication module may communicate with other electronic devices through a first network 1898 (a short-range wireless communication network, such as Bluetooth, WiFi direct, or infrared data association (IrDa)) or a second network 1899 (a remote communication network, such as a cellular network, the Internet, or a computer network (LAN, WAN, etc.)). Various types of communication modules described above may be integrated as a single component (a single chip, etc.) or realized as a plurality of components (a plurality of chips). The wireless communication module 1892 may identify and authenticate the electronic device 1801 within the first network 1898 and/or the second network 1899 by using subscriber information (international mobile subscriber identification (IMSI), etc.) stored in the subscriber identification module 1896.

The antenna module 1897 may transmit a signal and/or power to the outside (other electronic devices, etc.) or receive the same from the outside. The antenna may include an emitter including a conductive pattern formed on a substrate (a printed circuit board (PCB), etc.). The antenna module 1897 may include an antenna or a plurality of antennas. When the antenna module 1897 includes a plurality of antennas, an appropriate antenna which is suitable for a communication method used in the communication networks, such as the first network 1898 and/or the second network 1899, may be selected. Through the selected antenna, signals and/or power may be transmitted or received between the communication module 1890 and other electronic devices. In addition to the antenna, another component (a radio frequency integrated circuit (RFIC), etc.) may be included in the antenna module 1897.

One or more of the components of the electronic device 1801 may be connected to one another and exchange signals (commands, data, etc.) with one another, through communication methods performed among peripheral devices (a bus, general purpose input and output (GPIO), a serial peripheral interface (SPI), a mobile industry processor interface (MIPI), etc.).

The command or the data may be transmitted or received between the electronic device 1801 and another external electronic device 1804 through the server 1808 connected to the second network 1899. Other electronic devices 1802 and 1804 may be electronic devices that are homogeneous or heterogeneous types with respect to the electronic device 1801. All or part of operations performed in the electronic device 1801 may be performed by one or a plurality of the other electronic devices 1802, 1804, and 1808. For example, when the electronic device 1801 has to perform a function or a service, instead of directly performing the function or the service, the one or a plurality of other electronic devices may be requested to perform part or all of the function or the service. The one or a plurality of other electronic devices receiving the request may perform an additional function or service related to the request and may transmit a result of the execution to the electronic device 1801. To this end, cloud computing, distribution computing, and/or client-server computing techniques may be used.

Figure 19:
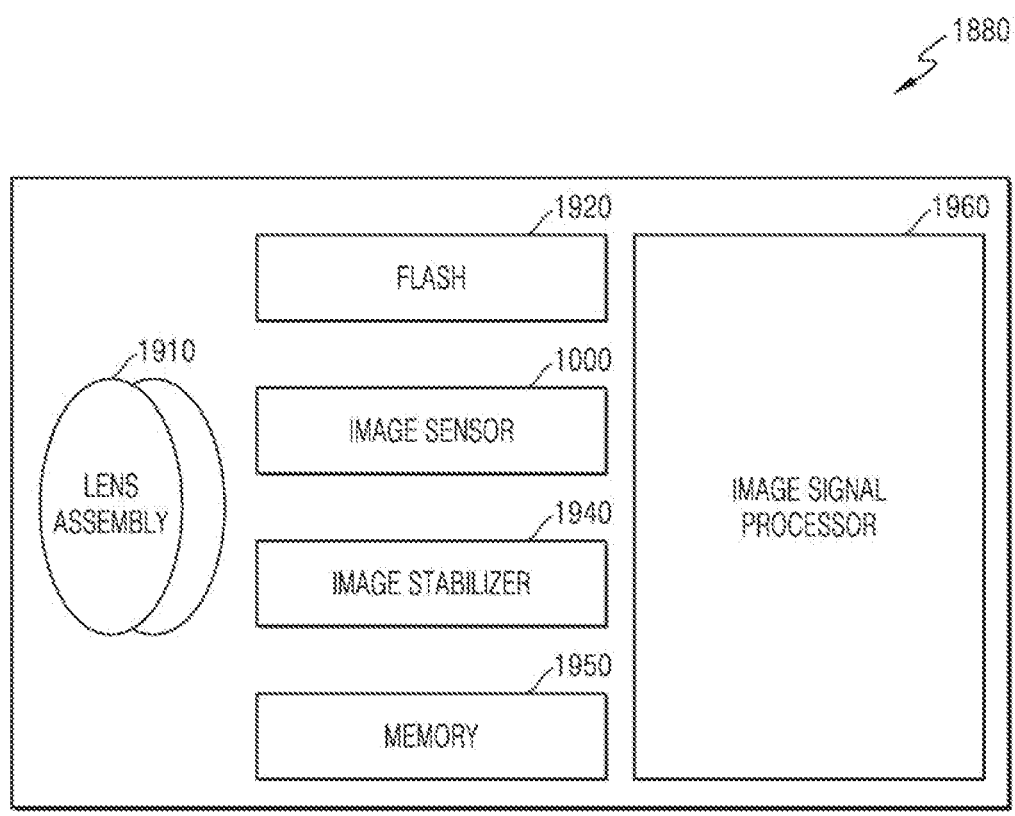
FIG. 19 is a schematic block diagram showing a camera module of FIG. 18.

FIG. 19 is a block diagram showing the camera module 1880 of FIG. 18. Referring to FIG. 19, the camera module 1880 may include a lens assembly 1910, a flash 1920, the image sensor 1000 (see FIG. 1), an image stabilizer 1940, a memory 1950 (a buffer memory, etc.), and/or an image signal processor 1960. The lens assembly 1910 may collect light emitted from a subject that is a target of image capture. The camera module 1880 may include a plurality of lens assemblies 1910, and in this case, the camera module 1880 may be a dual camera, a 360 degree camera, or a spherical camera. Some of the plurality of lens assemblies 1910 may have the same lens property (an angle of view, a focal length, AF, a F number, optical zoom, etc.), or may have different lens properties. The lens assembly 1910 may include a wide-angle lens or a telephoto lens.

The flash 1920 may emit light used to enhance light emitted or reflected from a subject. The flash 1920 may include one or more light emitting diodes (RGB LED, white LED, infrared LED, ultraviolet LED, etc.), and/or a Xenon Lamp. The image sensor 1000 may be the image sensor 1000 described in FIG. 1, and may obtain an image corresponding to the subject by converting the light emitted or reflected from the subject and transmitted through the lens assembly 1910 into an electrical signal. The image sensor 1000 may include one or a plurality of sensors selected from image sensors having different attributes, such as an RGB sensor, a black and white (BW) sensor, an IR sensor, or a UV sensor. Each of the sensors included in the image sensor 1000 may be implemented as a charged coupled device (CCD) sensor and/or a complementary metal oxide semiconductor (CMOS) sensor.

The image stabilizer 1940 may move one or more lenses included in the lens assembly 1910 or image sensors 1000 in a specific direction in response to the movement of the camera module 1880 or the electronic apparatus 1901 including the camera module 1880 or control the operating characteristics of the image sensor 1000 (adjusting read-out timing, etc.) to compensate for a negative influence due to the movement. The image stabilizer 1940 may use a gyro sensor or an acceleration sensor disposed inside or outside the camera module 1880 to detect the movement of the camera module 1880 or the electronic apparatus 1801. The image stabilizer 1940 may be implemented optically.

The memory 1950 may store part or entire data of an image obtained through the image sensor 1000 for a next image processing operation. For example, when a plurality of images are obtained at high speed, obtained original data (Bayer-Patterned data, high-resolution data, etc.) may be stored in the memory 1950, only low-resolution images may be displayed, and then the original data of a selected (a user selection, etc.) image may be transmitted to the image signal processor 1960. The memory 1950 may be integrated into the memory 1830 of the electronic apparatus 1801, or may be configured as a separate memory that operates independently.

The image signal processor 1960 may perform image processing operations on the image obtained through the image sensor 1000 or the image data stored in the memory 1950. The image processing may include depth map generation, 3D modeling, panorama generation, feature point extraction, image synthesis, and/or image compensation (noise reduction, resolution adjustment, brightness adjustment, blurring, sharpening, softening, etc.) The image signal processor 1960 may perform control (exposure time control, read-out timing control, etc.) of components (the image sensor 1000, etc.) included in the camera module 1880. The image processed by the image signal processor 1960 may be stored again in the memory 1950 for further processing or may be provided to external components (the memory 1830, the display apparatus 1860, the electronic apparatus 1802, the electronic apparatus 1804, the server 1808, etc.) of the camera module 1880. The image signal processor 1960 may be integrated into the processor 1820 or may be configured as a separate processor that operates independently from the processor 1820. When the image signal processor 1960 is configured as the processor separate from the processor 1820, the image processed by the image signal processor 1960 may undergo additional image processing by the processor 1820 and then be displayed through the display apparatus 1860.

The electronic apparatus 1801 may include the plurality of camera modules 1880 having different properties or functions. In this case, one of the plurality of camera modules 1880 may be a wide-angle camera, and the other may be a telephoto camera. Similarly, one of the plurality of camera modules 1880 may be a front camera and the other may be a rear camera.

Figure 20:
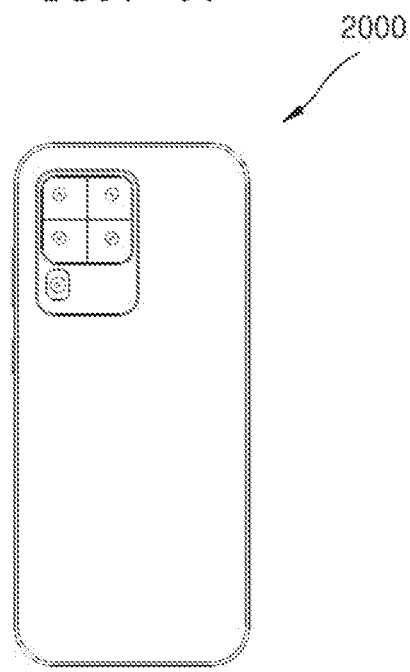
FIGS. 20 to 29 show various examples of electronic devices to which image sensors are applied according to example embodiments.
Figure 21:
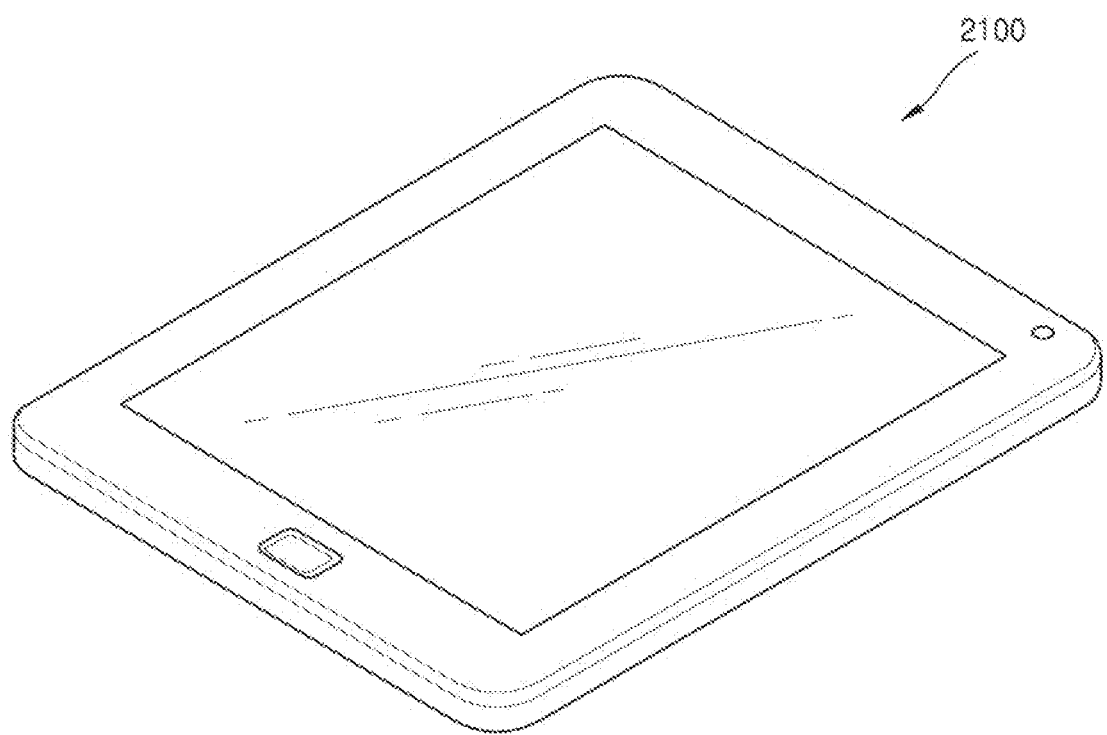
Figure 22:
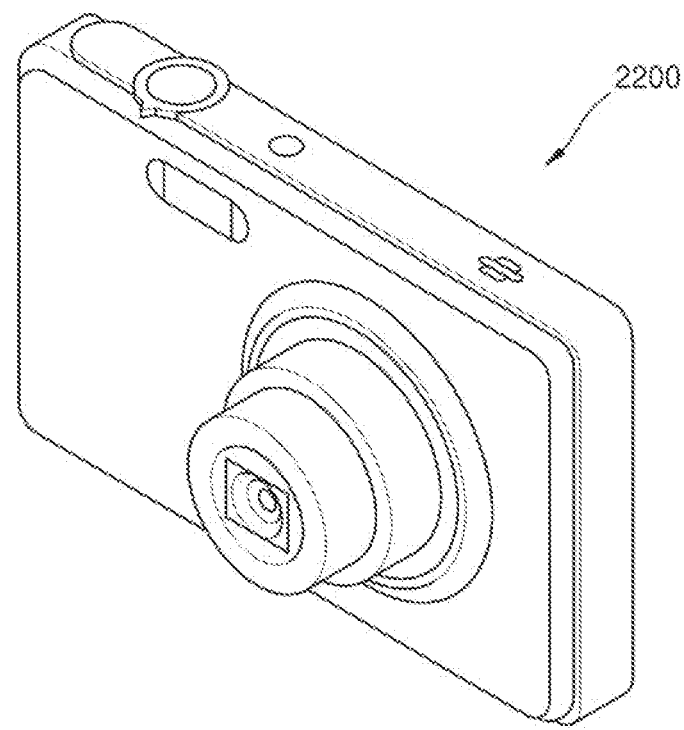
Figure 23:
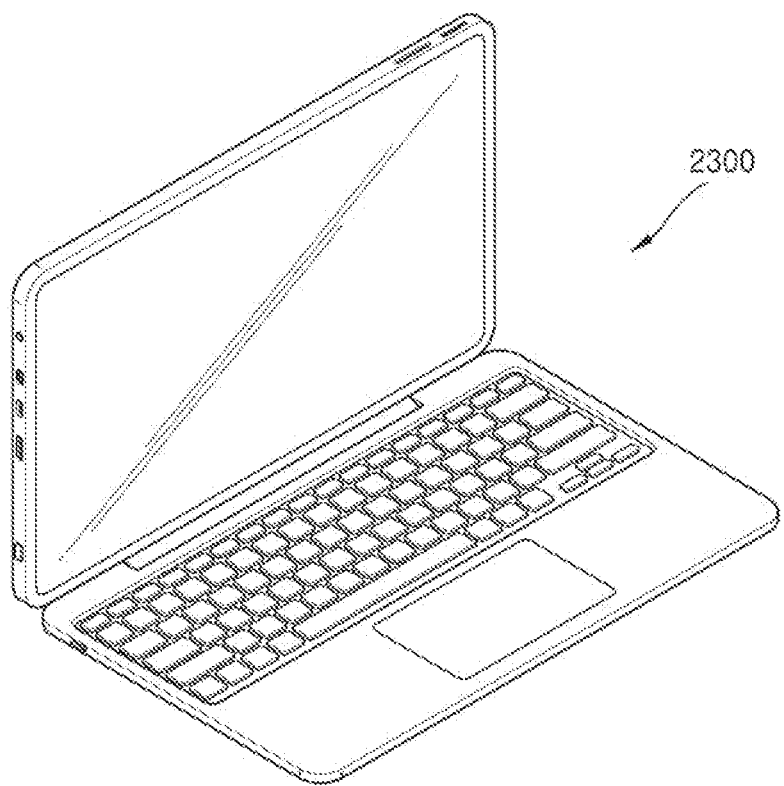
Figure 24:
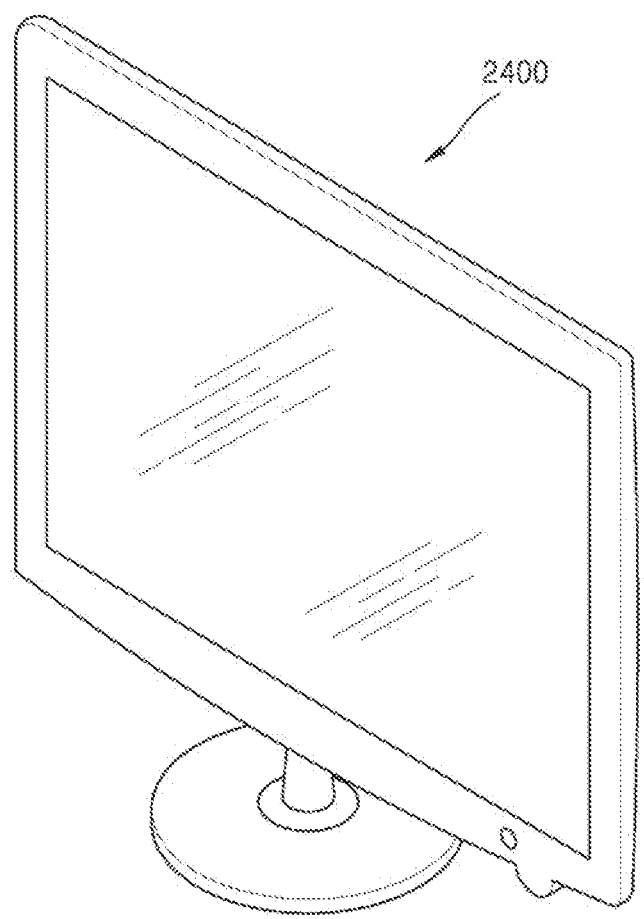

The image sensor 1000 according to the example embodiments may be applied to the mobile phone or a smartphone 2000 shown in FIG. 20, a tablet or a smart tablet 2100 shown in FIG. 21, a digital camera or a camcorder 2200 shown in FIG. 22, a laptop computer 2300 shown in FIG. 23, or a television or a smart television 2400 shown in FIG. 24, etc. For example, the smartphone 2000 or the smart tablet 2100 may include a plurality of high-resolution cameras each including a high-resolution image sensor. Depth information of objects in an image may be extracted, out condensing of the image may be adjusted, or objects in the image may be automatically identified by using the high-resolution cameras.

Figure 25:
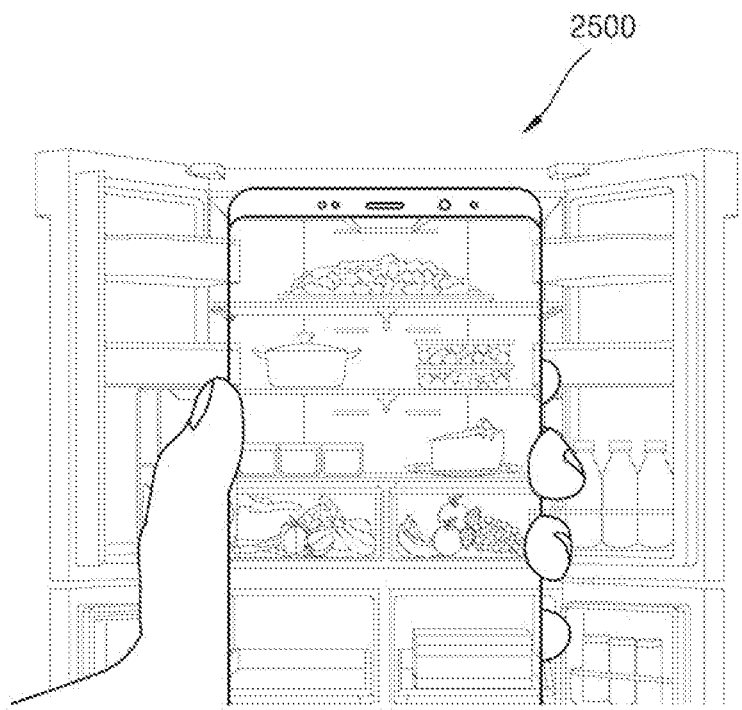
Figure 26:
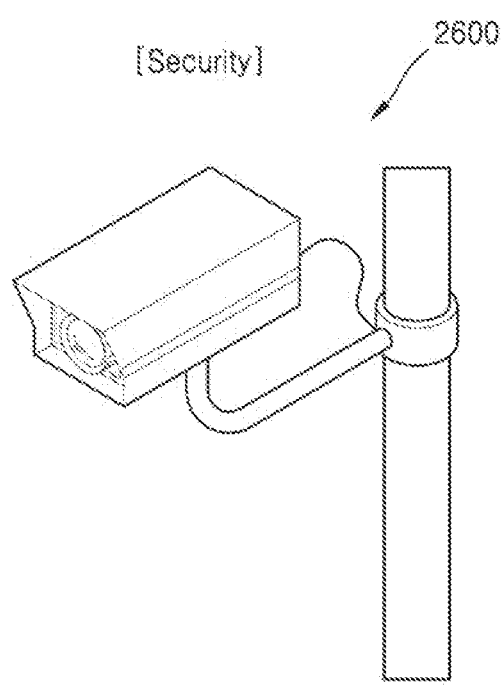
Figure 27:
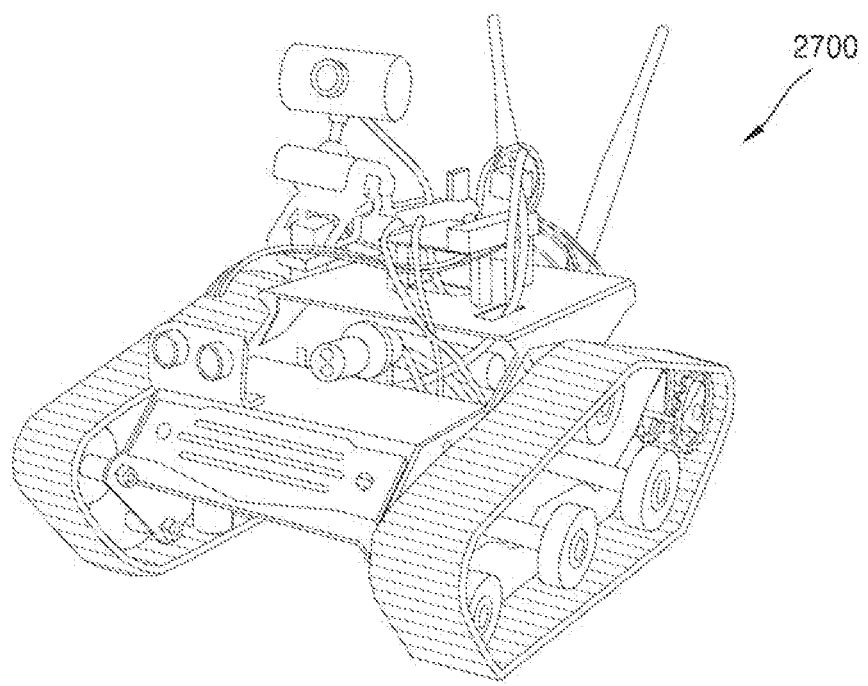
Figure 28:
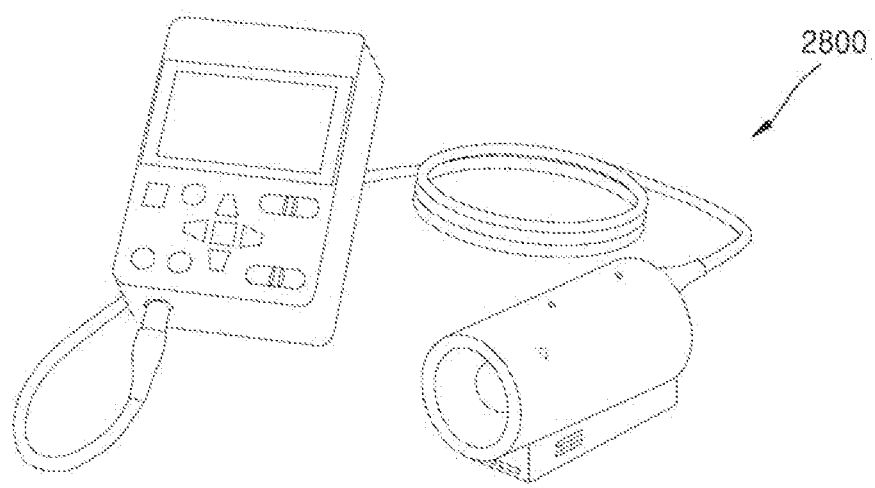

The image sensor 1000 may also be applied to a smart refrigerator 2500 shown in FIG. 25, a surveillance camera 2600 shown in FIG. 26, a robot 2700 shown in FIG. 27, a medical camera 2800 shown in FIG. 28, etc. For example, the smart refrigerator 2500 may automatically recognize food in the refrigerator by using the image sensor, and may notify the user of an existence of a certain kind of food, kinds of food put into or taken out, etc. through a smartphone. The surveillance camera 2600 may also provide an ultra-high-resolution image and may allow the user to recognize an object or a person in the image even in dark environment by using high sensitivity. The robot 2700 may be input to a disaster or industrial site that a person may not directly access, to provide the user with high-resolution images. The medical camera 2800 may provide high-resolution images for diagnosis or surgery, and may dynamically adjust a field of view.

Figure 29:
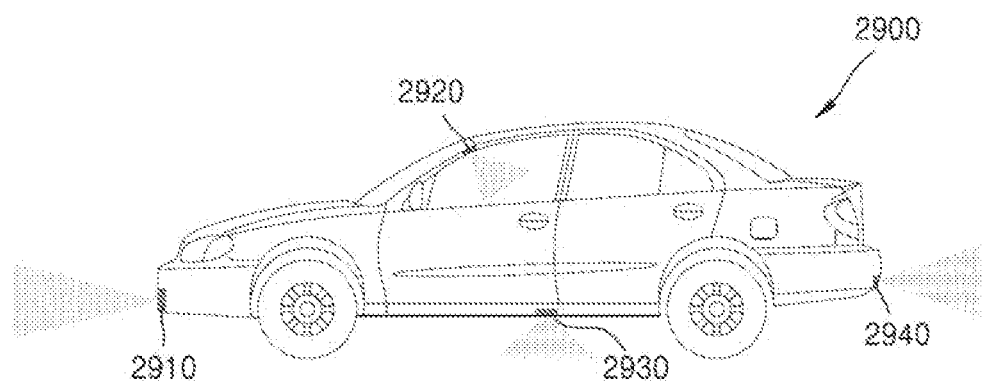

The image sensor may also be applied to a vehicle 2900 as shown in FIG. 29. The vehicle 2900 may include a plurality of vehicle cameras 2910, 2920, 2930, and 2940 arranged on various positions. Each of the vehicle cameras 2910, 2920, 2930, and 2940 may include the image sensor according to the example embodiment. The vehicle 2900 may provide a driver with various information about the interior of the vehicle 2900 or the periphery of the vehicle 2900 by using the plurality of vehicle cameras 2910, 2920, 2930, and 2940, and may provide the driver with the information necessary for the autonomous travel by automatically recognizing an object or a person in the image.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. An image sensor comprising:
    a sensor substrate comprising a first photosensitive cell and a second photosensitive cell which are configured to sense light incident on the sensor substrate;
    a color separating lens array configured to change a phase of first wavelength light and a phase of second wavelength light different from each other such that the first wavelength light included in light incident on the color separating lens array travels to the first photosensitive cell and the second wavelength light included in the light incident on the color separating lens array travels to the second photosensitive cell;
    a spectrum shaping layer comprising a plurality of nanostructures respectively having a first refractive index and a dielectric material disposed between the plurality of nanostructures and respectively having a second refractive index, the spectrum shaping layer being disposed between the sensor substrate and the color separating lens array and configured to shape a spectral profile of the light incident on the sensor substrate by reflecting and/or absorbing portion of light passing through the color separating lens array; and
    an optical filter layer disposed on the color separating lens array, the optical filter layer being configured to block infrared or ultraviolet light among the light incident on the color separating lens array,
    wherein a thickness of the color separating lens array is greater than a thickness of the spectrum shaping layer, and
    wherein the color separating lens array comprises a first region corresponding to the first photosensitive cell and a second region corresponding to the second photosensitive cell, each of the first region and the second region comprising at least one nanopost.

2. An electronic device comprising:
    an image sensor configured to convert an optical image into an electrical signal; and
    a processor configured to control an operation of the image sensor, and store and output a signal generated by the image sensor,
    wherein the image sensor comprises:
        a sensor substrate comprising a first photosensitive cell and a second photosensitive cell which are configured to sense light incident on the sensor substrate;
        a color separating lens array configured to change a phase of first wavelength light and a phase of second wavelength light different from each other such that the first wavelength light included in light incident on the color separating lens array travels to the first photosensitive cell and the second wavelength light included in the light incident on the color separating lens array travels to the second photosensitive cell; and
        a spectrum shaping layer comprising a plurality of nanostructures respectively having a first refractive index and a dielectric material provided between the plurality of nanostructures and respectively having a second refractive index, the spectrum shaping layer being provided between the sensor substrate and the color separating lens array and configured to shape a spectral profile of the light incident on the sensor substrate by reflecting and/or absorbing portion of light passing through the color separating lens array, and
    wherein the color separating lens array comprises a first region corresponding to the first photosensitive cell and a second region corresponding to the second photosensitive cell, each of the first region and the second region comprising at least one nanopost.

3. The electronic device of claim 2, wherein a thickness of the color separating lens array is 3 to 50 times larger than a thickness of the spectrum shaping layer.

4. The electronic device of claim 2, wherein a thickness of the color separating lens array is 500 nm to 1500 nm, and a thickness of the spectrum shaping layer is 30 nm to 160 nm.

5. The electronic device of claim 2, wherein the spectrum shaping layer comprises a first shaper provided on the first photosensitive cell, and
    wherein the first shaper has a transmittance less than 0.5 with respect to light having a wavelength equal to or less than 450 nm, and the first shaper has a transmittance equal to or more than 0.5 with respect to light having a wavelength equal to or more than 500 nm.

6. The electronic device of claim 2, wherein the spectrum shaping layer comprises a second shaper provided on the second photosensitive cell, and
    wherein the second shaper has a transmittance lower than 0.5 with respect to light having a wavelength of 650 nm, and the second shaper has a transmittance of equal to or more than 0.5 with respect to light having a wavelength equal to or less than 610 nm.

7. The electronic device of claim 2, wherein a transmission area ratio of the spectrum shaping layer is 40% to 90% with respect to light of a wavelength of 400 nm to 700 nm.

8. The electronic device of claim 2, wherein a transmission area ratio of the spectrum shaping layer is 50% to 80% with respect to light of a wavelength of 400 nm to 700 nm.

9. The electronic device of claim 2, wherein the spectrum shaping layer comprises a first shaper provided on the first photosensitive cell and a second shaper provided on the second photosensitive cell, and
    wherein the first shaper comprises a plurality of first nanostructures arranged at a first pitch, and the second shaper comprises a plurality of second nanostructures arranged at a second pitch.

10. The electronic device of claim 9, wherein the second pitch is 2 to 6 times larger than the first pitch.

11. The electronic device of claim 2, further comprising an optical filter layer provided on the color separating lens array, the optical filter layer being configured to block infrared or ultraviolet light among the light incident on the color separating lens array.

12. The electronic device of claim 11, wherein the optical filter layer comprises a first filter layer having a first refractive index and a second filter layer provided on the first filter layer and having a second refractive index.

13. The electronic device of claim 2, wherein the spectrum shaping layer comprises a first shaper provided on the first photosensitive cell and a second shaper provided on the second photosensitive cell, and
wherein the first shaper comprises a plurality of first nanostructures respectively having a first cross-sectional area, and the second shaper comprises a plurality of second nanostructures respectively having a second cross-sectional area that is larger than the first cross-sectional area.

14. The electronic device of claim 13, wherein each of the plurality of first nanostructures and each of the plurality of second nanostructures have a cylinder shape or a square pillar shape.

15. The electronic device of claim 13, wherein the second cross-sectional area is 4 to 10 times larger than the first cross-sectional area.

16. The electronic device of claim 2, wherein the sensor substrate further comprises a third photosensitive cell and a fourth photosensitive cell sensing light, and
wherein the color separating lens array is configured to change the phase of the first wavelength light, the phase of the second wavelength light, and a phase of third wavelength light different from each other such that the first wavelength light travels to the first photosensitive cell and the fourth photosensitive cell and the third wavelength light travels to the third photosensitive cell.

17. The electronic device of claim 16, wherein the spectrum shaping layer comprises a third shaper provided on the third photosensitive cell, and
wherein the third shaper has a transmittance lower than 0.5 with respect to light having a wavelength equal to or less than 500 nm, and the third shaper has a transmittance equal to or more than 0.5 with respect to light having a wavelength equal to or more than 600 nm.

18. The electronic device of claim 16, wherein the spectrum shaping layer comprises a first shaper provided on the first photosensitive cell and the fourth photosensitive cell, a second shaper provided on the second photosensitive cell, and a third shaper provided on the third photosensitive cell, and
wherein the first shaper comprises a plurality of first nanostructures arranged at a first pitch, the second shaper comprises a plurality of second nanostructures arranged at a second pitch that is larger than the first pitch, and the third shaper comprises a plurality of third nanostructures arranged at a third pitch that is larger than the first pitch and less than the second pitch.

19. The electronic device of claim 16, wherein a ratio of light sensed by the second photosensitive cell is equal to or more than 85% with respect to light having a wavelength of 450 nm that is sensed by the sensor substrate.

20. The electronic device of claim 16, wherein a ratio of light sensed by the third photosensitive cell is equal to or more than 60% with respect to light having a wavelength of 640 nm that is sensed by the sensor substrate.

21. The electronic device of claim 16, wherein the spectrum shaping layer comprises a first shaper provided on the first photosensitive cell and the fourth photosensitive cell, a second shaper provided on the second photosensitive cell, and a third shaper provided on the third photosensitive cell, and
wherein the first shaper comprises a plurality of first nanostructures respectively having a first cross-sectional area, the second shaper comprises a plurality of second nanostructures respectively having a second cross-sectional area that is larger than the first cross-sectional area, and the third shaper comprises a plurality of third nanostructures respectively having a third cross-sectional area that is larger than the first cross-sectional area and less than the second cross-sectional area.

22. The electronic device of claim 21, wherein each of the plurality of first nanostructures, each the of the plurality of second nanostructures, and each of the plurality of third nanostructures has a cylinder shape or a square pillar shape.

23. An image sensor comprising:
a sensor substrate comprising a first photosensitive cell and a second photosensitive cell which are configured to sense light incident on the sensor substrate;
a color separating lens array configured to change a phase of first wavelength light and a phase of second wavelength light different from each other such that the first wavelength light included in light incident on the color separating lens array travels to the first photosensitive cell and the second wavelength light included in the light incident on the color separating lens array travels to the second photosensitive cell; and
a spectrum shaping layer comprising:
a plurality of nanostructures respectively having a first refractive index; and
a dielectric material provided between the plurality of nanostructures and having a second refractive index,
wherein the spectrum shaping layer is provided between the sensor substrate and the color separating lens array and configured to shape a spectral profile of the light incident on the sensor substrate by reflecting and/or absorbing portion of light passing through the color separating lens array, and
wherein the color separating lens array comprises a first region corresponding to the first photosensitive cell and a second region corresponding to the second photosensitive cell, each of the first region and the second region comprising at least one nanopost.

24. The image sensor of claim 23, wherein a thickness of the color separating lens array is 500 nm to 1500 nm, and a thickness of the spectrum shaping layer is 30 nm to 160 nm.

25. The image sensor of claim 23, wherein the spectrum shaping layer comprises a first shaper provided on the first photosensitive cell, and
wherein the first shaper has a transmittance less than 0.5 with respect to light having a wavelength equal to or less than 450 nm, and the first shaper has a transmittance equal to or more than 0.5 with respect to light having a wavelength equal to or more than 500 nm.

26. The image sensor of claim 23, wherein the spectrum shaping layer comprises a second shaper provided on the second photosensitive cell, and wherein the second shaper has a transmittance lower than 0.5 with respect to light having a wavelength of 650 nm, and the second shaper has a transmittance of equal to or more than 0.5 with respect to light having a wavelength equal to or less than 610 nm.

27. The image sensor of claim 23, wherein a thickness of the color separating lens array is 3 to 50 times larger than a thickness of the spectrum shaping layer.

28. The image sensor of claim 23, wherein a transmission area ratio of the spectrum shaping layer is 50% to 80% with respect to light of a wavelength of 400 nm to 700 nm.

29. The image sensor of claim 23, wherein the spectrum shaping layer comprises a first shaper provided on the first photosensitive cell, and
wherein a transmission area ratio of the first shaper is 50% to 80% with respect to light of a wavelength of 400 nm to 700 nm.

30. The electronic device of claim 23, wherein the first wavelength light is different from the second wavelength light, and
wherein the plurality of nanostructures are configured such that the first wavelength light included in the light incident on the color separating lens array is condensed on the first photosensitive cell and the second wavelength light included in the light incident on the color separating lens array is condensed on the second photosensitive cell.

31. The image sensor of claim 23, wherein a transmission area ratio of the spectrum shaping layer is 40% to 90% with respect to light of a wavelength of 400 nm to 700 nm.

32. The image sensor of claim 23, further comprising an optical filter layer provided on the color separating lens array and configured to block infrared or ultraviolet light among the light incident on the color separating lens array.

33. The image sensor of claim 32, wherein the optical filter layer comprises a first filter layer having a first refractive index and a second filter layer provided on the first filter layer and having a second refractive index.

34. The image sensor of claim 23, wherein the spectrum shaping layer comprises a first shaper provided on the first photosensitive cell and a second shaper disposed on the second photosensitive cell, and
wherein the first shaper comprises a plurality of first nanostructures arranged at a first pitch, and the second shaper comprises a plurality of second nanostructures arranged at a second pitch.

35. The image sensor of claim 34, wherein the second pitch is 2 to 6 times larger than the first pitch.

36. The image sensor of claim 23, wherein the spectrum shaping layer comprises a first shaper provided on the first photosensitive cell and a second shaper disposed on the second photosensitive cell, and
wherein the first shaper comprises a plurality of first nanostructures having a first cross-sectional area, and the second shaper comprises a plurality of second nanostructures having a second cross-sectional area that is larger than the first cross-sectional area.

37. The image sensor of claim 36, wherein each of the plurality of first nanostructures and each of the plurality of second nanostructures have a cylinder shape or a square pillar shape.

38. The image sensor of claim 36, wherein the second cross-sectional area is 4 to 10 times larger than the first cross-sectional area.

39. The image sensor of claim 23, wherein the sensor substrate further comprises a third photosensitive cell and a fourth photosensitive cell sensing light, and
wherein the color separating lens array is configured to change the phase of the first wavelength light, the phase of the second wavelength light, and a phase of third wavelength light different from each other such that the first wavelength light travels to the first photosensitive cell and the fourth photosensitive cell and the third wavelength light travels to the third photosensitive cell.

40. The image sensor of claim 39, wherein the spectrum shaping layer comprises a third shaper provided on the third photosensitive cell, and
wherein the third shaper has a transmittance lower than 0.5 with respect to light having a wavelength equal to or less than 500 nm, and the third shaper has a transmittance equal to or more than 0.5 with respect to light having a wavelength equal to or more than 600 nm.

41. The image sensor of claim 39, wherein a ratio of light sensed by the third photosensitive cell is equal to or more than 60% with respect to light having a wavelength of 640 nm that is sensed by the sensor substrate.

42. The image sensor of claim 39, wherein the spectrum shaping layer comprises a first shaper provided on the first photosensitive cell and the fourth photosensitive cell, a second shaper provided on the second photosensitive cell, and a third shaper provided on the third photosensitive cell, and
wherein the first shaper comprises a plurality of first nanostructures arranged at a first pitch, the second shaper comprises a plurality of second nanostructures arranged at a second pitch that is larger than the first pitch, and the third shaper comprises a plurality of third nanostructures arranged at a third pitch that is larger than the first pitch and less than the second pitch.

43. The image sensor of claim 39, wherein a ratio of light sensed by the second photosensitive cell is equal to or more than 85% with respect to light having a wavelength of 450 nm that is sensed by the sensor substrate.

44. The image sensor of claim 39, wherein the spectrum shaping layer comprises a first shaper provided on the first photosensitive cell and the fourth photosensitive cell, a second shaper provided on the second photosensitive cell, and a third shaper provided on the third photosensitive cell, and
wherein the first shaper comprises a plurality of first nanostructures respectively having a first cross-sectional area, the second shaper comprises a plurality of second nanostructures respectively having a second cross-sectional area that is larger than the first cross-sectional area, and the third shaper comprises a plurality of third nanostructures respectively having a third cross-sectional area that is larger than the first cross-sectional area and less than the second cross-sectional area.

45. The image sensor of claim 44, wherein each of the plurality of first nanostructures, each of the plurality of second nanostructures, and each of the plurality of third nanostructures has a cylinder shape or a square pillar shape.

* * * * *